US012582186B2

(12) United States Patent
Sharrah et al.

(10) Patent No.: US 12,582,186 B2
(45) **Date of Patent: *Mar. 24, 2026**

(54) HEADWEAR-MOUNTABLE ATTACHMENT DEVICE FOR SUPPORTING A LIGHTING DEVICE OR OTHER TOOL OR ACCESSORY, OR KIT INCLUDING SAME

(71) Applicant: Streamlight, Inc., Eagleville, PA (US)

(72) Inventors: Raymond L. Sharrah, Collegeville, PA (US); Jonathan R. Sharrah, Phoenixville, PA (US); Matthew B. Dalton, Elkins Park, PA (US); Daemon Heckman, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,615

(22) Filed: Nov. 15, 2024

(65) Prior Publication Data

US 2025/0143397 A1 May 8, 2025

Related U.S. Application Data

(63) Continuation-in-part of application No. 18/195,729, filed on May 10, 2023.

(60) Provisional application No. 63/340,340, filed on May 10, 2022.

(51) Int. Cl.

| | |
|---|---|
| *A42B 3/04* | (2006.01) |
| *A42B 1/244* | (2021.01) |
| *F21V 21/08* | (2006.01) |
| *F21V 21/084* | (2006.01) |

(52) U.S. Cl.

CPC .............. *A42B 3/044* (2013.01); *A42B 1/244* (2013.01); *A42B 3/0446* (2013.01); *F21V 21/0816* (2013.01); *F21V 21/084* (2013.01)

(58) Field of Classification Search

CPC ....... A42B 3/003; A42B 3/044; A42B 3/0446; A42B 3/0433; A42B 3/04; A42B 3/0406; F21V 21/0816; F21V 21/084

USPC ..................................... 362/106, 105; 2/422

See application file for complete search history.

(56) References Cited

U.S. PATENT DOCUMENTS

| | | | | |
|---|---|---|---|---|
| 5,608,919 A * | 3/1997 | Case | A42B 3/04 362/106 |
| 12,108,824 B2 * | 10/2024 | Hunt | A42B 3/04 |
| 2016/0183620 A1 * | 6/2016 | Moreau | A42B 3/08 2/421 |
| 2018/0352942 A1 * | 12/2018 | Downs | F21V 33/0008 |

* cited by examiner

*Primary Examiner* — Laura K Tso

(74) *Attorney, Agent, or Firm* — Quarles & Brady LLP; James J. Aquilina

(57) ABSTRACT

Embodiments of an attachment device for supporting a lighting device or other tool or accessory from a hat or helmet, or a kit including same, are shown and described.

20 Claims, 41 Drawing Sheets

HEADWEAR-MOUNTABLE ATTACHMENT DEVICE FOR SUPPORTING A LIGHTING DEVICE OR OTHER TOOL OR ACCESSORY, OR KIT INCLUDING SAME

CROSS-REFERENCE TO RELATED APPLICATIONS

The present application is a continuation-in-part of U.S. application Ser. No. 18/195,729, filed May 10, 2023, which claims the domestic benefit of U.S. Provisional Application No. 63/340,340, filed May 10, 2022 and entitled "HELMET-MOUNTABLE ATTACHMENT DEVICE FOR SUPPORTING A LIGHTING DEVICE OR OTHER TOOL OR ACCESSORY, OR KIT INCLUDING SAME." Both of these references are incorporated herein by reference as if set forth in their entireties. Also incorporated herein by reference in their entireties are U.S. Design patents application Ser. Nos. 29/972,997 and 29/973,005, both filed Nov. 13, 2024 and entitled "LIGHTING DEVICE."

FIELD OF THE DISCLOSURE

The present disclosure relates to the field of headwear-mountable attachment devices for attaching tools or accessories, for example a lighting device to, for example, a hat or helmet, or a kit comprising one or more straps and/or one or more clips and/or one or more alternative fasteners that can be used to attach the strap(s) and/or lighting device to a variety of headwear types.

BACKGROUND

Headwear-mountable lights, including various helmet-mountable lights, are known in the art. Examples of these lights include the Vantage and Vantage II lights manufactured and sold by Streamlight, Inc. of Eagleville, Pennsylvania, U.S.A., which is the applicant of the present application. Existing helmet-mountable lights are either clipped directly to a helmet or supported by a strap that is stretched around the circumference of the helmet, so that the strap is routed approximately parallel to the lower edge or brim line of a helmet. Moreover, some existing hat-mountable lights are attachable to the brim of a hat via a clip. When mounted to straps that are routed around the outside of a helmet, a light is generally attached to the strap either on one side of the helmet (e.g., approximately above one ear) or directly in the front of the helmet (e.g., approximately in front of the forehead). In these locations, the attached light causes weight imbalance on the helmet and can also interfere with the attachment of additional tools or accessories to the helmet. For example, on a military, rescue, or safety helmet, a front-mounted light might interfere with the attachment of night-vision goggles (NVGs) to the front of the helmet and on a fireman's helmet might interfere with the identification plaque which is generally located at the front of a fireman's helmet. Side-mounted lights, moreover, can interfere with the use of headsets, earmuffs, visors, radios, and other accessories which might be located in or attached to the helmet in the same general location.

There is therefore a need for improved attachment devices including strap(s) and/or kits including strap(s) and clip(s) for headwear-mountable lighting devices that overcome the drawbacks present in the relevant prior art devices.

SUMMARY

In some embodiments, a helmet attachment device is provided. The helmet attachment device can be adapted to be mounted to a helmet, the helmet having a first attachment portion located on a first lateral side of the helmet and a second attachment portion located on a second lateral side of the helmet, the helmet further comprising an apex. The helmet attachment device can include a strap, the strap having a first end and a second end, a first clip attached to the first end of the strap, the first clip being specially adapted to attach to the first attachment portion, and a second clip attached to the second end of the strap, the second clip being specially adapted to attach to the second attachment portion. When the first clip is attached to the first attachment portion and the second attachment portion, the strap can be routed over or near the apex of the helmet.

A helmet attachment device can include a lighting device that is attachable to a strap at or near an apex of the helmet.

A helmet attachment device can include a lighting device that includes a first slot and a second slot through which a strap can be routed.

A helmet attachment device can include a lighting device with first and second slots. The first and second slots can have an arcuate curvature so that when a strap is routed through the first and second slots, the lighting device can be rotated relative to the strap.

A helmet attachment device can include an adapter that is attachable to a first or second end of a strap. The adapter can include a central portion, a first arm, and a second arm. The first arm can extend from the central portion along a first axis and the second arm can extend from the central portion along a second axis. Each of the first and second axes can be non-aligned with an axis of the strap. Each of the first and second arms can be adapted to attach to either of the first attachment portion or the second attachment portion.

A helmet attachment device can include an adapter with a first arm having a first hook and a second arm having a second hook.

A helmet attachment device can include first and second clips that have at least one hooked portion.

A helmet attachment device can include first and second clips that each have a portion that is adapted to releasably engage with an accessory slot or rail located on the helmet.

In some embodiments, a kit is provided. The kit can include a strap, a first clip, a second, clip, a third clip, and a fourth clip. The first clip can be removably attached able to a first end of the strap. The first clip can be specially adapted to attach to a first attachment portion located on a first lateral side of a first type of helmet. The first type of helmet can include an apex. The second clip can be removably attachable to a second end of the strap. The second clip can be specially adapted to attach to a second attachment portion located on a second lateral side of the first type of helmet. The third clip can be removably attachable to the first end of the strap. The third clip can be specially adapted to attach to a first attachment portion on a first lateral side of a second type of helmet. The second type of helmet can have an apex. The fourth clip can be removably attachable to the second end of the strap. The fourth clip can be specially adapted to attach to a second attachment portion located on a second lateral side of the second type of helmet. When the first clip is attached to the first end of the strap, the second clip is attached to the second end of the strap, the first clip is attached to the first attachment portion of the first type of helmet, and the second clip is attached to the second attachment portion of the first type of helmet, the strap can be routed over or near the apex of the first type of helmet. And when the third clip is attached to the first end of the strap, the fourth clip is attached to the second end of the strap, the third clip is attached to the first attachment portion of the second type of helmet, and the fourth clip is attached to the second attachment portion of the second type of helmet, the strap can be routed over or near the apex of the second type of helmet.

A kit can include a lighting device that is attachable to a strap at or near an apex of a helmet.

A kit can include a lighting device that includes a first slot and a second slot through which a strap can be routed.

A kit can include a lighting device with first and second slots. The first and second slots can include an arcuate curvature so that when a strap is routed through the first and second slots, the lighting device can be rotated relative to the strap.

A kit can include an adapter that is attachable to either of a first end or a second end of a strap. The adapter can include a central portion, a first arm, and a second arm. The first arm can extend from the central portion along a first axis and the second arm can extend from the central portion along a second axis. Each of the first and second axes can be non-aligned with an axis of the strap. Each of the first and second arms can be adapted to attach to either of a first attachment portion or a second attachment portion of a helmet.

A kit can include an adapter with a first arm having a first hook and a second arm having a second hook.

A kit can include first and second clips having at least one hooked portion.

A kit can include third and fourth clips each having a portion that is adapted to releasably engage with an accessory slot or rail located on a first lateral side or a second lateral side of a helmet.

A kit can include third and fourth clips that each have a portion that is adapted to releasably engage with an accessory slot or rail located on a first or second lateral side of a helmet.

In some embodiments, a lighting device is provided. The lighting device can include a light body having a first slot and a second slot, and a strap. The strap can include a pair of pins and a pair of pin covers, each of the pin covers adapted to fit over and removably cover a respective one of the pair of pins, the strap adapted to permit the light body to be mounted to an item that is puncturable by the pair of pins by placing the strap on one side of the item, puncturing the pair of pins through the item, placing the light body on an opposite side of the item, routing each of the pins through a respective one of the first and second slots in the light body, and placing each of a respective one of the pair of pin covers over each of a respective one of the pair of pins.

A lighting device can include first and second slots that have an arcuate curvature so that when a light body is attached to a strap through the first and second slots, the light body can be rotated relative to the strap.

In some embodiments, a helmet attachment device is provided. The helmet attachment device can be adapted to be mounted to a helmet, the helmet having a first attachment portion located on a first lateral side of the helmet and a second attachment portion located on a second lateral side of the helmet. The helmet can further include an apex. The helmet attachment device can include a strap system, a mounting base, a first clip, and a second clip. The strap system can have a first end and a second end. The mounting base can be configured to be secured to the helmet via the strap system. The first clip can be attached to the first end of the strap system, the first clip being specially adapted to attach to the first attachment portion. The second clip can be attached to the second end of the strap system, the second clip being specially adapted to attach to the second attachment portion. When the first clip is attached to the first attachment portion and the second clip is attached to the second attachment portion, the strap is routed over or near the apex of the helmet.

In some embodiments, a helmet attachment device for a helmet is provided. The helmet can define a first lateral side, a second lateral side, and an apex. The helmet attachment device can include a lighting device, a mounting base, and a strap system. The mounting base can be configured to support the lighting device relative to the helmet. The strap system can be configured to secure the mounting base relative to the helmet. The strap system can include a first lateral attachment portion configured to be secured to the helmet at the first lateral side, a second lateral attachment portion configured to be secured to the helmet at the second lateral side, and a strap body configured to extend over the apex of the helmet between the first lateral attachment portion and the second lateral attachment portion.

In some embodiments, a method of rotating a lighting device relative to a helmet is provided. The method can include disconnecting the lighting device from the helmet by engaging a release lever of a mounting base so that the release lever of the mounting base moves a retention arm of the mounting base out of a locking position, with the release lever engaged, sliding the lighting device relative to the mounting base until the lighting device is disengaged from base racks of the mounting base, and releasing the release lever so that the retention arm is returned to the locking position. The method can further include rotating the lighting device so that a lens of the lighting device faces a different direction. The method can further include connecting the lighting device to the helmet by sliding the lighting device along the base track until a stop portion of the retention arm is positioned within a notch in the lighting device.

BRIEF DESCRIPTION OF THE DRAWINGS

The devices according to the present disclosure are further described with reference to the accompanying drawings, in which.

DETAILED DESCRIPTION

Figure 1:
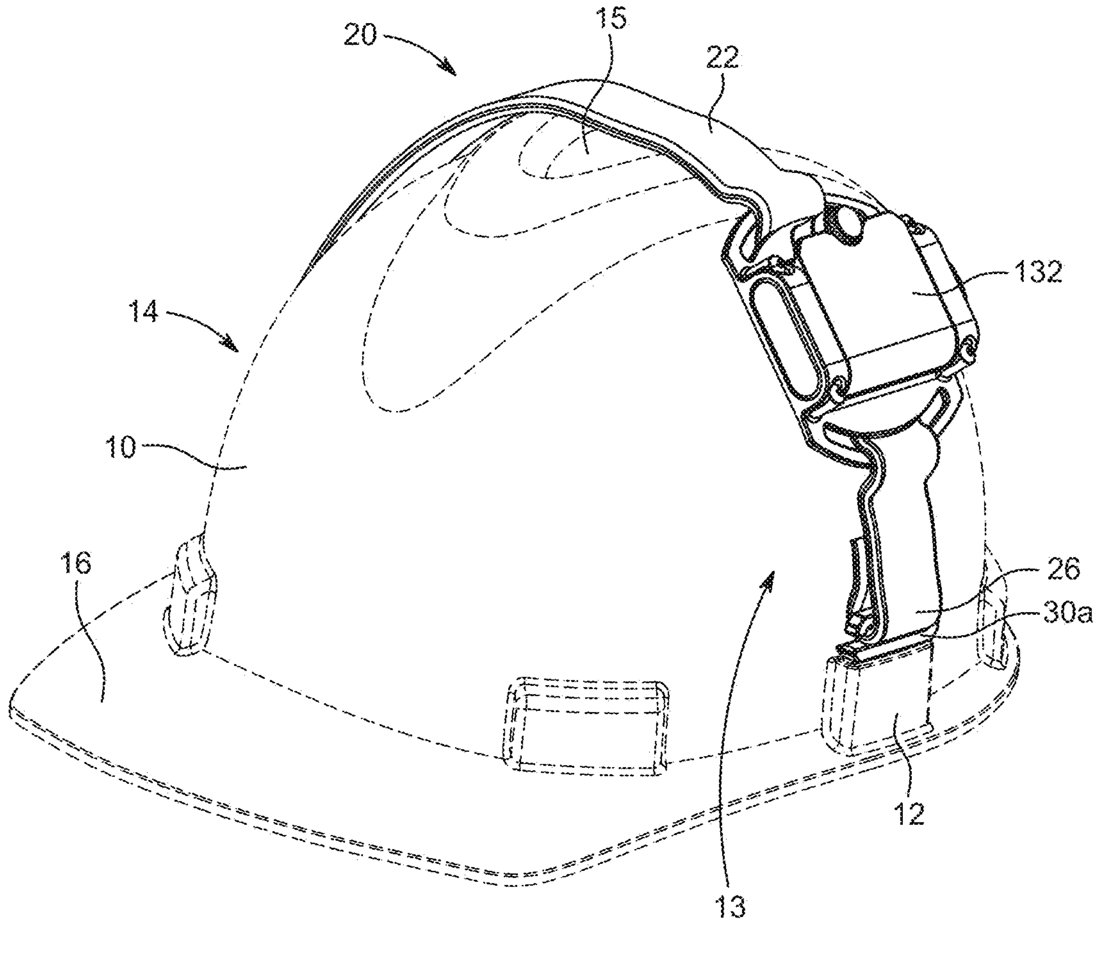
FIG. 1 is a perspective view of a first helmet attachment device according to the present disclosure, shown in an attached configuration with respect to a first exemplary helmet, and including a first embodiment of a lighting device attached thereto.

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being “connected” or “coupled” to another element, it can be directly connected or coupled to the other element or that intervening elements may be present. In contrast, when an element is referred to as being “directly connected” or “directly coupled” to another element, it should be understood that no intervening elements are present. Other words used to describe the relationship between elements should be interpreted in a like fashion (e.g., “between” versus “directly between,” “adjacent” versus “directly adjacent,” etc.).

In safety, rescue, worksite, military, or related applications in which a helmet is generally worn and it is desirable or necessary to illuminate a scene while keeping a user’s hands free, lights are commonly attached to helmets. Existing helmet-mountable lights are either clipped directly to a helmet or supported by a strap that is stretched around the circumference of the helmet, so that the strap is routed approximately parallel to the lower edge or brim line of a helmet. When mounted to straps that are routed around the outside of a helmet, a light is generally attached to the strap either on one side of the helmet (e.g., approximately above one ear) or directly in the front of the helmet (e.g., approximately in front of the forehead). In these locations, the attached light causes weight imbalance on the helmet and can also interfere with the attachment of additional tools or accessories to the helmet. For example, on a military, rescue, or safety helmet a front-mounted light might interfere with the attachment of night-vision goggles (NVGs) to the front of the helmet and on a fireman's helmet might interfere with the identification plaque which is generally located at the front of a fireman's helmet. Side-mounted lights, moreover, can interfere with the use of headsets, earmuffs, visors, radios, and other accessories which might be located in or attached to the helmet in the same general location.

Moreover, some existing hat-mountable lights are attachable to the brim of a hat via a clip. Even if clipped in the center of the brim, however, a light attached in this location can interfere with the user's vision and cause uncomfortable weight imbalances.

Accordingly, there is a need for improved attachment devices including strap(s) and/or kits including strap(s) and clip(s) for helmet-mountable lighting devices that overcome the drawbacks present in the relevant prior art devices. Applicant has therefore developed embodiments of an attachment device comprising one or more strap(s) and clips that attach to various helmet configurations such that the strap extends over the apex (i.e., crown, vertex, or top) of the helmet and user's head, where the lighting device is supported. In this location, the lighting device will be placed generally along a centerline of a user's body with its weight approximately centrally distributed atop the user's head, and located such that it will not interfere with any other helmet attachment, tool, or accessory that the user may wish to employ (for example NVGs, headsets, earmuffs, visors, and radios). Applicant has also developed various attachment devices and methods for soft hats (e.g., baseball-style caps), as will be described below.

Figure 10:
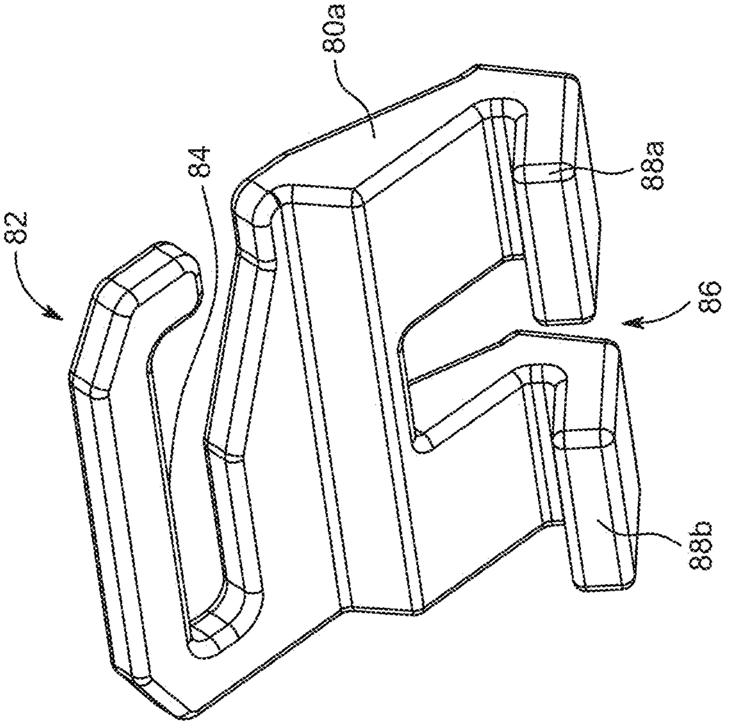
FIGS. 9 and 10 are perspective views of a second clip for an attachment device according to the present disclosure.
Figure 11:
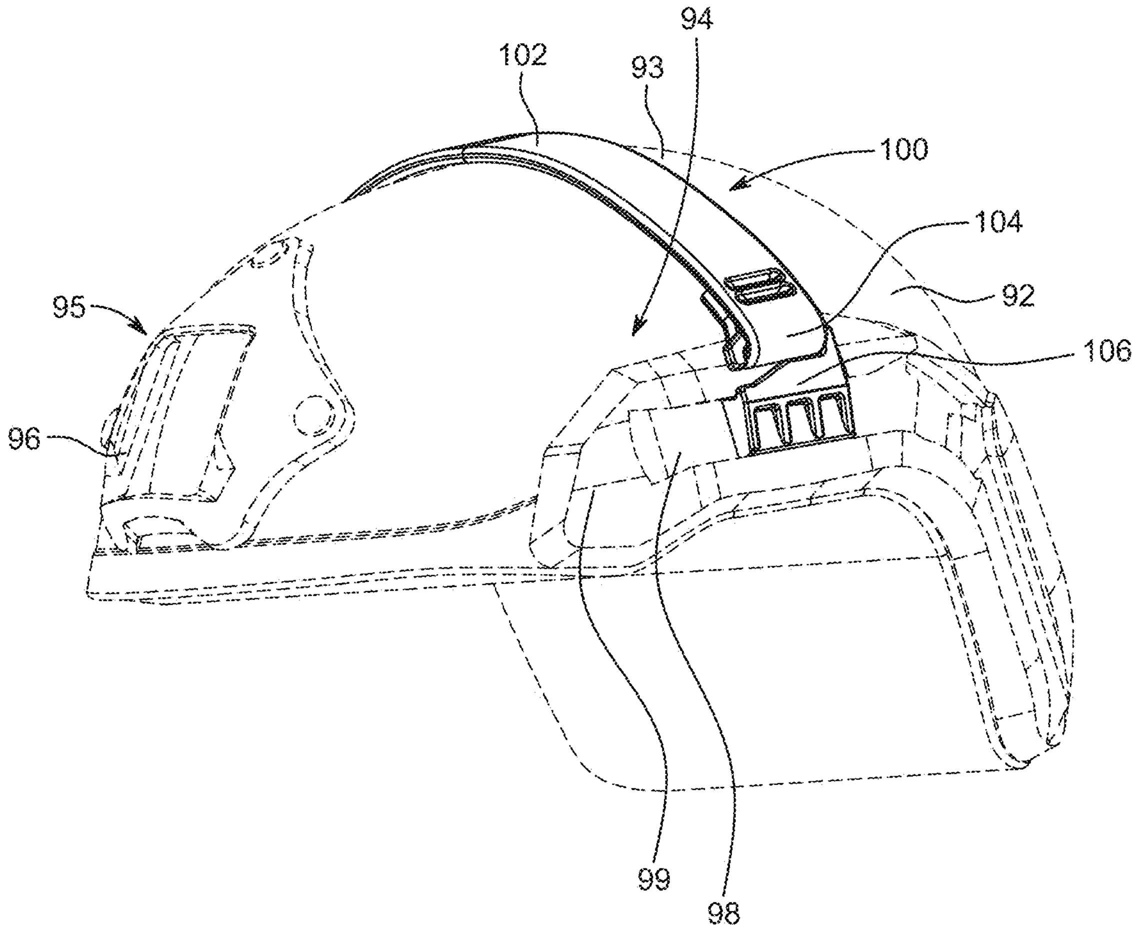
FIG. 11 is a perspective view of a fourth helmet attachment device according to the present disclosure, shown in an attached configuration with respect to a third exemplary helmet.
Figure 13:
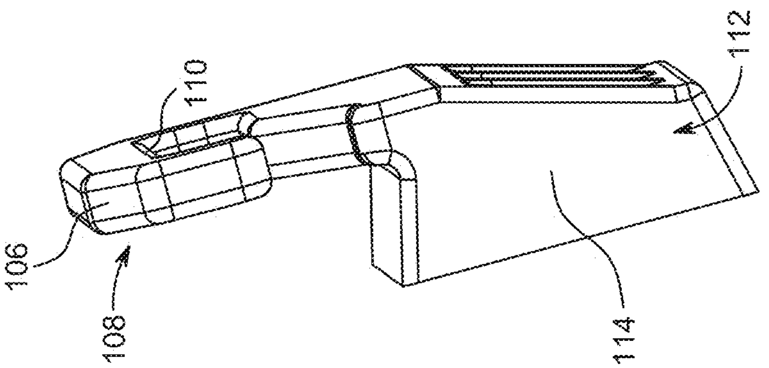
FIGS. 12 and 13 are perspective views of a third clip for an attachment device according to the present disclosure.
Figure 12:
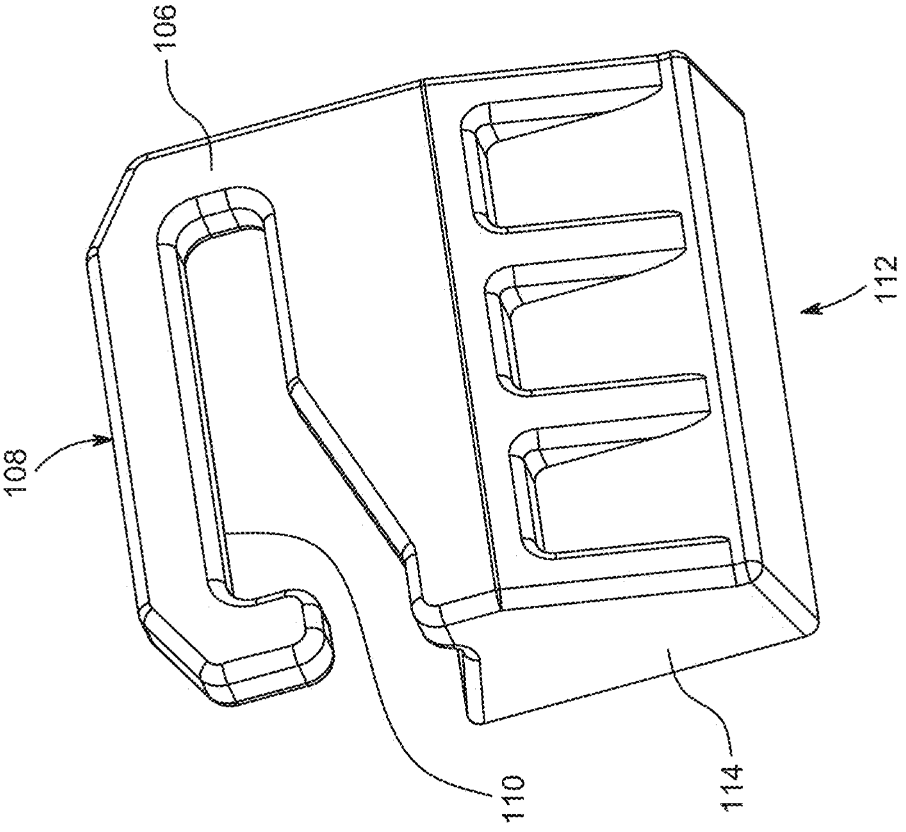

In some embodiments according to the present disclosure, one or more straps can be attached to a pair of clips that are sized and shaped to attach to a specific type of helmet, for example into an accessory slot in a safety helmet (for example a hard hat, see FIGS. 1-4, or a MSA Gallet rescue helmet, see FIGS. 14-16), around the brim of a fireman's helmet (see FIGS. 6-10), or into a tactical accessory slot of a military helmet (see FIGS. 11-13). The strap is then extendable over the apex of the helmet to allow for attachment of a lighting device to the strap at the apex of the helmet, or of one or more lighting devices to the strap along the length of the strap (i.e., in a direction roughly between the temples, over the apex of the helmet) when higher light output is desired. The strap could be of either adjustable or fixed length, and could be made of a fabric, elastic, or elasticized fabric material. One or more strap(s) and an appropriate pair of clips for a specific type of helmet could be sold together as a standalone product, with the clips being either removable or fixed to the strap. In the alternative, the strap(s) could be sold as a kit with multiple pairs of clips for different types of helmets. The strap(s) could be provided with a silicone backing to help keep them in place on the helmet(s) on which they are used.

Referring now to FIGS. 1-4, one embodiment of a helmet attachment device 20 according to the present disclosure will be described in detail. In this embodiment, the helmet attachment device 20 comprises a strap 22 and a pair of clips **30*a*,30*b*. In this embodiment, the strap 22 includes two fixed loops 24,26 at respective ends thereof so that the length of the strap 22** is not adjustable.

In this embodiment, the helmet attachment device 20 is shown attached to a first type of helmet 10, which is a common type of workplace safety helmet also known as a hard hat. The helmet 10 has a first lateral side 13 including a first attachment portion 12 and a second lateral side 14 including a second attachment portion (not shown, but identical to the first attachment portion 12). The helmet 10 further includes a brim 16 and has an apex 15 which corresponds with approximately the highest point of the user's head when the helmet 10 is worn. In this embodiment, the clip **30*a* is releasably attachable to the attachment portion 12 and the clip 30*b* is releasably attachable to the attachment portion located on the second lateral side 14 of the helmet 10. When both clips 30*a*,30*b* are attached to the helmet 10 in this way, the strap 22 is routed over or near the apex 15 of the helmet 10, which allows for the lighting device 132 to be attached to the strap 22 anywhere along the length of the strap 22, including in a location at or near the apex 15 of the helmet 10**.

Figure 3:
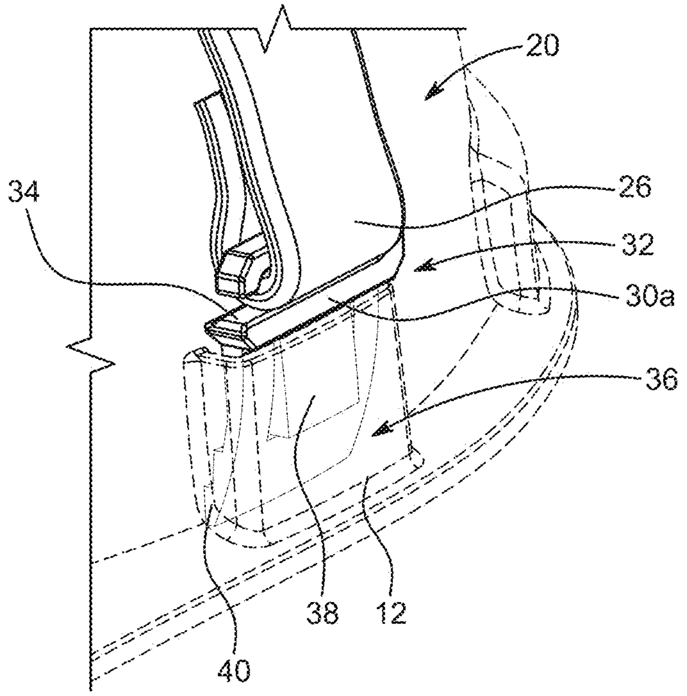
FIGS. 3 and 4 are perspective views of a first clip for an attachment device according to the present disclosure.
Figure 4:
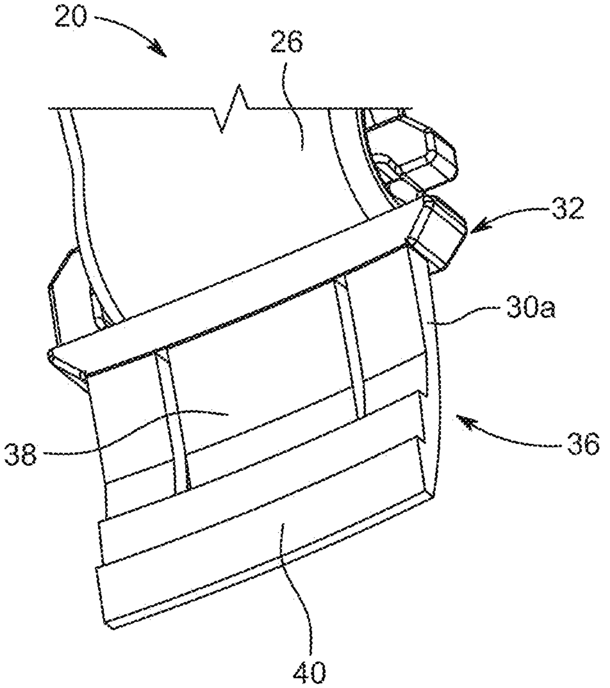

As best shown in FIGS. 3 and 4, the clip **30*a*—which should be understood to be identical to clip 30*b*—comprises an upper portion 32 including a strap slot 34 and a lower portion 36 including a depressible portion 38 and a stepped portion 40. In this embodiment, the strap slot 34 has an open side to allow for sliding of either of the fixed loops 24,26 of the strap 22 therein, so that the clip 30*a* can be quickly installed on or removed from the strap 22, for example to permit a different type of clip to be installed onto the strap 22, as will be further discussed below. In alternative embodiments, the clips 30*a*,30*b* could be permanently installed onto the strap 22 in a way that does not permit replacement of the clips 30*a*,30*b*** with other types of clips.

Figure 2:
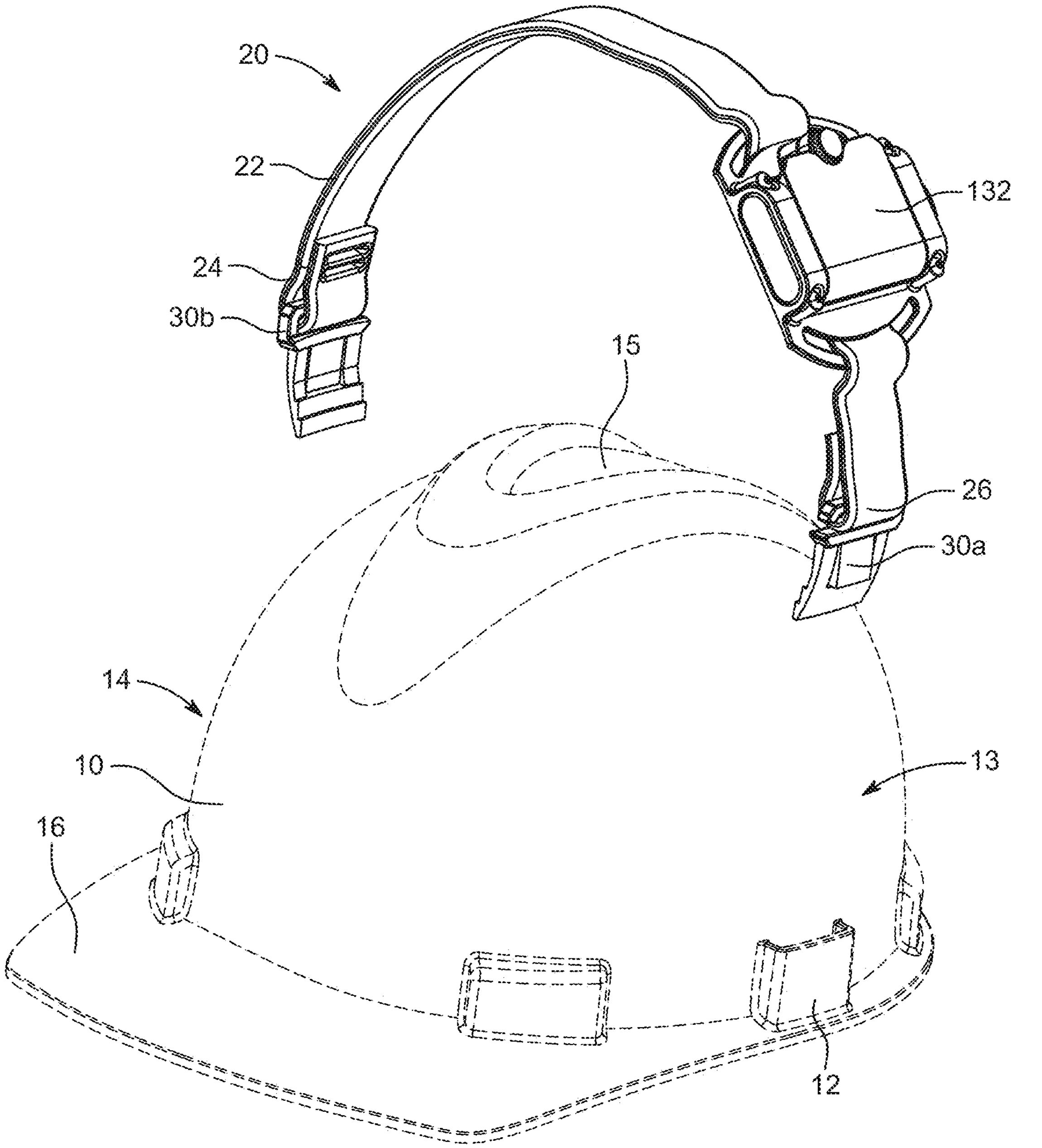
FIG. 2 is a perspective view thereof in a detached configuration with respect to the first exemplary helmet.

Referring back to FIGS. 3 and 4, in this embodiment the stepped portion 40 is sized and shaped to releasably engage with a slot (not labeled) present in the attachment portion 12 of the helmet 10. Slotted helmets like the type shown in FIGS. 1-3 are known in the art. Nonetheless, for ease of illustration, the helmet 10—including the attachment portion 12—has been rendered transparent in FIG. 3. The lower portion 36 of the clip **30*a* is installed within the attachment portion 12 of the helmet 10 by pressing the clip 30*a* downwardly into the attachment portion 12 until the stepped portion 40 rides over the slot in the helmet 10 until it is located below the slot in the helmet 10, and then clicks into place. The lower portion 36 of the clip 30*a* is permitted to partially deform via the gaps (not labeled) surrounding the depressible portion 38. The lower portion 36 of the clip 30*a* is then releasable from the attachment portion 12 of the helmet 10 by pressing on the depressible portion 38 of the clip 30*a* from the interior side thereof until the stepped portion 40 is clear of the slot in the helmet 10, and then pulling the clip 30*a* upwardly out of the attachment portion 12**.

Figure 5:
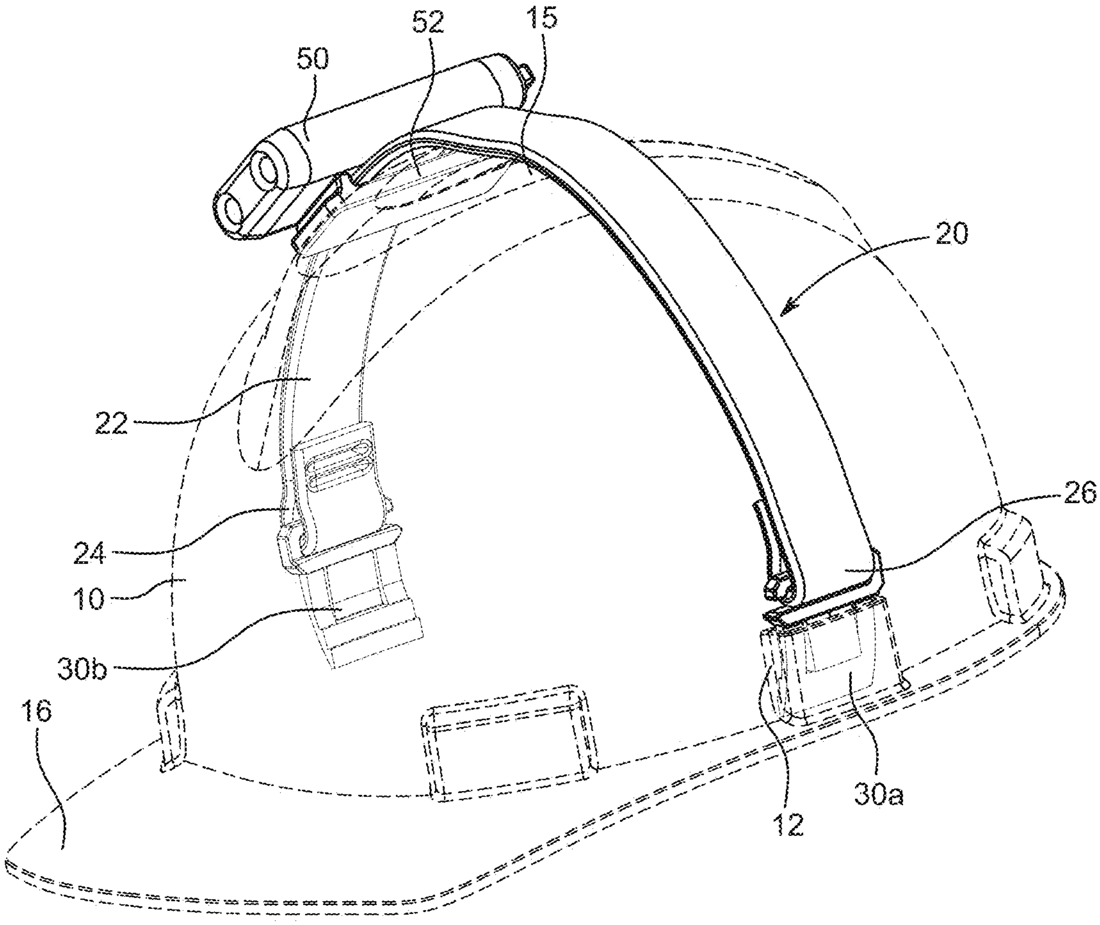
FIG. 5 is a perspective view of the helmet attachment device according to the present disclosure, shown in an attached configuration with respect to the first exemplary helmet, and including a second embodiment of a lighting device attached thereto.
Figure 18:
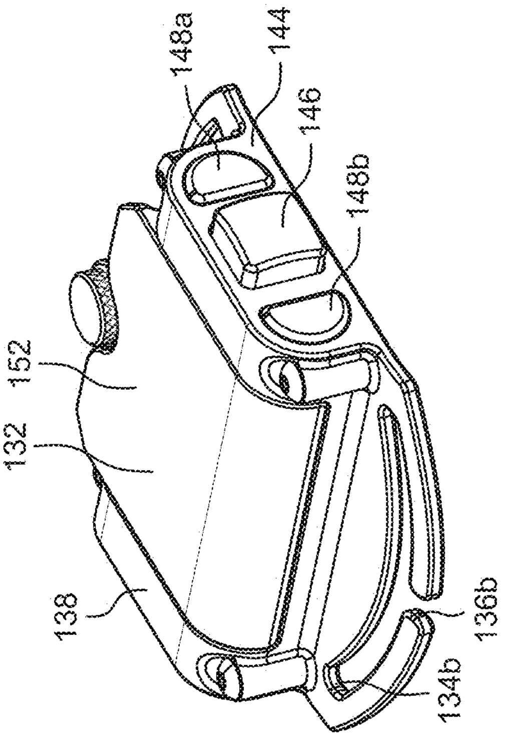
FIGS. 17 and 18 are perspective views of a first lighting device according to the present disclosure.
Figure 17:
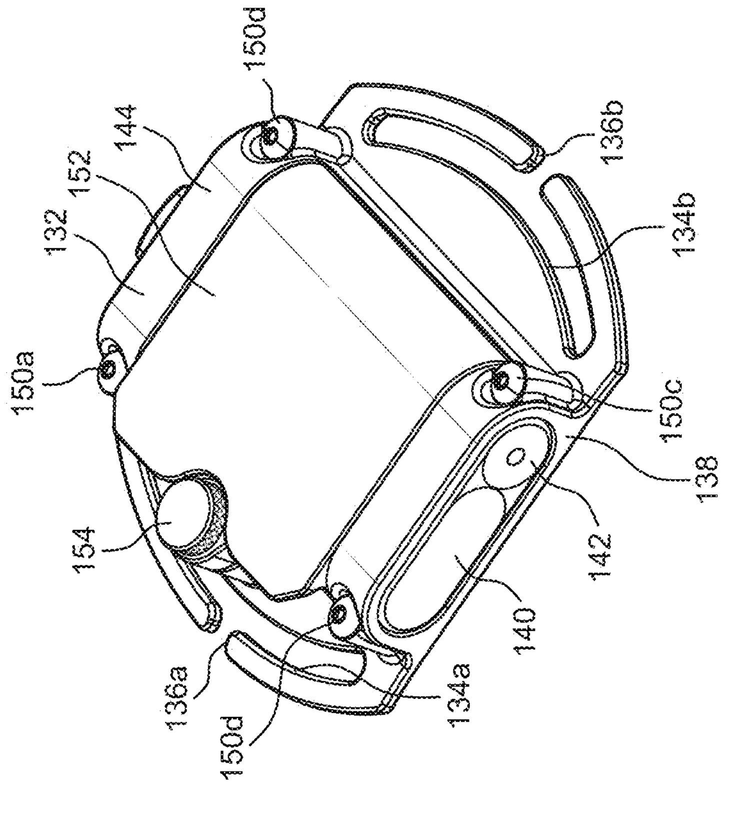
Figure 21:
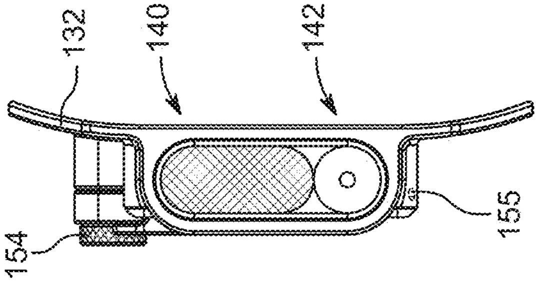
FIG. 21 is a second side view thereof.
Figure 20:
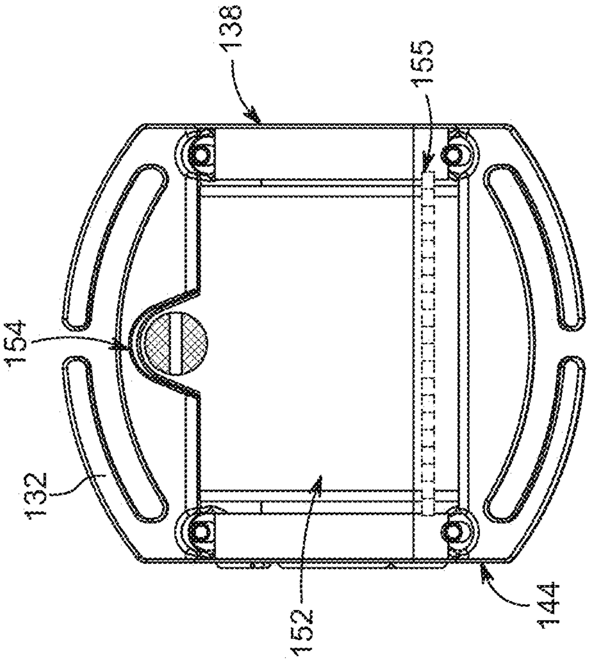
FIG. 20 is a rear view thereof.
Figure 19:
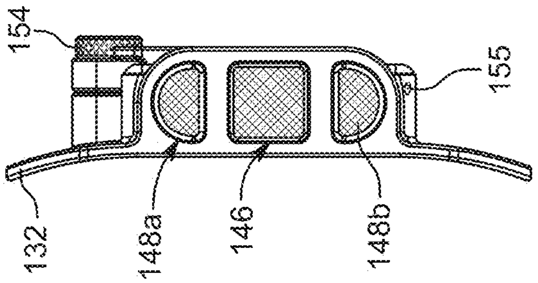
FIG. 19 is a first side view thereof.

A first embodiment of a lighting device 132—which will be described in further detail below—is shown attached to the strap 22 in FIG. 1. With reference to FIGS. 17 and 18, the lighting device 132 comprises strap slot **134*a* having gap 136*a* and strap slot 134*b* having gap 136*b*. The gaps 136*a*, 136*b* allow for the strap 22 to be releasably secured within the strap slots 134*a*, 134*b* such that the strap 22 is routed either atop or below the lighting device 132 to hold the lighting device 132 in place on the strap 22. FIG. 5 shows a second embodiment of a lighting device 50 that is attached to the strap 22 of the helmet attachment device 20 via a clip 52. It should be understood that any number of mechanisms could be used to attach any lighting device to the helmet attachment devices shown and discussed herein, including but not limited to various slots, clips, clamps, brackets, or fasteners. Once the lighting device 132 is attached to a helmet or other item, the arcuate curvature of the slots 134***a*, 134*b* allows for the lighting device 132 to be partially rotated to aim the lighting device 132 as desired.

Referring now to FIGS. 6-10, another embodiment of a helmet attachment device 64 according to the present disclosure will be described in detail. In this embodiment, the helmet attachment device 64 comprises a strap 66 and a pair of clips 80*a*,80*b*. In this embodiment, the strap 66 includes a fixed loop 70 at one end thereof and an adjustable loop 72 at the opposite end thereof. The length of the strap 66 is adjustable via the buckle 68 in a known manner.

In this embodiment, the helmet attachment device 64 is shown attached to a second type of helmet 54, i.e., a fireman's helmet. The helmet 54 has a first lateral side 56 including a first attachment portion 55 (which in this case is a portion of the brim thereof, which extends around the entire perimeter of the helmet 54) and a second lateral side 57 including a second attachment portion (which in this case is a separate portion of the brim 55).

The helmet 54 further comprises an apex 58, an identification surface 62 on the front side thereof (where fire company information is typically displayed), and a ridge 60 that extends forwardly between the apex 58 and the identification surface 62. In this embodiment, the helmet attachment device 64 is further provided with a strap holder 74. The strap holder 74 has a ridge support 76 that fits snugly onto the ridge 60 of the helmet 54 and a pair of strap slots 78*a*, 78*b* through which the strap 66 is routed. The strap holder 74 holds the strap 66 in the desired location on the ridge 60 of the helmet 54, near the apex 58, while minimizing the potential for damage to the strap 66. The strap holder 74 also assists in keeping the clips 80*a*, 80*b* relatively fixed in place along the brim 55, i.e., minimizes front-to-back sliding thereof.

In this embodiment, both of the clips 80*a*,80*b* are releasably attachable to the attachment portion (brim) 55 on, respectively, the first lateral side 56 and second lateral side 57 of the helmet 54. When both clips 80*a*, 80*b* are attached to the helmet 54 in this way, the strap 66 is routed over or near the apex 58 of the helmet 54, which allows for a lighting device (e.g., lighting device 132 or lighting device 50) to be attached to the strap 66 anywhere along the length of the strap 66, including in a location at or near the apex 58 of the helmet 54.

Figure 9:
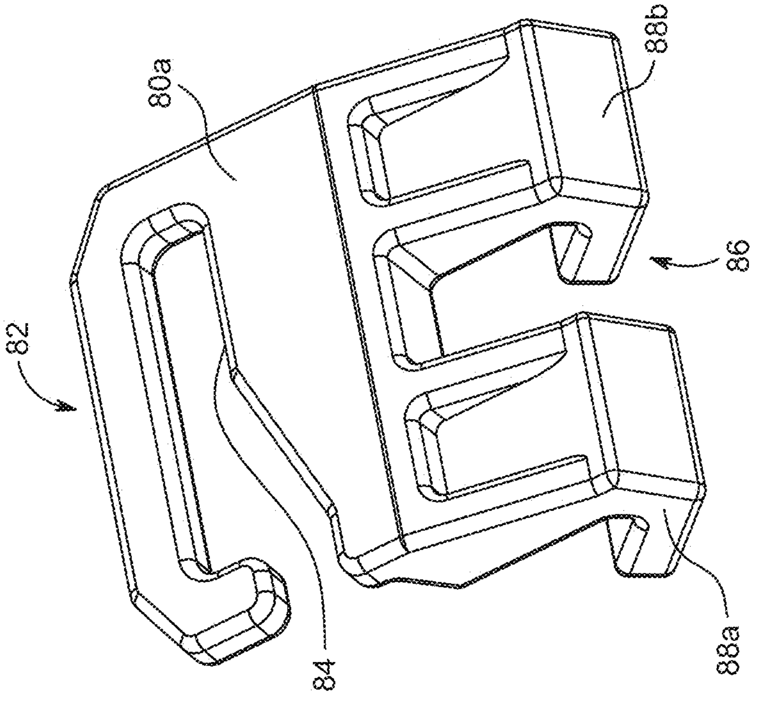

As best shown in FIGS. 9 and 10, the clip 80*a*—which should be understood to be identical to clip 80*b*—comprises an upper portion 82 including a strap slot 84 and a lower portion 86 including a pair of hooked portions 88*a*,88*b*. In this embodiment, the strap slot 84 has an open side to allow for sliding of either of the fixed loop 70 or the adjustable loop 72 of the strap 66 therein, so that the clip 80*a* can be quickly installed on or removed from the strap 66, for example to permit a different type of clip to be installed onto the strap 66, as will be further discussed below. In alternative embodiments, the clips 80*a*,80*b* could be permanently installed onto the strap 66 in a way that does not permit replacement of the clips 80*a*, 80*b* with other types of clips.

Referring back to FIGS. 9 and 10, in this embodiment the hooked portions 88*a*,88*b* are sized and shaped to releasably engage with the brim (attachment portion) 55 of the helmet 54 via the inside surfaces of the hooked portions 88*a*,88*b* hooking around and applying pressure to the brim 55 via the elastic, restorative forces that will be applied to the clips 80*a*, 80*b* by the strap 66. Installation of the clips 80*a*,80*b* onto the brim 55 occurs by stretching the strap 66 such that the clips 80*a*, 80*b* are aligned with the brim 55 on both lateral sides 56,57 and then releasing the clips 80*a*,80*b* in place, and removal occurs by stretching the strap 66 such that the clips 80*a*, 80*b* are no longer aligned with the brim 55 before the strap 66 is released.

Referring now to FIGS. 11-13, another embodiment of a helmet attachment device 100 according to the present disclosure will be described in detail. In this embodiment, the helmet attachment device 100 comprises a strap 102 and a pair of clips (only one clip, clip 106, is shown in the Figures). In this embodiment, the strap 102 includes two fixed loops (only one fixed loop, fixed loop 104, is shown in the Figures), and therefore the length of the strap 102 is fixed.

In this embodiment, the helmet attachment device 100 is shown attached to a third type of helmet 92, i.e., a military helmet of known type. The helmet 92 has a first lateral side 94 including a first attachment portion 98—which in this case is an accessory slot—and a second lateral side 95 including a second attachment portion, i.e., a second accessory slot that is identical to the accessory slot found on the first lateral side 94. The first attachment portion 98 (accessory slot) includes an opening 99 located towards the front side thereof. The helmet 92 further comprises an apex 93 and an accessory bracket 96 located on the front side thereof for holding additional accessories therefrom (for example a visor or night-vision goggles).

As best shown in FIGS. 12 and 13, the clip 106 comprises an upper portion 108 including a strap slot 110 and a lower portion 112 including a slot-engagement portion 114. In this embodiment, the clip 106 is releasably attachable to the attachment portion (accessory slot) 98 on the first lateral side 94 of the helmet 92 by placing the slot-engagement portion 114 into the opening 99 and then sliding it further into the accessory slot 98. Removal of the clip 106 from the accessory slot 98 occurs in a reverse manner. When clips (including clip 106) are attached to the helmet 92 in this way with the strap 102 attached thereto, the strap 102 is routed over or near the apex 93 of the helmet 92, which allows for a lighting device (e.g., lighting device 132 or lighting device 50) to be attached to the strap 102 anywhere along the length of the strap 102, including in a location at or near the apex 93 of the helmet 92.

In this embodiment, the strap slot 110 has an open side to allow for sliding of either of the fixed loops (e.g., fixed loop 104) therein, so that the clip 106 can be quickly installed on or removed from the strap 102, for example to permit a different type of clip to be installed onto the strap 102, as will be further discussed below. In alternative embodiments, the clips (including clip 106) could be permanently installed onto the strap 102 in a way that does not permit replacement of the clips (including clip 106) with other types of clips.

Figure 14:
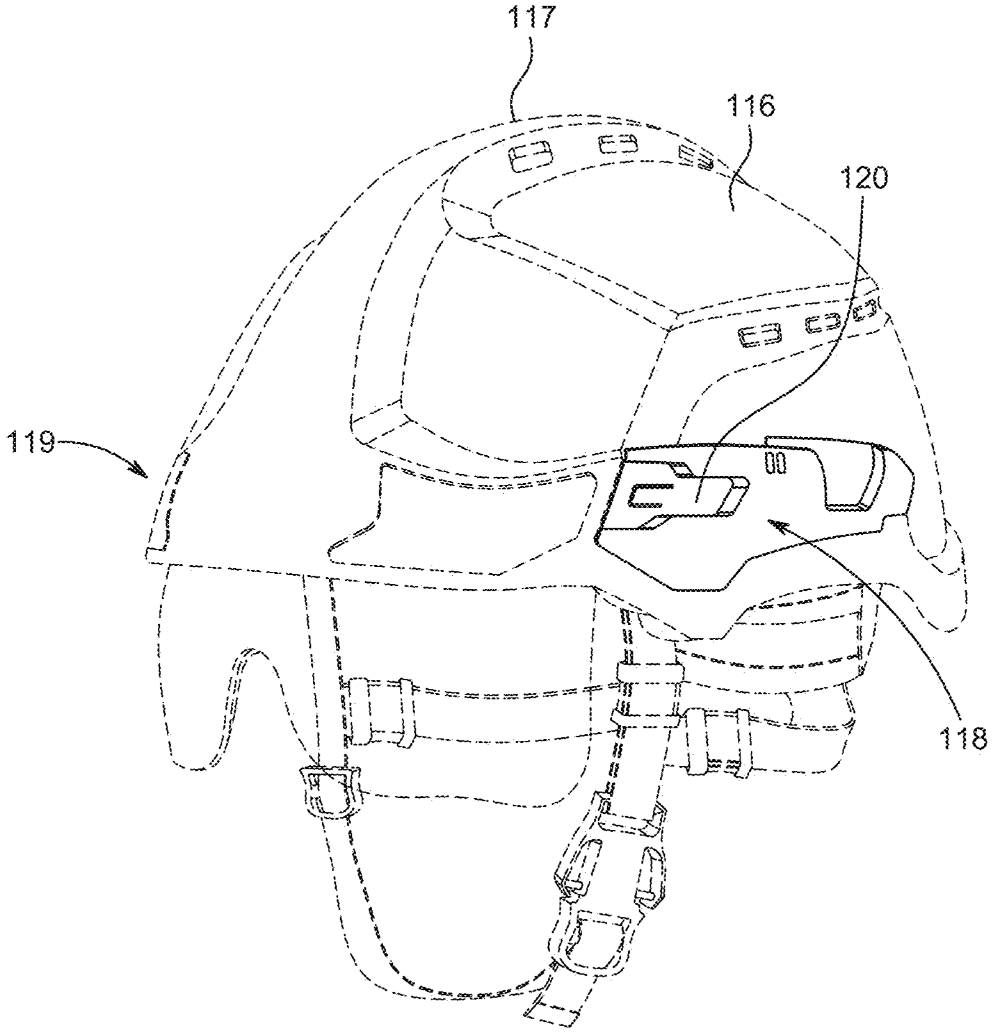
FIG. 14 is a perspective view of a fourth exemplary helmet to which an attachment device according to the present disclosure can be attached.

Referring now to FIG. 14, a fourth type of helmet 116, i.e., a known type of rescue helmet sold under the trademark MSA Gallet by Hobrand BV of The Netherlands, will be described in detail. The helmet has a first lateral side 118 including a first attachment portion 120—which in this case is an accessory slot—and a second lateral side 119 including a second attachment portion, i.e., a second accessory slot that is identical to the accessory slot found on the first lateral side 118. Various accessories may be releasably secured in the first attachment portion (accessory slot) 120, as would be understood by one having ordinary skill in the art. The helmet 116 further comprises an apex 117. For ease of discussion, only the first attachment portion/accessory slot 120 of the helmet 116 is shown in solid lines in FIG. 14.

Figure 16:
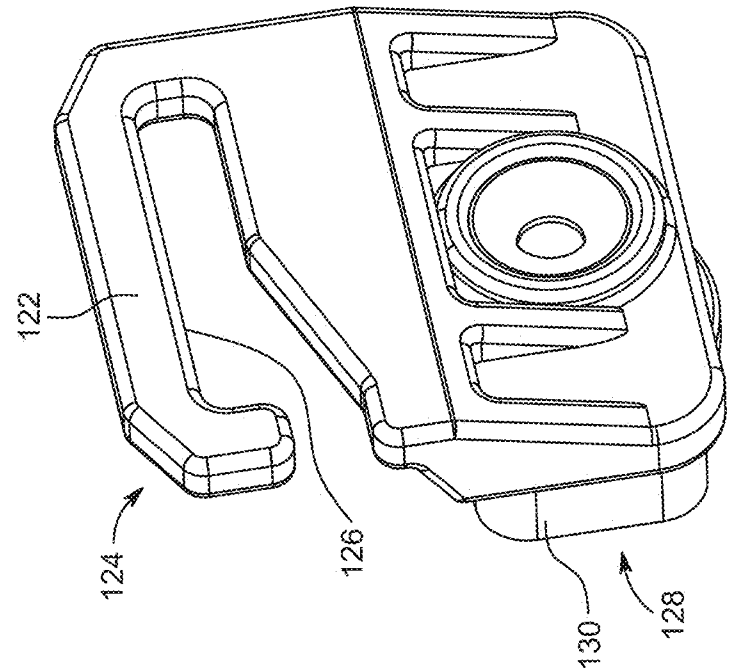
FIGS. 15 and 16 are perspective views of a fourth clip for an attachment device according to the present disclosure.
Figure 15:
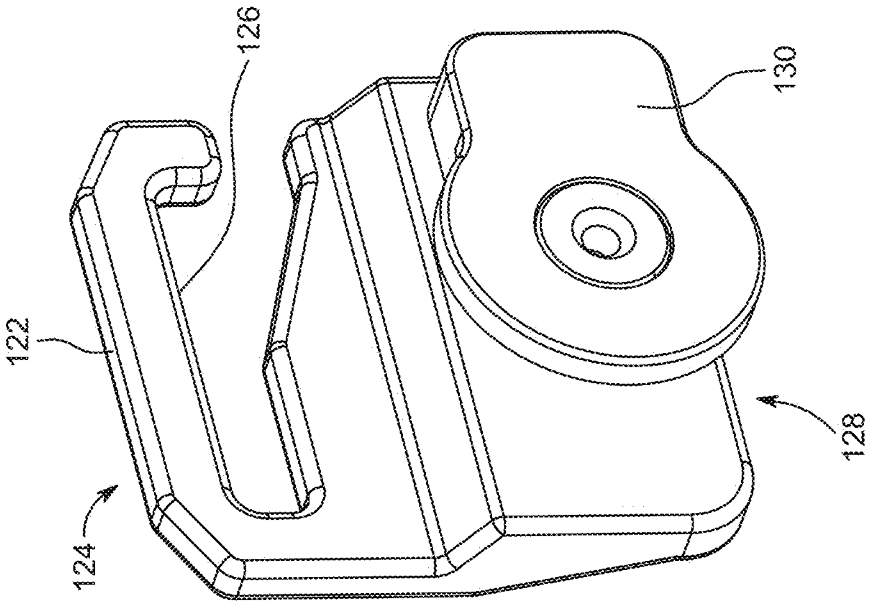

As shown in FIGS. 15 and 16, a clip 122 can be provided as part of a helmet attachment device or kit according to the present disclosure that will releasably engage with the attachment portion (accessory slot) 120 of the helmet 116. In this embodiment, the clip 122 comprises an upper portion 124 including a strap slot 126 and a lower portion 128 including a slot-engagement portion 130. The clip 122 is releasably attachable to the attachment portion (accessory slot) 120 on the first lateral side 118 of the helmet 116 by pressing the slot-engagement portion 130 downwardly into the attachment portion (accessory slot) 120. Removal of the clip 122 from the attachment portion (accessory slot) 120 occurs by pressing on a portion of the slot-engagement portion 130 from the inside of the helmet 116 and then pulling upwardly on the clip 122. When clips (including clip 122) are attached to the helmet 116 in this way with a strap (e.g., strap 22, strap 66, or strap 102) attached thereto, the strap is routed over or near the apex 117 of the helmet 116, which allows for a lighting device (e.g., lighting device 132 or lighting device 50) to be attached to the strap anywhere along the length thereof, including in a location at or near the apex 117 of the helmet 116.

FIGS. 17-21 show various images of the lighting device 132 shown in FIGS. 1 and 2. In addition to the strap slots **134*a*, 134*b* discussed above, the lighting device 132 comprises a front PCB cover 138 that contains a printed circuit board (PCB) that controls a flood lens 140 and spot lens 142 located on the front side of the lighting device 132, a battery door 152 which contains and conceals one or more batteries (e.g., Lithium rechargeable or one or more replaceable batteries) and which is held in place by a thumb screw 154, and a rear PCB cover 144 that contains a PCB that controls a button 146 and a pair of tail lights 148*a*, 148*b*. The button 146 can be used to switch between spot and flood light modes (i.e., via alternation between the flood lens 140 and the spot lens 142), change the intensity of those lights, and/or turn the tail lights 148*a*, 148*b* on and off. In some embodiments the tail lights 148*a*, 148*b* are constantly on when either of the spot lens 142 or the flood lens 140 is turned on, and in alternative embodiments the user may have the option whether to use the tail lights 148*a*, 148*b*. In some embodiments, the tail lights 148*a*, 148*b* emit a blue light, and are used for user location and identification from the rear in low-visibility (e.g., dark, smoky, and/or foggy) environments. As further shown in the schematic drawings of FIGS. 19-21, a hinge pin 155 for opening and closing the battery door 152 is routed through the battery door 152 and held in place by the front PCB cover 138 and rear PCB cover 144. Fasteners 150*a*, 150*b* are used to hold the rear PCB cover 144 in place and fasteners 150*c*, 150*d* are used to hold the front PCB cover 138** in place.

Figure 6:
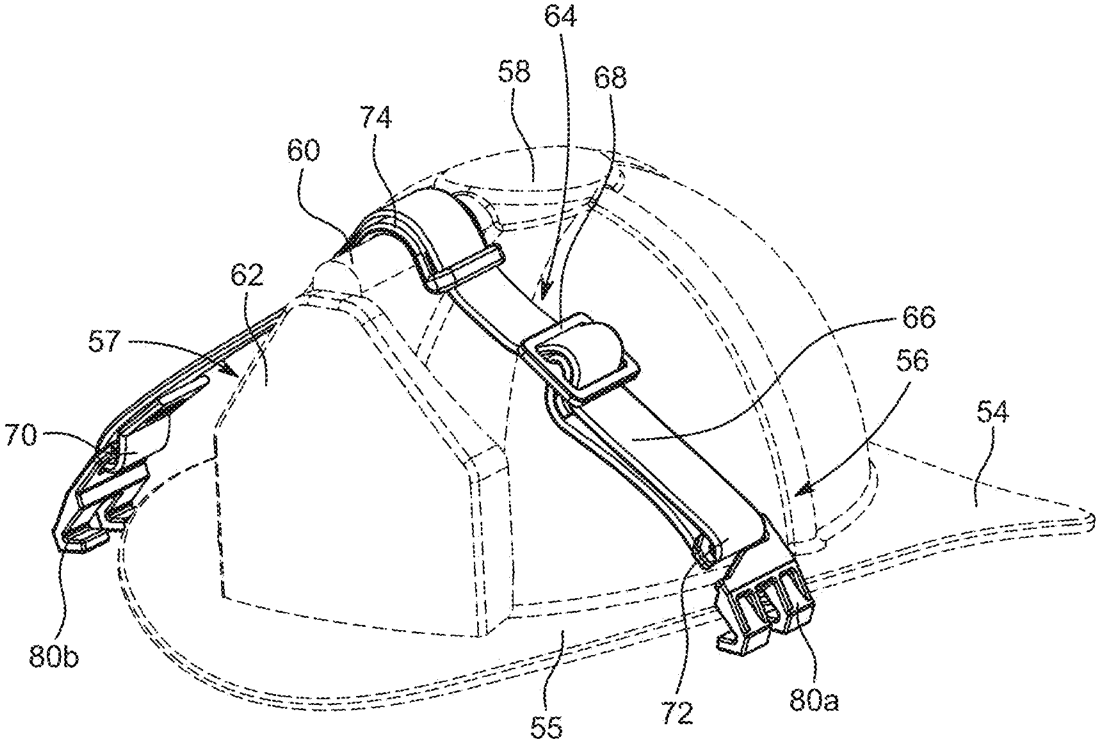
FIG. 6 is a perspective view of a third helmet attachment device according to the present disclosure, shown in an attached configuration with respect to a second exemplary helmet.
Figure 7:
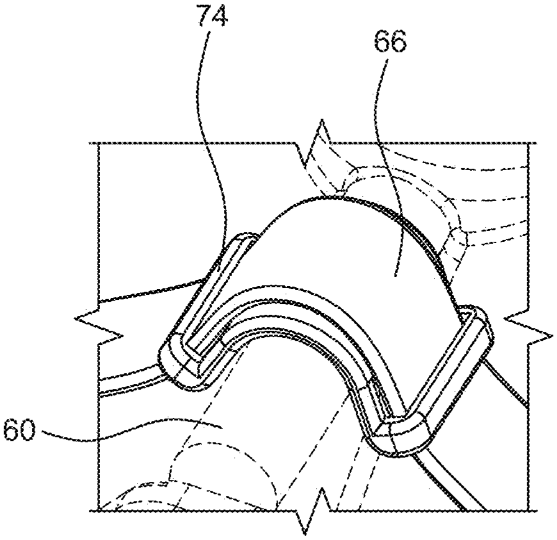
FIGS. 7 and 8 are perspective views of a strap holder component of the third helmet attachment device.
Figure 8:
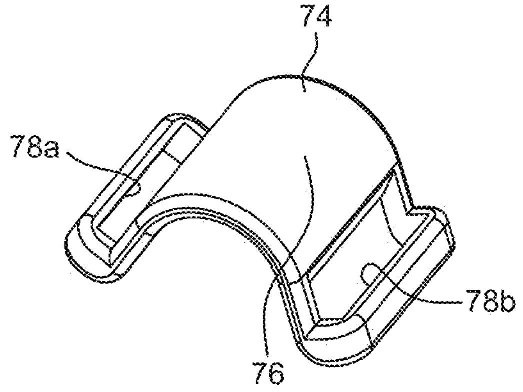
Figure 22:
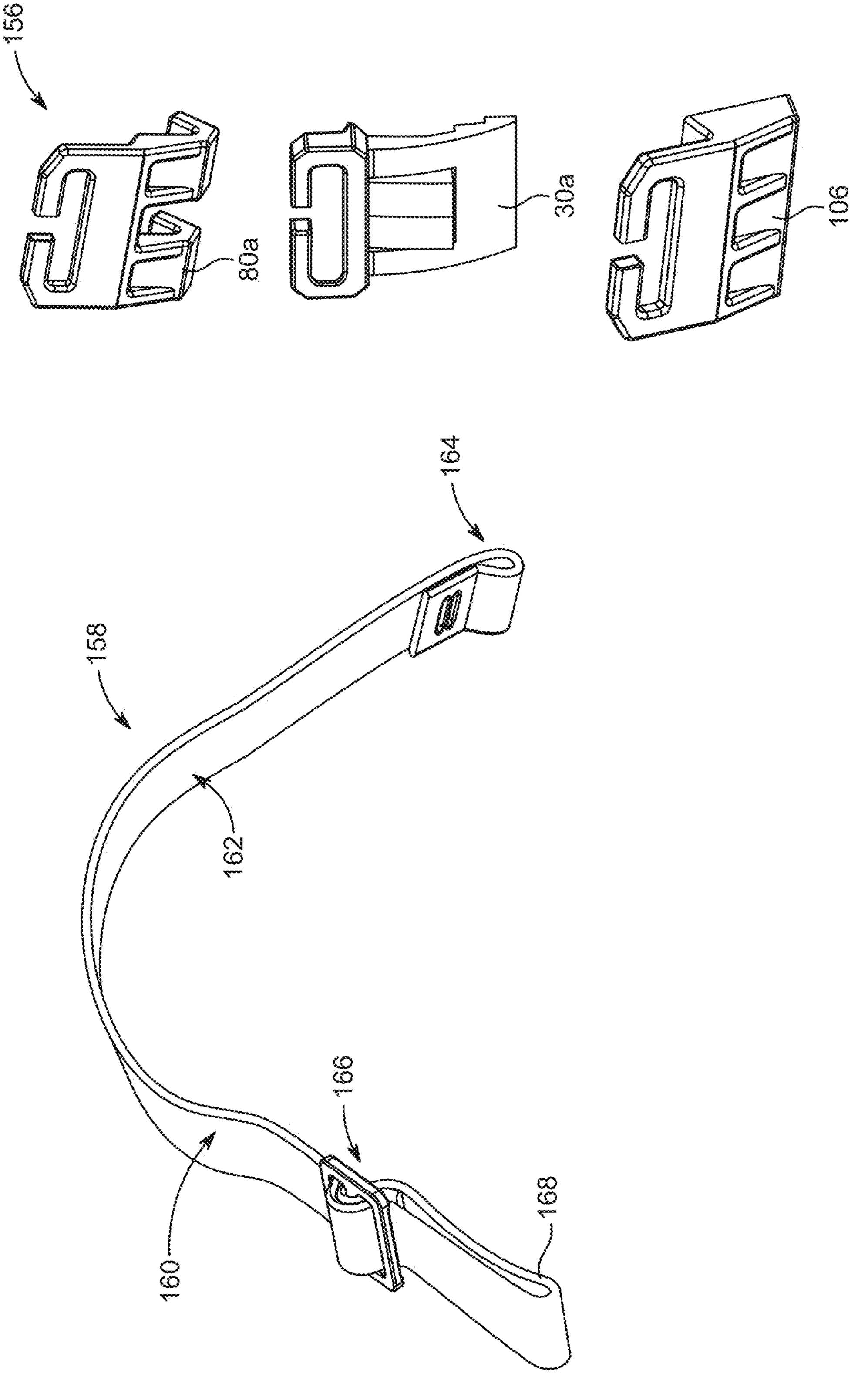
FIG. 22 is a schematic view of a kit for attachment to a helmet comprising a strap and a plurality of clips according to the present disclosure.

With reference now to the schematic diagram of FIG. 22, in some iterations the helmet attachment device according to the present disclosure can be provided as a kit 156 comprising one or more straps and multiple pairs of clips, for example: a pair of "over the brim" clips **80*a*, 80*b* as shown in FIGS. 6, 9, and 10; a pair of "accessory slot" clips 30*a*,30*b* as shown in FIGS. 1-5; a pair of "accessory rail" clips 106 as shown in FIGS. 11-13; and/or a pair of "accessory slot" clips 122 as shown in FIGS. 15 and 16. The various pairs of clips may be alternatively attached to the strap to allow for attachment to multiple different types of helmet out of the box. The kit 156 may further include a fixed length strap (such as strap 22 of FIGS. 1, 2, and 5 or strap 102 of FIG. 11), an adjustable length strap (such as strap 66 of FIGS. 6 and 7 or strap 158 of FIG. 22), two fixed length straps of different lengths, or both of a fixed length strap and an adjustable length strap. As further shown in FIG. 22, the strap 158 may be comprised of an elastic fabric material, have an exterior side 160 that is uncoated (or covered in a silicone material), and have an interior side 162 that is covered in a silicone material for increased gripping on helmet materials. The strap 158 may further comprise a "tri-glide" buckle 166 of known type for length adjustment and two loops: an adjustable length loop 168 and a fixed loop 164**, which in this embodiment is sewn. Kits according to the present disclosure could also be sold with one or more units of any of the lighting devices discussed herein, or any other lighting devices that are attachable to a strap.

Figure 23:
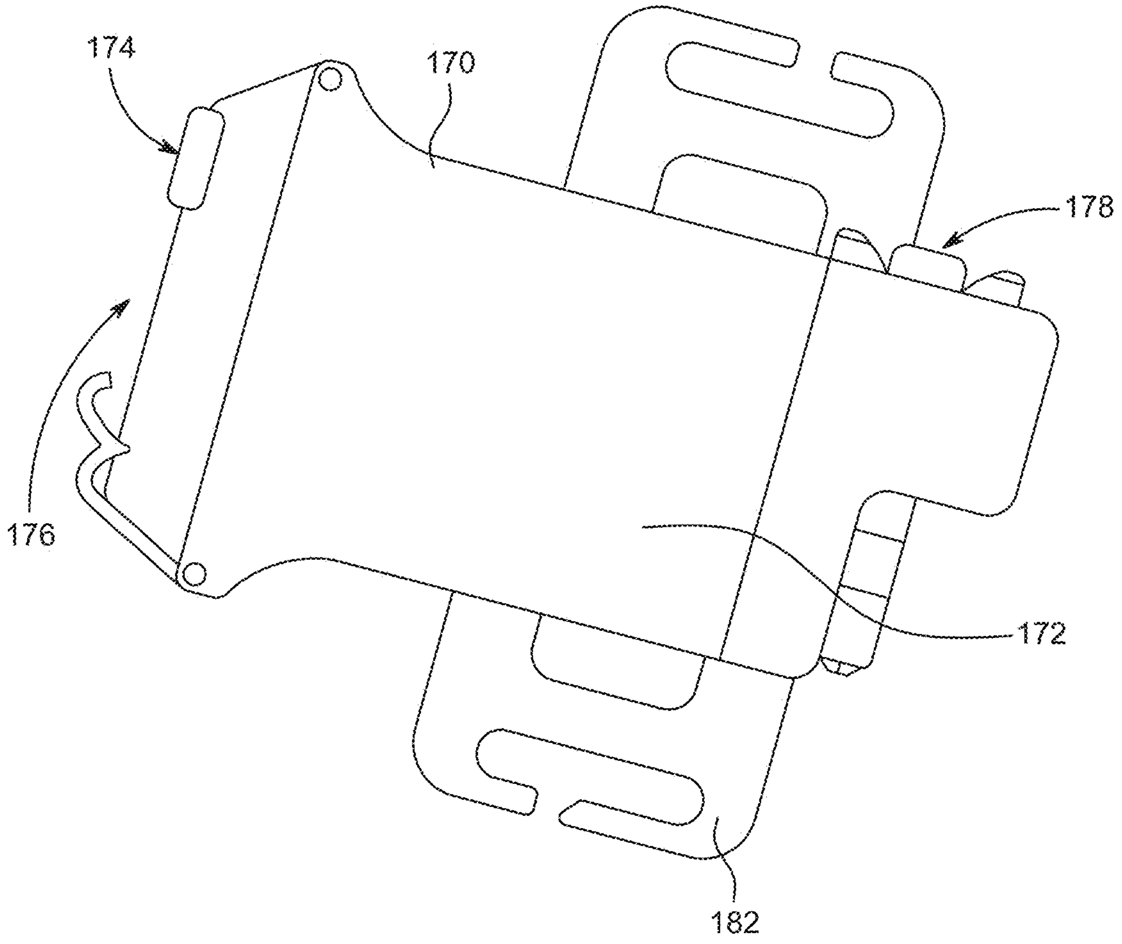
FIG. 23 is a side view of a lighting device and clip for attachment to a helmet, according to the present disclosure.
Figure 24:
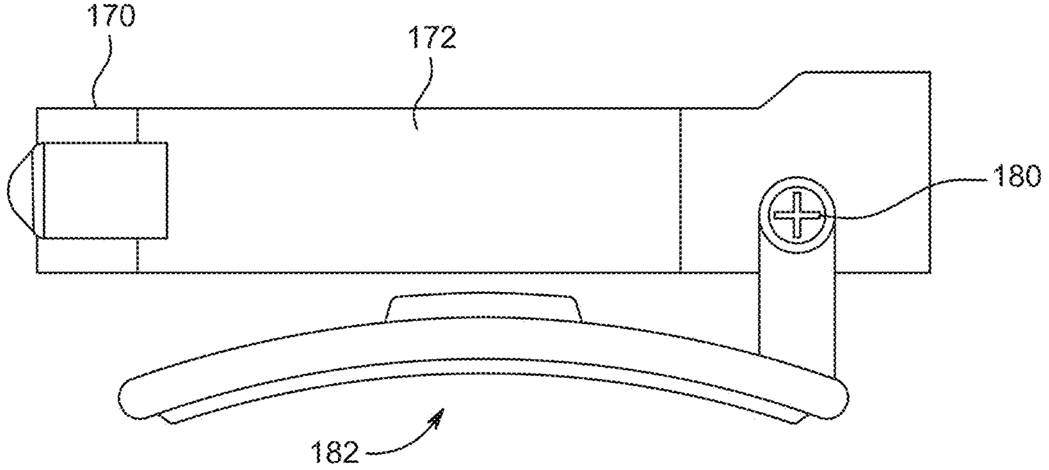
FIG. 24 is a bottom view thereof.

An additional embodiment of a lighting device 170 that may be sold together with one or more strap(s) and/or pair(s) of clips according to the present disclosure is shown schematically in FIGS. 23 and 24. In this embodiment, the lighting device 170 comprises a body 172 (which in this embodiment may be made of extruded aluminum) attached to a clip 182 that is adapted to attach to a strap or, alternatively, directly to a hat. In this embodiment the body 172 is attached to the clip 182 via a tilt hinge 180 that allows for the user to make fine windage or angle adjustments to the body 172 to achieve the desired angle for the light that is emitted therefrom. Such a hinge may also be provided in the lighting device 50 of FIG. 5. Turning back to the lighting device of FIGS. 23 and 24, the body 172 further comprises a button 178 that acts as an ON/OFF and mode selection switch, a battery door with latch 176 for concealing one or more rechargeable or replaceable batteries, and a tail light 174 (which in this embodiment may also be blue color for low-light user visibility from the rear).

Figure 25:
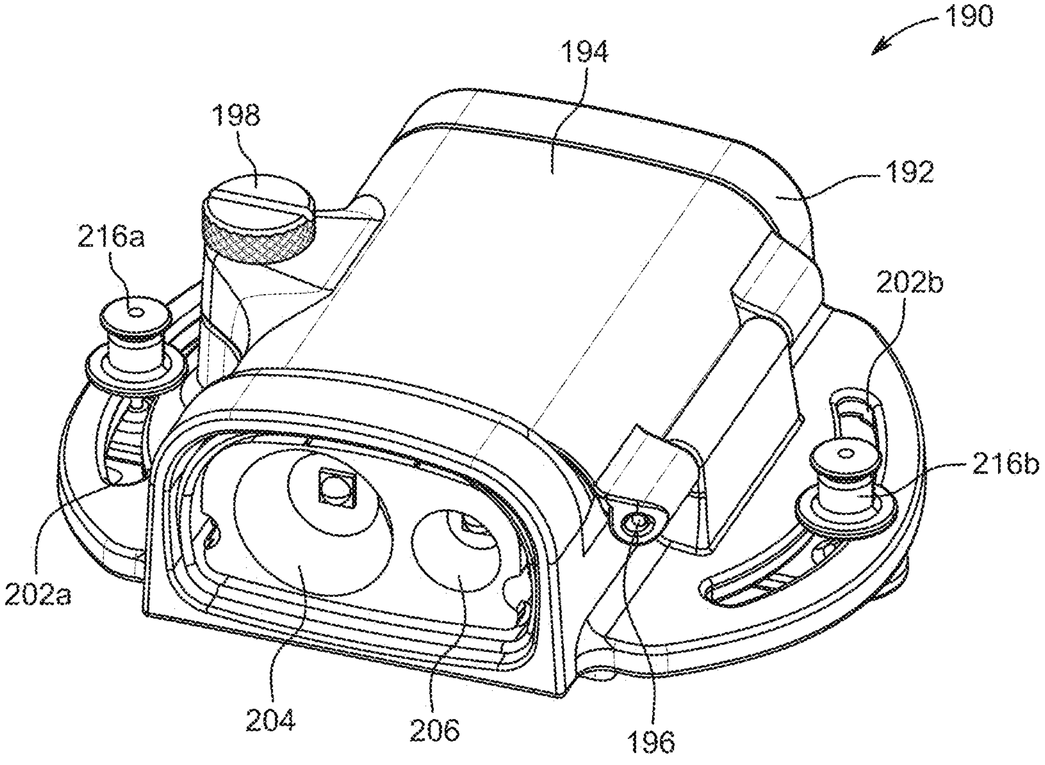
FIG. 25 shows a front and top perspective view of another embodiment of a lighting device according to the present disclosure.
Figure 26:
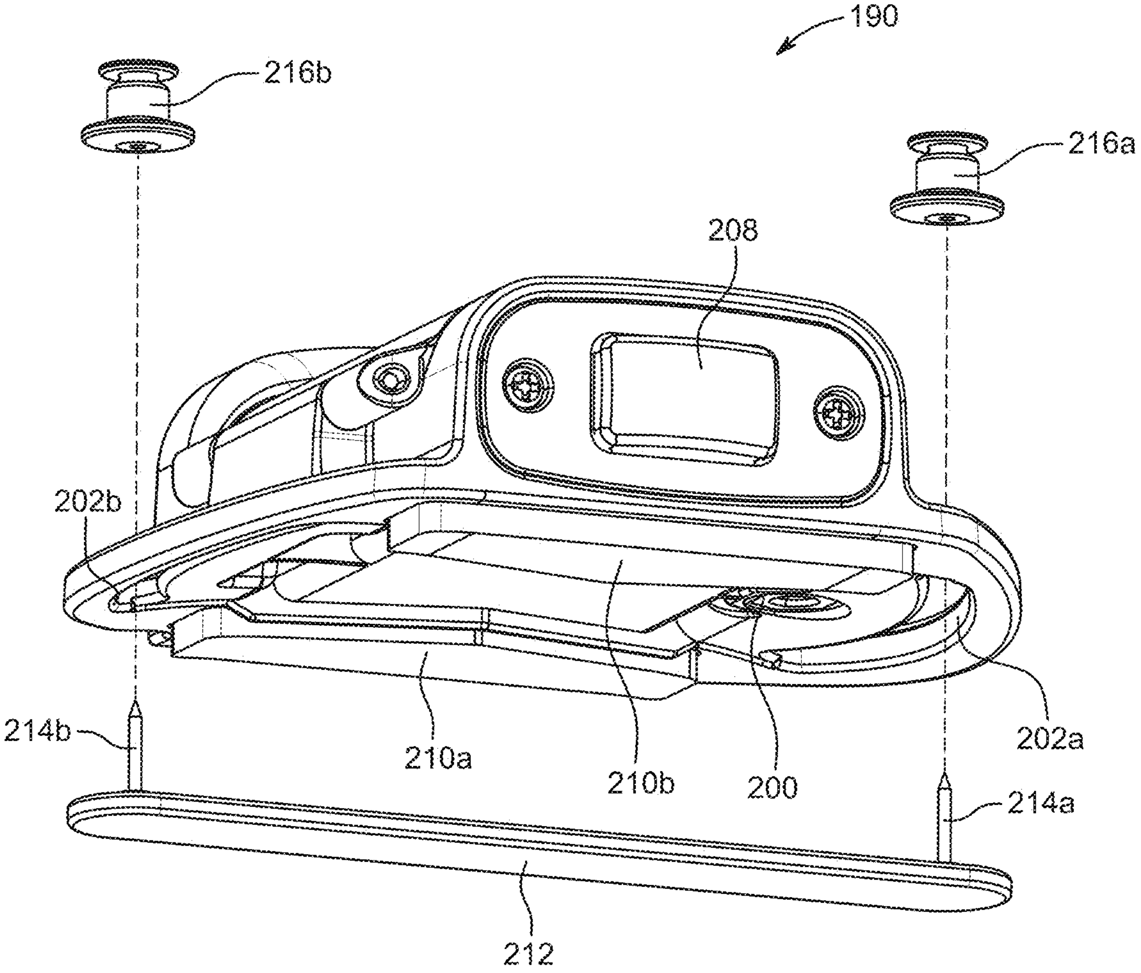
FIG. 26 shows a rear, bottom, partially-exploded perspective view thereof.

With reference now to FIGS. 25 and 26, another embodiment of a lighting device 190 will be described in detail, with FIG. 25 showing a front, top perspective view and FIG. 26 showing a rear, bottom, partially-exploded perspective view thereof. In this embodiment, the lighting device 190 uses disposable batteries (e.g., 3×"AAA"-size batteries) and comprises a body 192 that conceals the PCB (not shown) and a battery door 194 that is attached to the body 192 via a hinge pin 196 to conceal a battery compartment (not shown) where the disposable batteries are contained. The battery door 194 is held closed via a thumb screw 198 that threadedly engages with a nut 200 that is rotationally fixed on the underside of the body 192. The battery door 194 is thus openable by rotating the thumb screw 198 in an opposite direction until it disengages from the nut 200 such that the battery door 194 can be lifted away from the body 192.

Similar to other embodiments discussed above, the lighting device 190 comprises a pair of slots **202*a*,202*b* through which one or more strap(s) can be routed for holding the lighting device 190 in a desired location on an article of headwear, and similarly comprises a flood lens 204, a spot lens 206, and a button 208 that is used to switch between flood and spot modes and toggle the lighting device 190 between ON and OFF states. In this embodiment, the lighting device 190 further comprises a hat strap 212 that is used—as an alternative to the use of an attachment strap—to attach the lighting device 190 to a soft hat (e.g., a baseball-style cap) or any other item (e.g., an article of clothing or fabric) that is able to be punctured by the pins 214***a*,214*b* located on the hat strap 212. As shown in FIG. 26, the hat strap 212 is fitted underneath the soft hat, the pins 214*a*,214*b* puncture through the hat, each pass through a respective one of the slots 202*a*, 202*b*, and are each capped with a respective pin cover 216*a*,216*b* that holds the lighting device 190 in place in a desired location while protecting the user from receiving an accidental injury from the pins 214*a*,214*b*. The underside of the body 192 further comprises pads 210*a*,210*b* to ensure user comfort. Moreover, once the lighting device 190 is attached to a hat or other item, the arcuate curvature of the slots 202*a*,202 allows for the lighting device 190 to be partially rotated to aim the lighting device 190 as desired.

Figure 27:
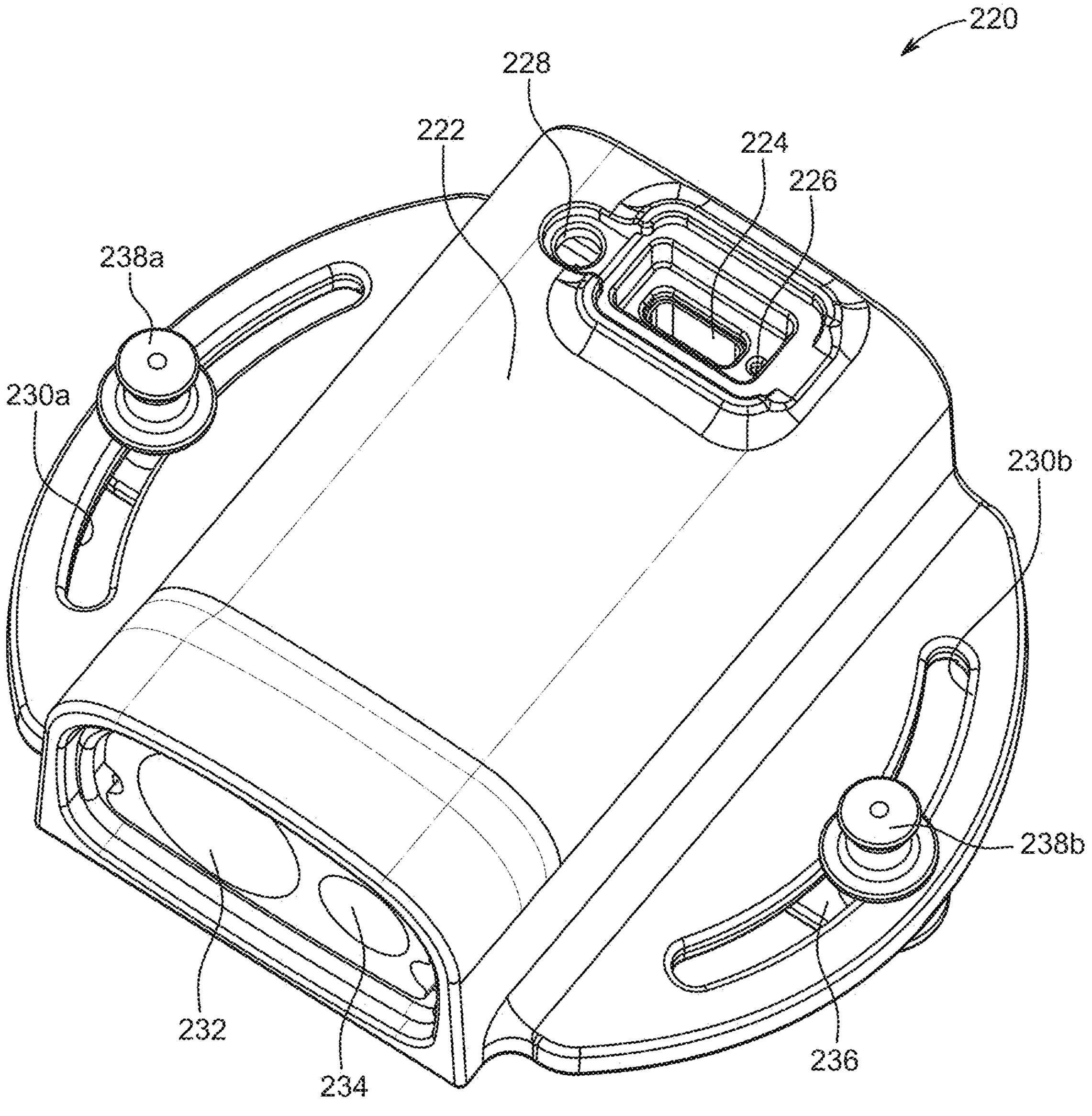
FIG. 27 shows a perspective view of yet another embodiment of a lighting device according to the present disclosure.

With reference to FIG. 27, another embodiment of a lighting device 220 will be described in detail. In this embodiment, the lighting device 220 uses a rechargeable battery and comprises a body 222 that conceals the PCB (not shown). In this embodiment, the lighting device 220 comprises a charging port 224 (e.g., a USB-C port), a light 226 that indicates charging status, and a cover (omitted from view in FIG. 27 for ease of discussion) which is attached to the body 222 via hole 228, the cover being used to cover the charging port 224 and protect it from, e.g., dirt, fluids, and damage. Similar to other embodiments discussed above, the lighting device 220 comprises a pair of slots 230*a*,230*b* through which one or more strap(s) can be routed for holding the lighting device 220 in a desired location on an article of headwear, and similarly comprises a flood lens 232, a spot lens 234, and a button on its rear side (not shown) that is used to switch between flood and spot modes and toggle the lighting device 220 between ON and OFF states. In this embodiment, the lighting device 220 further comprises a hat strap 236 and pin covers 238*a*238*b* that are structurally and functionally identical to the hat strap 212 used in the embodiment of FIGS. 25 and 26.

Applicant is further in possession of embodiments of the present disclosure in which any version of the lighting device can be affixed to an article of headwear, clothing, or other item via the use of hook-and-loop or other reclosable types of fastener, for example the Dual Lock™ reclosable fastener patch produced by 3M Company of Saint Paul, Minnesota, U.S.A. In any of the present embodiments, the lighting device(s) can be provided with the fastening mechanism either already pre-installed on the rear side thereof or provided separately within the package, and/or such a fastening mechanism could be included separately as part of a kit of parts including one or more strap(s), hook(s), and/or other attachment accessories as discussed herein.

It should be understood that any of the lighting devices according to the present disclosure could be provided with product specification such that it meets Class 1 Division 1 (C1D1) standards under the U.S. National Electric Code, meaning that it is safe to use in the continuous or frequent presence of flammable vapors or gases under normal operating conditions (i.e., is explosion proof in these conditions).

Figure 28:
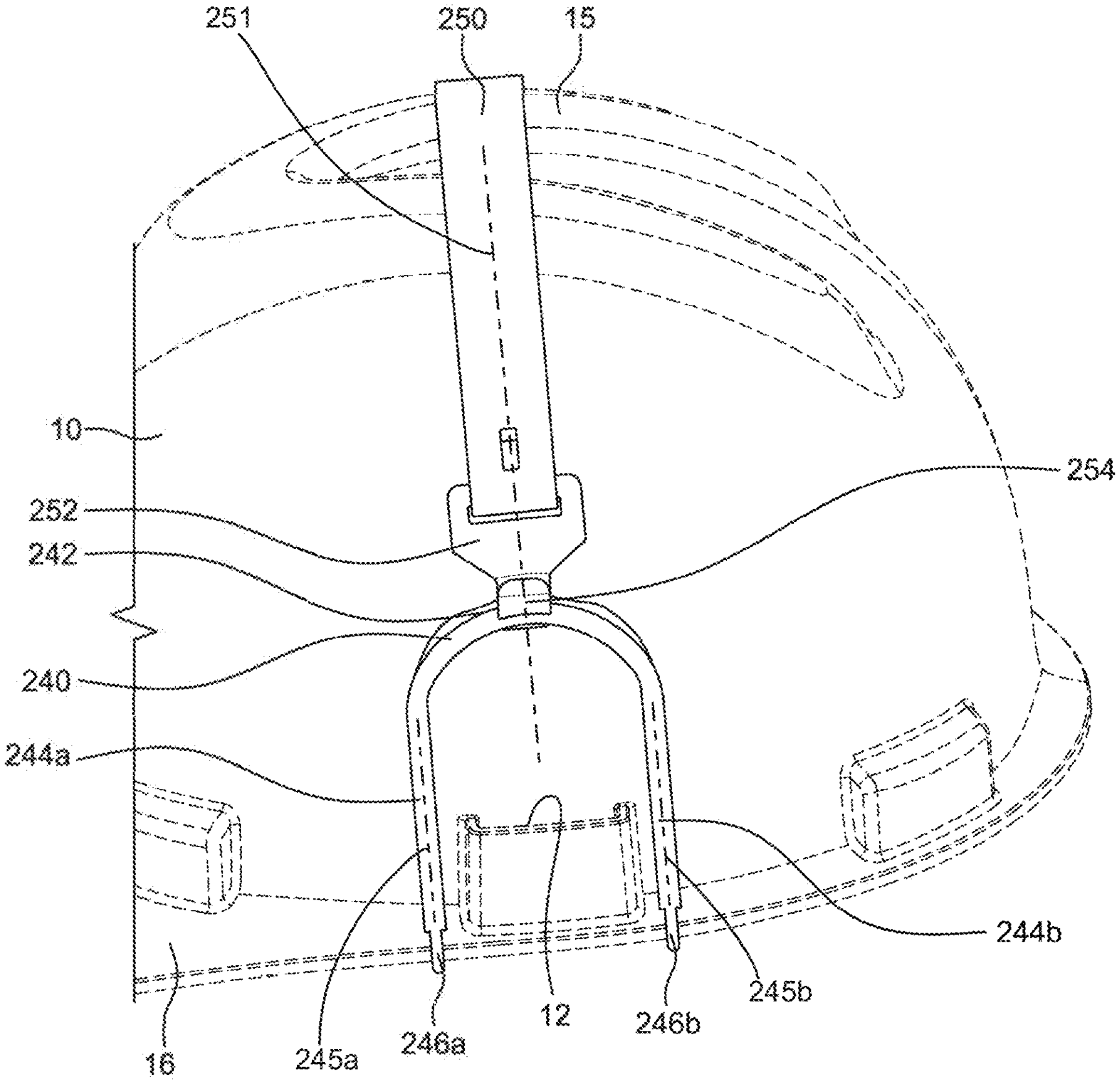
FIG. 28 shows another embodiment of an attachment device according to the present disclosure, shown attached to the exemplary helmet of FIGS. 1 and 2.

FIG. 28 shows another embodiment of an accessory for an attachment device comprising a pair of adapters (only one adapter 240 is shown in FIG. 28), each of which comprises a central portion 242 and a pair of arms 244*a*,244*b* that extend from the central portion 242 to form an overall "U" shape so that the arms 244*a*,244*b* are located in front of and behind the attachment portion 12, respectively. A respective hook 246*a*,246*b* is located at the end of each arm 244*a*,244*b*, the hooks 246*a*,246*b* being adapted to clamp around the brim of a helmet (e.g., brim 16 of hard hat 10). The adapter 240 includes a pair of wire form hoops to straddle around ear protection (or other accessory (-ies)) that may be attached to the helmet 10 via attachment portion 12 on one or both sides of the helmet 10. In this configuration, a strap (e.g., strap 250) extends over the apex 15 of the helmet 10 and is attached at both ends to clips (e.g., clip 252 having hooked portion 254), the hooked portion 254 of the clip 252 being adapted to attach to the central portion 242 of the adapter 240. The strap 250 has an axis 251 when attached across the apex 15 of the helmet 10 and the arms 244*a*,244*b* likewise have respective axes 245*a*,245*b*, and the axes 245*a*,245*b* are non-aligned with the axis 251 of the strap 250 to create "offset" attachment positions relative to the helmet 10 and its attachment portion 12. If no ear protection (or other accessory) is in use at either or both of the attachment portions (e.g., attachment portion 12), the adapter(s) 240 can be omitted and the strap hook(s) (e.g., hooked portion 254) can be attached directly to the brim 16 of the helmet 10. It should be understood that a pair of adapters 240 could, in the alternative, be provided permanently attached to a strap.

Figure 29:
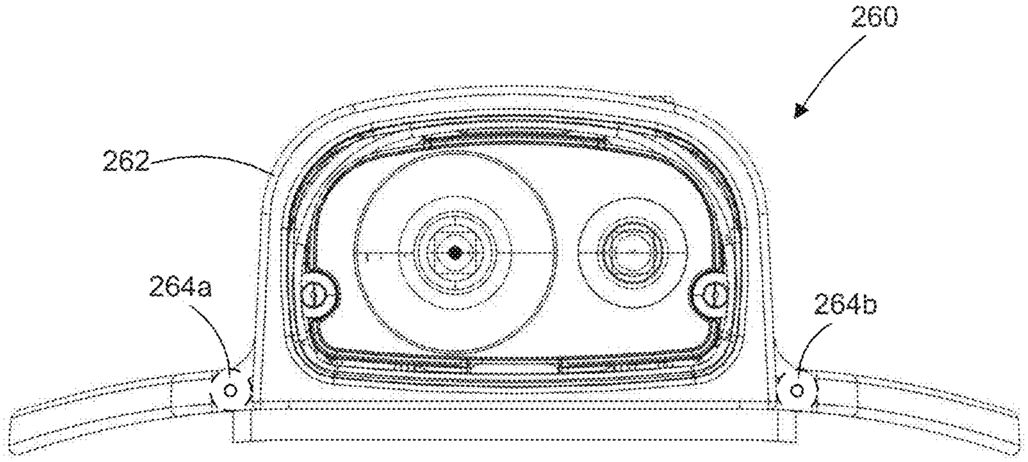
FIG. 29 shows a front view of another embodiment of a lighting device according to the present disclosure.
Figure 30:
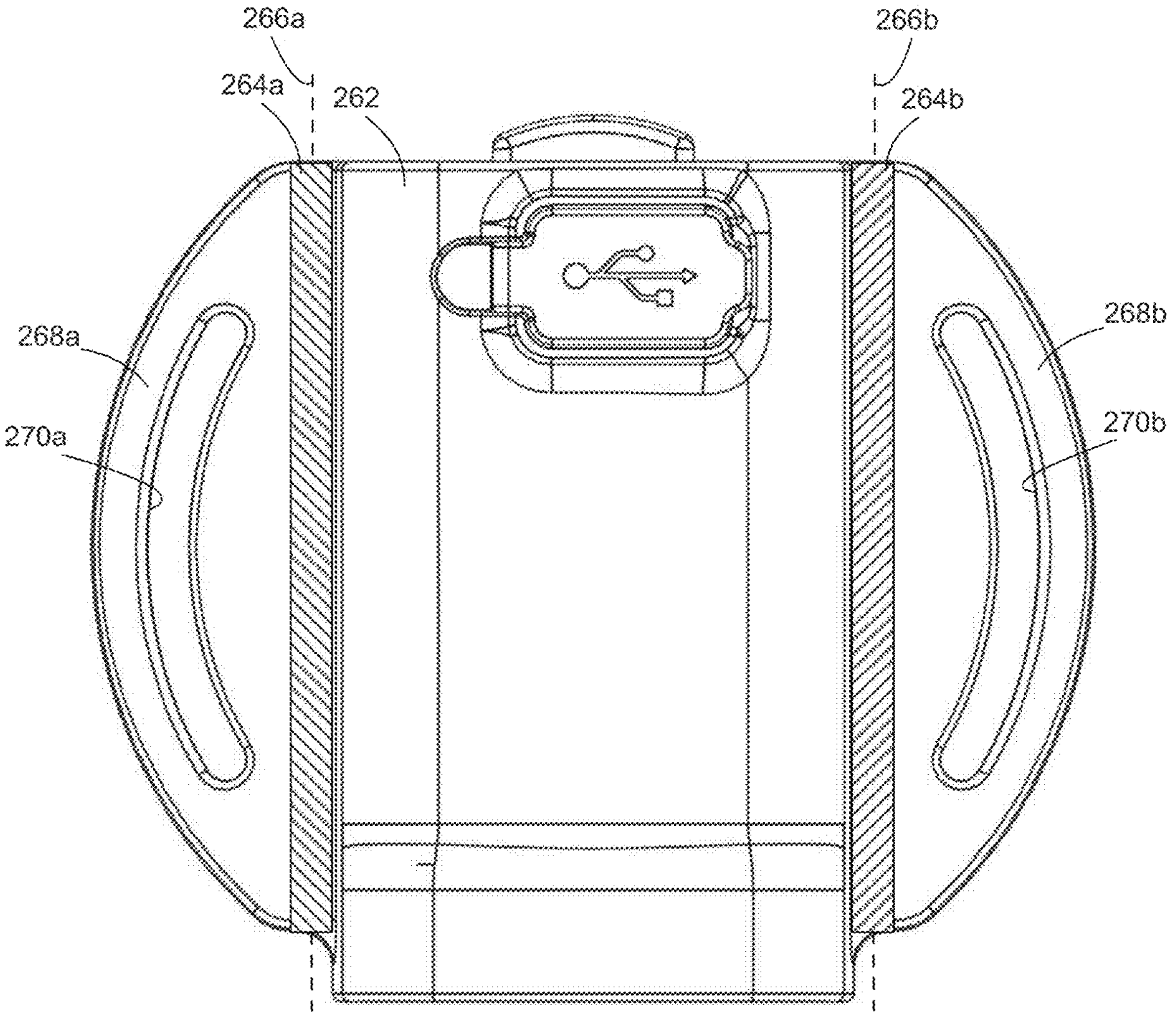
FIG. 30 is a top view thereof.

FIGS. 29 and 30 show another embodiment of a lighting device 260 according to the present disclosure that could be used along with any of the strap(s), clip(s), or other accessories disclosed herein. It should be understood that the present embodiment of a lighting device is substantially similar to the embodiment of a lighting device 220 shown in FIG. 27, and therefore that not all parts are labeled in FIGS. 29 and 30 for ease of discussion. Moreover, it should be understood that the modifications discussed below shown in the embodiment of FIGS. 29 and 30 could be adapted for use in any of the embodiments of a lighting device shown and described herein.

In this embodiment, the lighting device 260 comprises a body 262 and a pair of hinges 264*a*,264*b*—which are shown schematically in FIGS. 29 and 30—that each rotatably attach a respective one of a pair of side portions 268*a*, 268*b* to the body 262 about a respective one of a pair of axes 266*a*,266*b*. It should be understood that any suitable type of hinge mechanism could be used for the hinges 264*a*,264*b*. Each of the side portions 268*a*,268*b* includes a respective slot 270*a*,270*b* for passage of a strap or other supporting mechanism as has been discussed above. In this embodiment, the freedom to adjust the angle of the side portions 268*a*,268*b* relative to the body 262 about the hinges 264*a*, 264*b* allows for the lighting device 260 to better conform to the curvature of a helmet, a user's head, or another irregular surface to which the lighting device 260 might be attached.

FIGS. 31-36 show another embodiment of a helmet attachment device 300 for a safety helmet, such as the safety helmet 10. The attachment device 300 can be part of an attachment system that includes a lighting device 302. In some examples, the lighting device used in the helmet attachment device 300 can be similar to, have similar components as, or be substantially the same as other lighting devices, such as those described herein. However, other details of the lighting device 302 will be described below.

Figure 31:
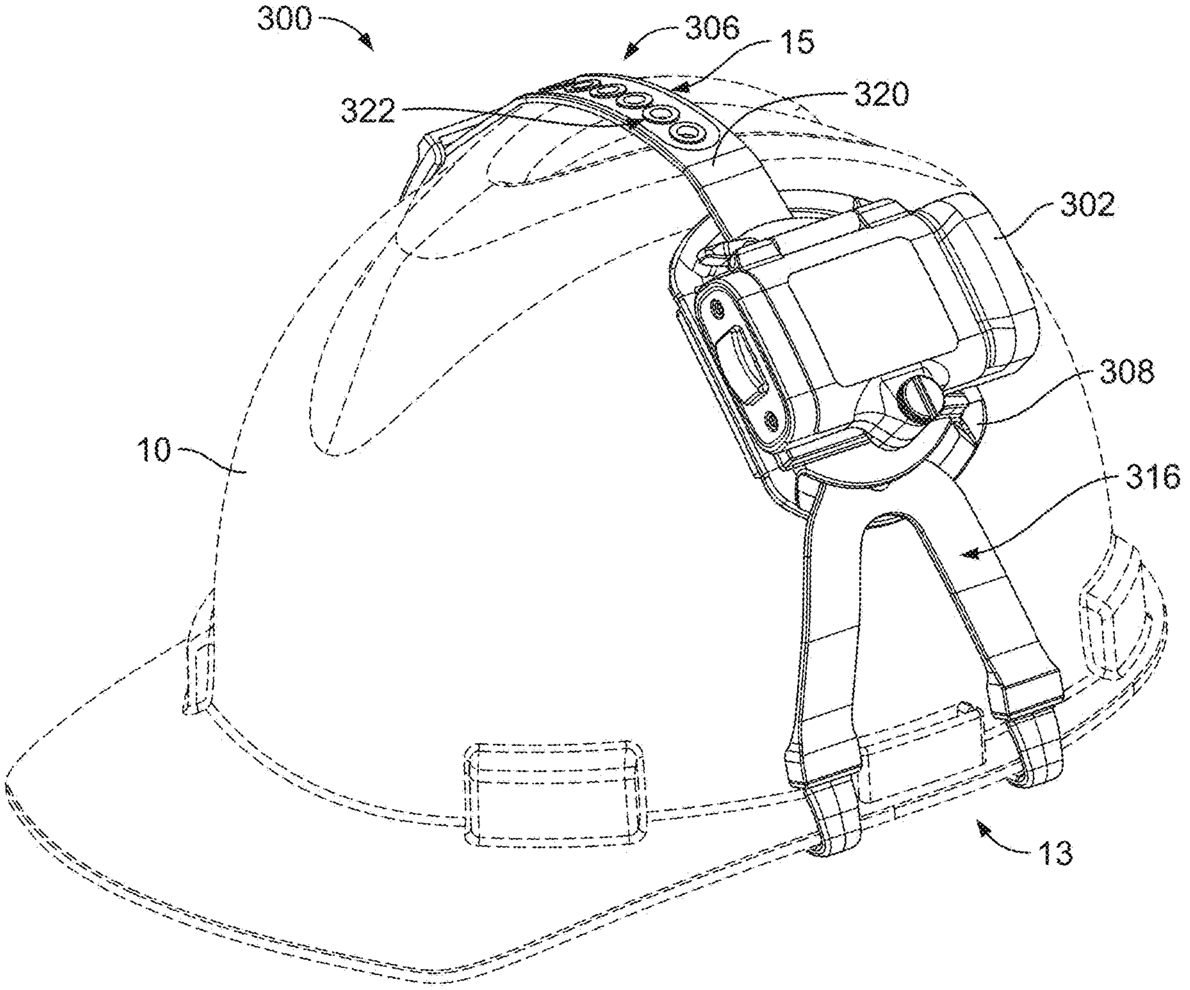
FIG. 31 shows a front perspective view of an attachment system according to an embodiment of the present disclosure.
Figure 32:
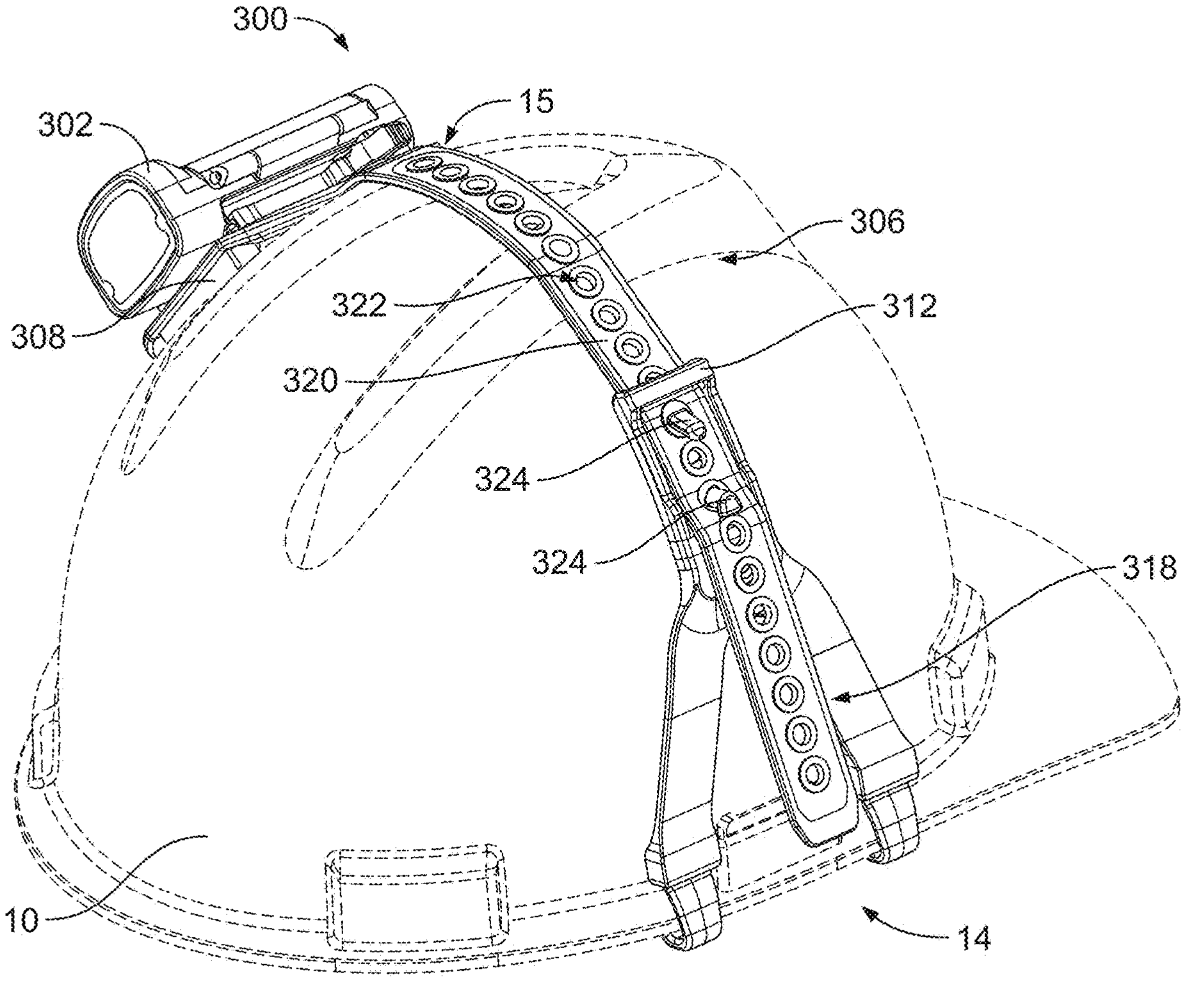
FIG. 32 shows a rear perspective view of the attachment system of FIG. 31.

The helmet attachment device 300 includes a strap (e.g., a strap system 306) and a mounting base 308. The strap system 306 can secure the mounting base 308 to the safety helmet 10 and the mounting base 308 can secure the lighting device 302 to the strap system 306. As shown in FIGS. 31 and 32, the strap system 306 extends from the first lateral side 13 of the safety helmet 10 to the second lateral side 14 of the safety helmet 10. The strap system 306 can extend over, or at least adjacent to, the apex 15 of the safety helmet 10.

The helmet attachment device 300 can secure the lighting device 302 to the safety helmet 10 near the first lateral side 13 and laterally offset from the apex 15, as shown in FIG. 31.

The placement of the mounting base 308 on the safety helmet 10 shown in FIGS. 31 and 32 is by way of example, and in other examples, the mounting base 308 may be disposed at other locations along the strap system 306. In some embodiments, the mounting base 308 may be selectively slidable along the strap system 306 so that the lateral position of the lighting device 302 may be adjusted before or after installation. As shown in FIG. 32, the strap system 306 can include an adjuster 312 so that the strap system 306 can be tightened across the safety helmet 10.

Figure 33:
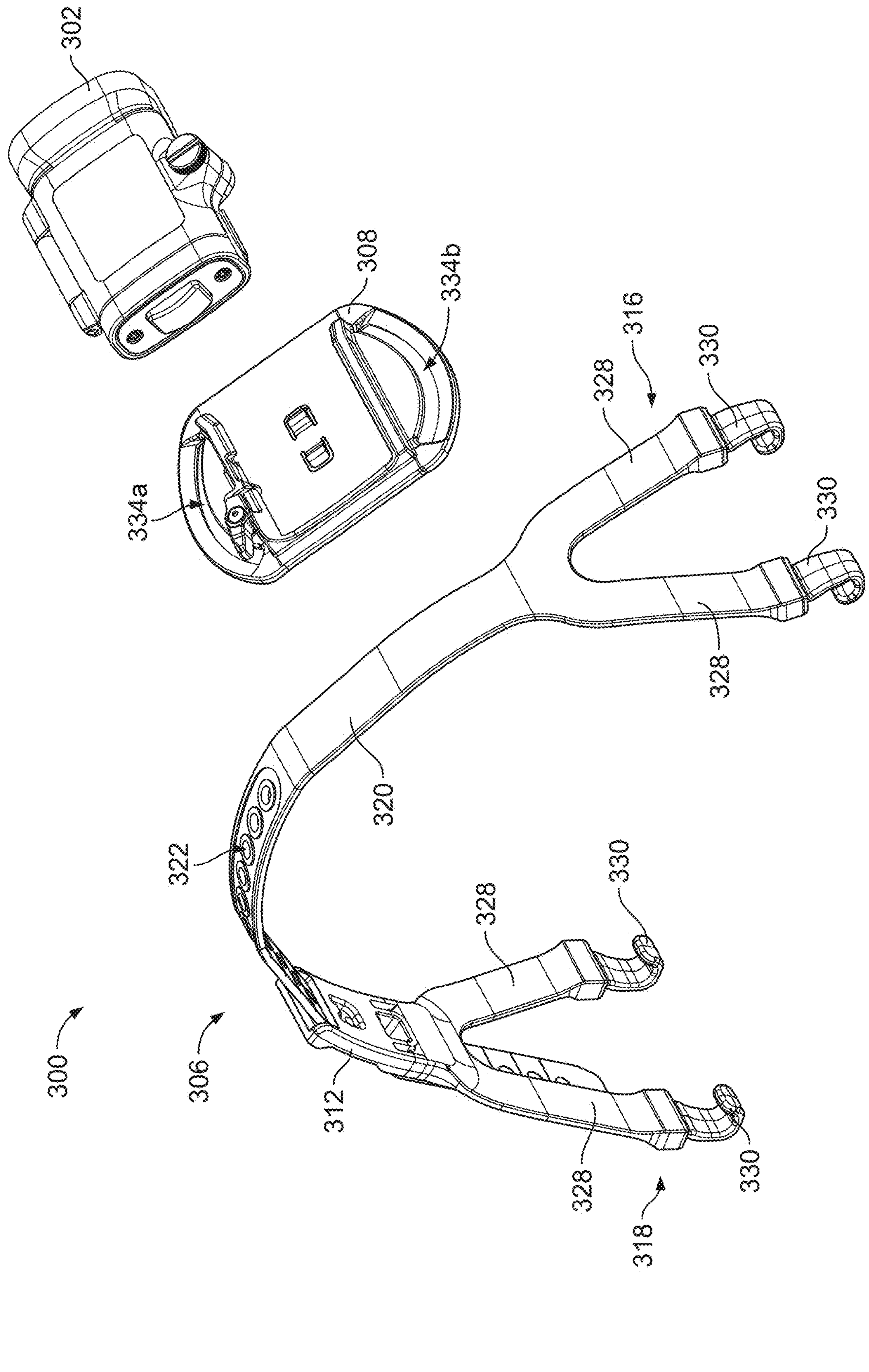
FIG. 33 shows an exploded view of the attachment system of FIG. 31.

FIG. 33 shows a partially exploded view of the strap system 306, including the mounting base 308 and a strap assembly of the strap system 306. The strap system 306 includes a first lateral attachment portion 316 that is configured to be secured to the first lateral side 13 of the safety helmet and a second lateral attachment portion 318 that is configured to be secured to the second lateral side 14. The first lateral attachment portion 316 is connected to a strap body 320 that is configured to extend from the first lateral side 13 of the safety helmet over the apex 15. In some embodiments, the first lateral attachment portion 316 and the strap body 320 may be integrally formed as a single unitary body. The strap body 320 can include a plurality of holes 322 (see also FIG. 32). The second lateral attachment portion 318 is connected to the adjuster 312 which includes securement pins 324.

In the illustrated example (e.g., FIG. 32), the adjuster 312 includes two securement pins 324. However, in other embodiments, more or fewer pins 324 are possible. The securement pins 324 are configured to extend through corresponding holes 322 of the strap body 320. In some embodiments, the securement pins 324 can include a lip or otherwise slightly downward angle (with respect to the orientation shown in FIG. 32) to help secure the strap body 320, particularly against removal when the strap system 306 is in tension over the safety helmet 10. To release the strap system 306 (i.e., disconnect the strap body 320 from the adjuster 312), a user can pull downward on a distal end of the strap body 320 that lies adjacent to the second lateral attachment portion 318 to disengage the securement pins 324 from the holes 322.

As shown in FIG. 33, each of the first and second lateral attachment portions 316, 318 include a pair of arms 328 each having a helmet engaging clip 330. Thus, the clips 330 can be attached to respective first and second ends of the strap system 306 via the arms 328. Each of the helmet engaging clips 330 are configured to secure the respective lateral attachment portion 316, 318 to the respective lateral side 13, 14 of the safety helmet 10. The clips 330 may be configured as press-fit or snap on clips. In other embodiments, the clips 330 may be configured as tension clips so that the attachment portions 316, 318 are secured to the safety helmet 10 when the strap system 306 is in tension and the adjuster 312 is secured to the strap body 320. Thus, the clips 330 are specially adapted to attached to respective first and second attachment portions of the helmet 10 at the respective sides 13, 14. The pair of arms 328 generally form a U-shape or Y-shape geometry of the lateral attachment portions 316, 318.

As shown in FIGS. 31 and 32, the U-shape or Y-shape geometry of the lateral attachment portions 316, 318 provide dual attachment points on each lateral side 13, 14 of the helmet 10. Furthermore, the geometry of the lateral attachment portions 316, 318 provides a gap or space between the pair of arms 328 so that the arms 328 straddle attachment slots 34 of the helmet 10. This can allow for other auxiliary attachments to the helmet 10 at the attachment slots 34. For example, ear protection (e.g., ear muffs) can be attached to the helmet 10 at the lateral sides 12, 13 without engaging or interfering with the helmet attachment device 300. That is, advantageously, the helmet attachment device 300 provides an attachment for the lighting device 302 without impeding or restricting other conventional attachments to the helmet 10. Other advantages of the attachment device 300 includes attaching the lighting device 302 at one of the two lateral sides 13, 14 near (e.g., adjacent to) the apex so that a brim of the helmet 10 does not interfere or block light from the lighting device 302.

With continued reference to FIGS. 31-33, as described above, the mounting base 308 is configured to be secured to the strap system 306 at the strap body 320. In the illustrated embodiment, the mounting base 308 is disposed along the portion of the strap body 320 does not include holes 322. However, in other embodiments, the plurality of holes 322 can be disposed along additional or alternative portions of the strap body 320. The mounting base 308 can be secured to the strap body 320 (e.g., at the portion without holes 322 in FIG. 33) to secure the lighting device 302 to the strap system 306. When the mounting base 308 is secured to the system 306, the strap body 320 can be threaded through (e.g., extend through) first and second slots 334 of the mounting base 308.

Figure 34:
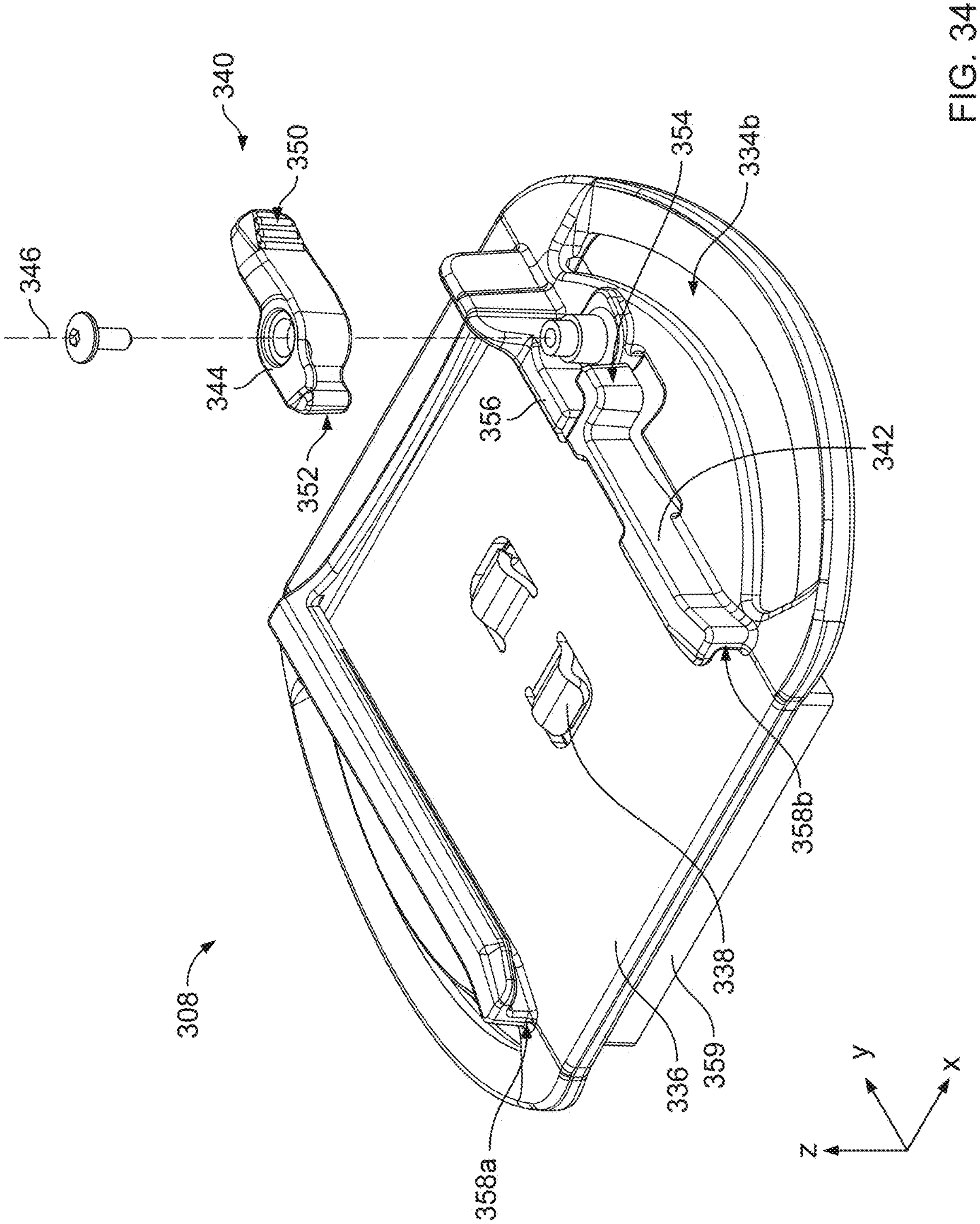
FIG. 34 shows an exploded view of a mounting base of the attachment system of FIG. 31.

With reference now to FIG. 34, the mounting base 308 includes the first and second slots 334, a mounting surface 336 having a bias member 338, and a retention system 340. In general, the retention system 340 can be configured as a quick-release retention system for releasably securing the lighting device 302 to the mounting base 308. The retention system 340 includes a retention arm 342 and a release lever 344. The release lever 344 is pivotally coupled to the body of the mounting base 308 so that the release lever can pivot about an axis 346. The release lever 344 includes a user engaging portion 350 and a lever engaging portion 352. When assembled, the lever engaging portion 352 is disposed between a distal end 354 of the retention arm 342 and a side wall 356 of the mounting base 308. In use, a user can engage (e.g., push inward) the user engaging portion 350 to cause the release lever 344 to pivot about the axis 346. As the release lever 344 pivots, the retention arm 342 is urged outward at the distal end 354. In the illustrated embodiment, the retention arm 342 is integrally formed with the body of the mounting base 308 and is configured as a flexible member that is biased inward (e.g., toward the mounting surface 336) to retain the lighting device 302 or other auxiliary component that can be secured to the safety helmet 10 via the helmet attachment device 300.

The mounting base 308 also includes base tracks 358 that extend along the lateral sides of the mounting surface 356. The base tracks 358 include an overhang that is configured to engage or retain a corresponding track of the lighting device 302, or other auxiliary component, to constrain the lighting device 302 or auxiliary component relative to the mounting base 308. That is, the overhang of the base tracks 358 can constrain the lighting device 302 in the z-direction. The base tracks 358 also extend orthogonally from the mounting surface 336, which can constrain the lighting device 302, or other auxiliary component, relative to the mounting base 308 in the lateral direction across the mounting base 308 (i.e., the x-direction). Finally, a locking engagement of the release lever 344 with the lighting device 302, or other auxiliary component, constrains the device 302 relative to the mounting base 308 in a sliding direction (i.e., the y-direction), which is perpendicular to the lateral direction and the axis 346.

Still referring to FIG. 34, the mounting base 308 includes a pair of base members 359, though only one of the two base members 359 are visible in FIG. 34. The base members 359 can extend laterally across the bottom of the body of the mounting base 308 and are configured to engage an outer surface of the helmet 10 when the strap system 306 and mounting base 308 are installed on the helmet 10. In some embodiments, the mounting base 308 can include more or fewer base members 359 than the illustrated embodiment. In some embodiments, the base members 359 can act as skids or runners beneath the mounting base 308 to facilitate controlled sliding of the mounting base 308 along the helmet 10. In other embodiments, the base members 359 can include geometry or material properties that prevent or reduce movement between the mounting base 308 and the helmet 10 to help secure the mounting base 308 laterally on the helmet 10. For example, the base members 359 can include a rubber material that discourages sliding between the mounting base 308 and the helmet 10.

Figure 35:
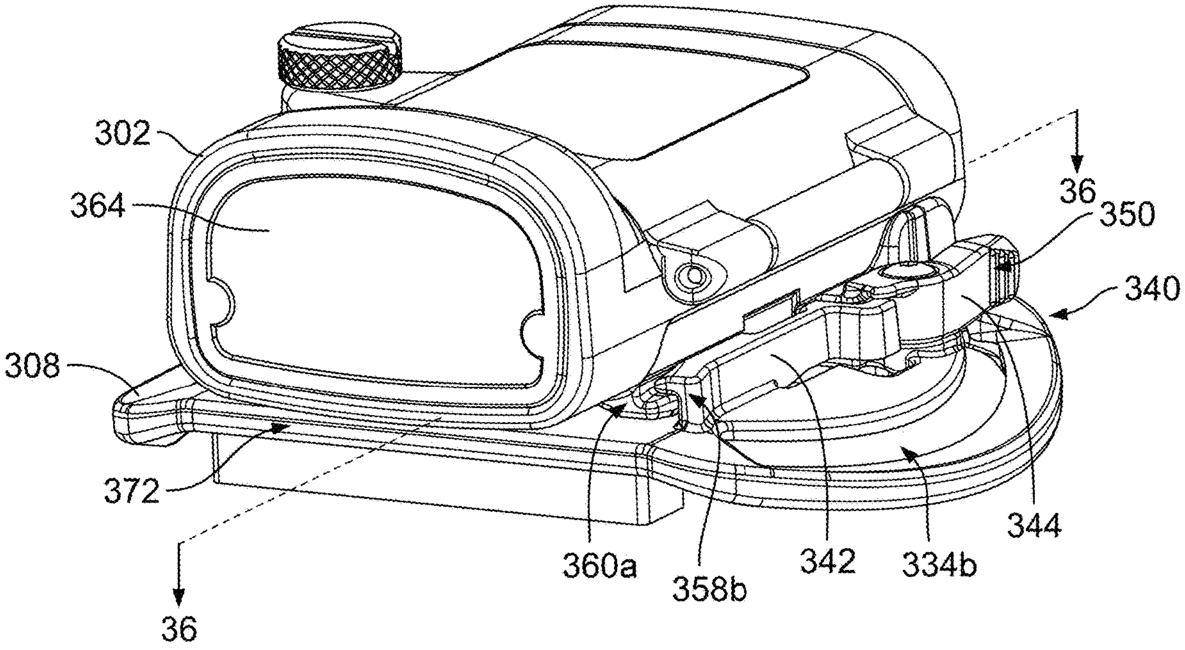
FIG. 35 shows a perspective view of the mounting base and a lighting device of FIG. 31.

FIG. 35 shows the lighting device 302 secured to and retained by the mounting base 308. The lighting device 308 includes lateral tracks 360 (though only one side of the lateral track 360 is visible in FIG. 35) that slidably and lockingly engage the base tracks 358. In the illustrated embodiment, the lateral tracks 360 of the lighting device 302 are symmetric so that the lighting device 302 can be secured to the mounting base 308 in two different orientations. For example, shown in FIG. 35, a lens 364 of the lighting device 302 is generally facing left (with respect to the orientation shown in FIG. 35). The lateral tracks 360 of the lighting device 302 are configured so that the lighting device 302 can be rotated 180 degrees (i.e., about a vertical axis) so that the lens 364 would be facing right (again, with respect to the orientation shown in FIG. 35). In use, this translates to a lighting device 302 that can be mounted to a safety helmet 10 so that light shines optionally in front or behind a wearer, depending on the chosen orientation of the lighting device 302 secured to the mounting base 308.

Figure 36:
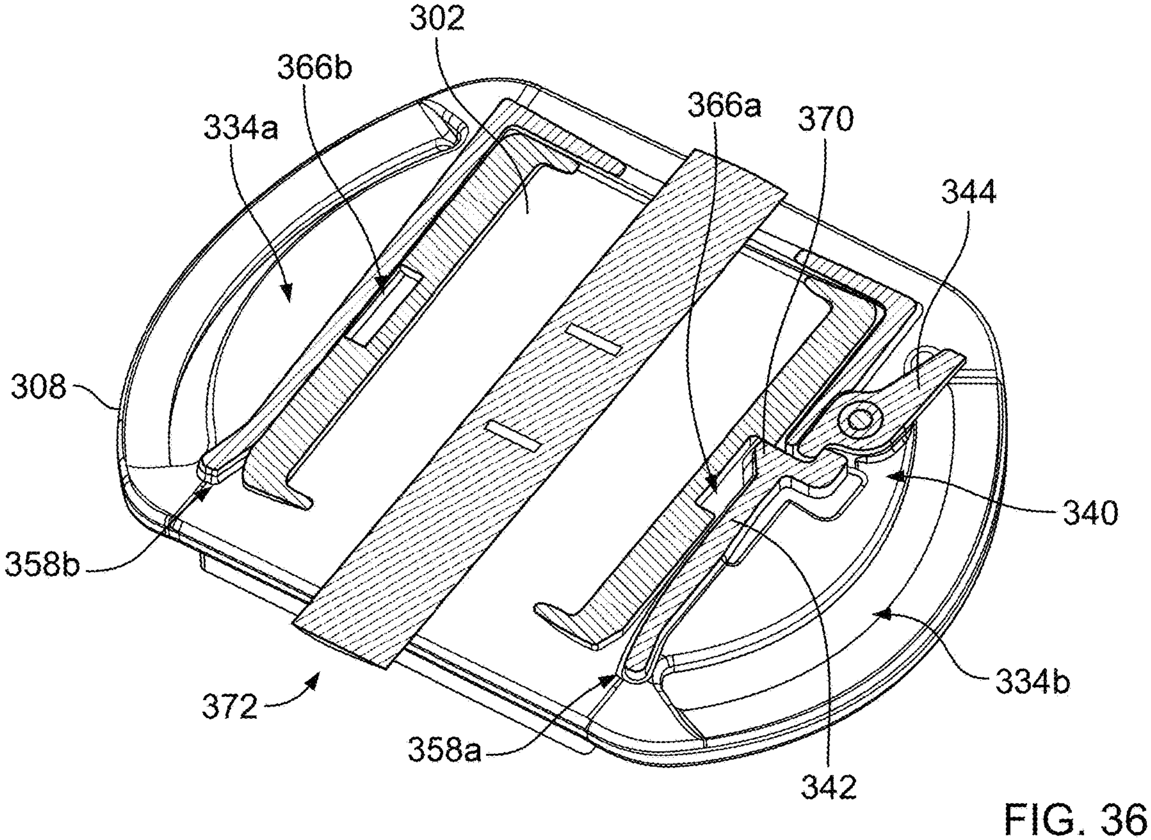
FIG. 36 shows a cross-sectional view of the mounting base and the lighting device taken along line 36-36 of FIG. 35.

FIG. 36 shows a cross-sectional view of the lateral tracks 360 of the lighting device 302 engaged and secured to the mounting base 308 at the base tracks 358*a*, 358*b*. As shown, the lateral tracks 360*a*,360*b* of the lighting device 302 each include a notch 366*a*,366*b* generally disposed in the middle of the respective lateral track 360*a*,360*b*. The retention arm 342 of the retention system 340 includes a stop portion 370 dimensioned to engage the lighting device 302 at one of the notches 366*a*,366*b*. The engagement of the stop portion 370 and a wall of the notches 366*a*, 366*b* prohibits relative sliding between the lighting device 302 and the mounting base 308.

In use, to secure the lighting device 302 to the mounting base 308, a user can align the lateral tracks 360*a*, 360*b* of the lighting device 302 at an entrance 372 of the base tracks 358*a*, 358*b*. The user can then slide the lighting device 302 generally parallel to the mounting surface 336 of the mounting base 308 along the base tracks 358*a*,358*b* until the stop portion 370 of the retention arm 342 is snapped into (or otherwise received by) the notch 366*a*,366*b*. To remove the lighting device 302 from the mounting base 308, the user can engage (e.g., push laterally inward) the user engaging portion 350 of the release lever 344, which moves that stop portion 370 of the retention arm 342 outside of the notches 366*a*, 366*b*, thereby allowing the lighting device 302 to slide relative to the mounting base 308. As shown, the lateral tracks 360*a*,360*b* of the lighting device 302 include the notches 366*a*, 366*b* on both sides. This allows the lighting device 302 to be secured to the mounting base 308 in two different orientations (e.g., front-facing and rear-facing).

Figure 37:
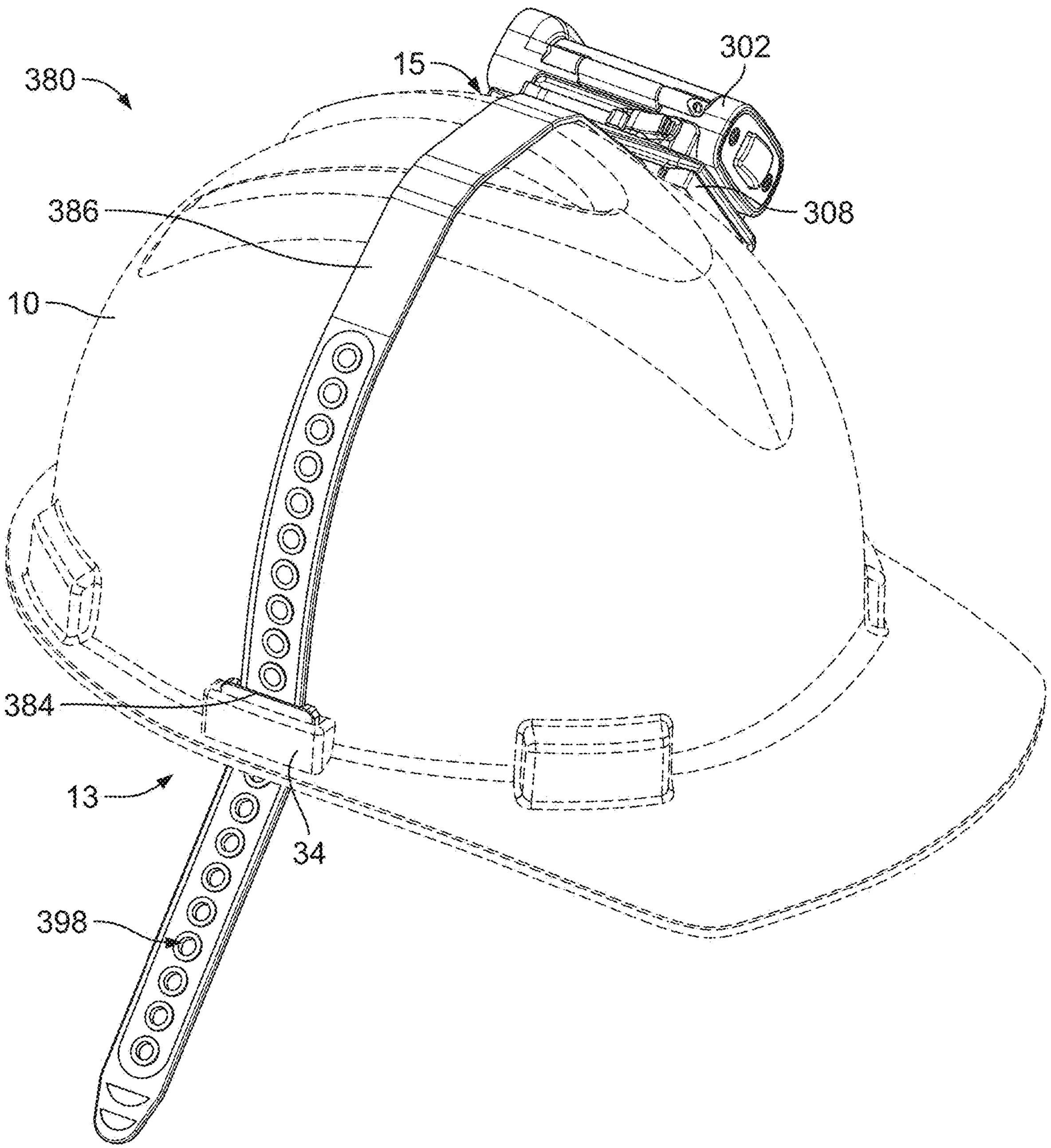
FIG. 37 shows a front perspective view of another attachment system according to an embodiment of the present disclosure.
Figure 38:
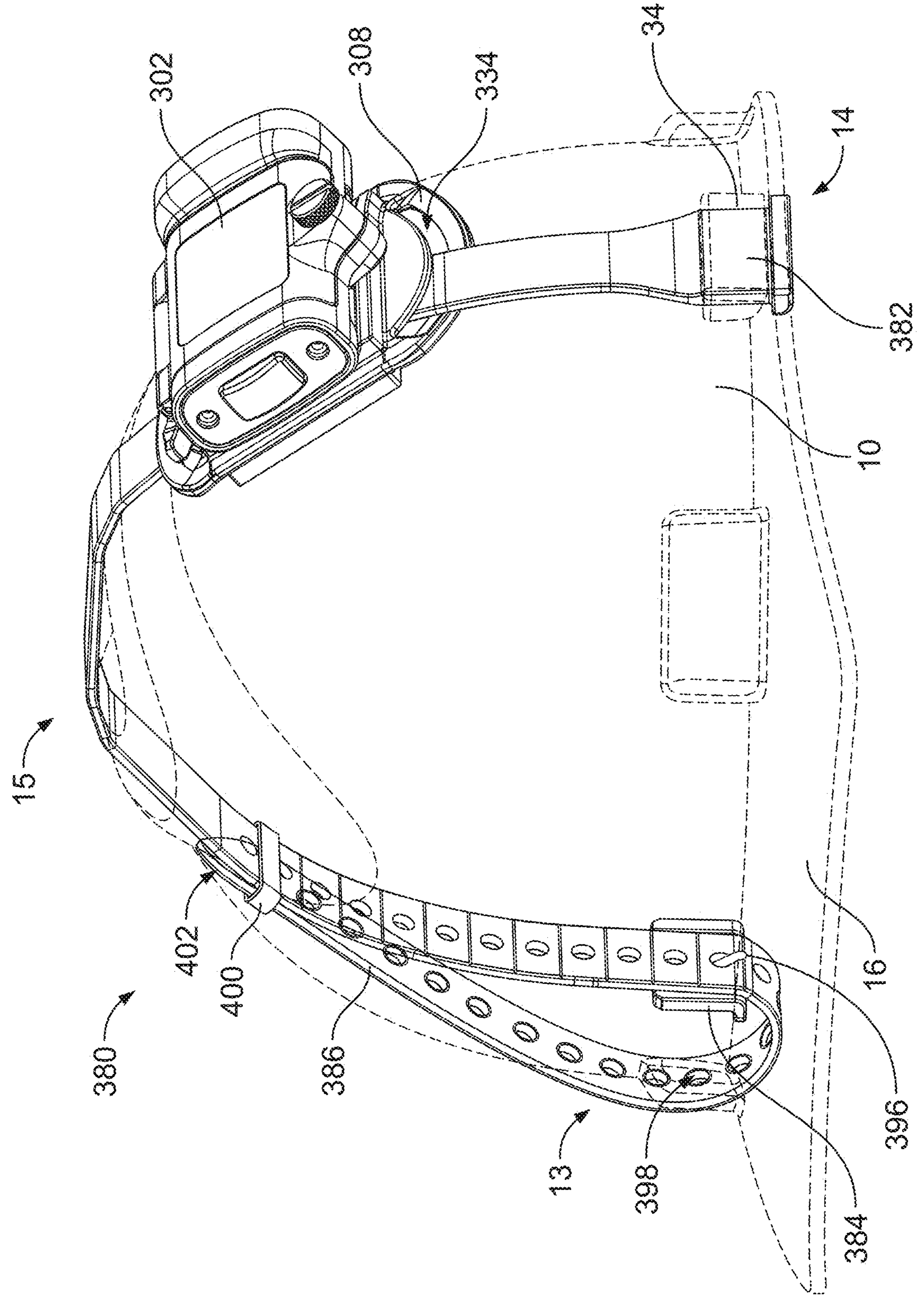
FIG. 38 shows a rear perspective view of the attachment system of FIG. 37.
Figure 39:
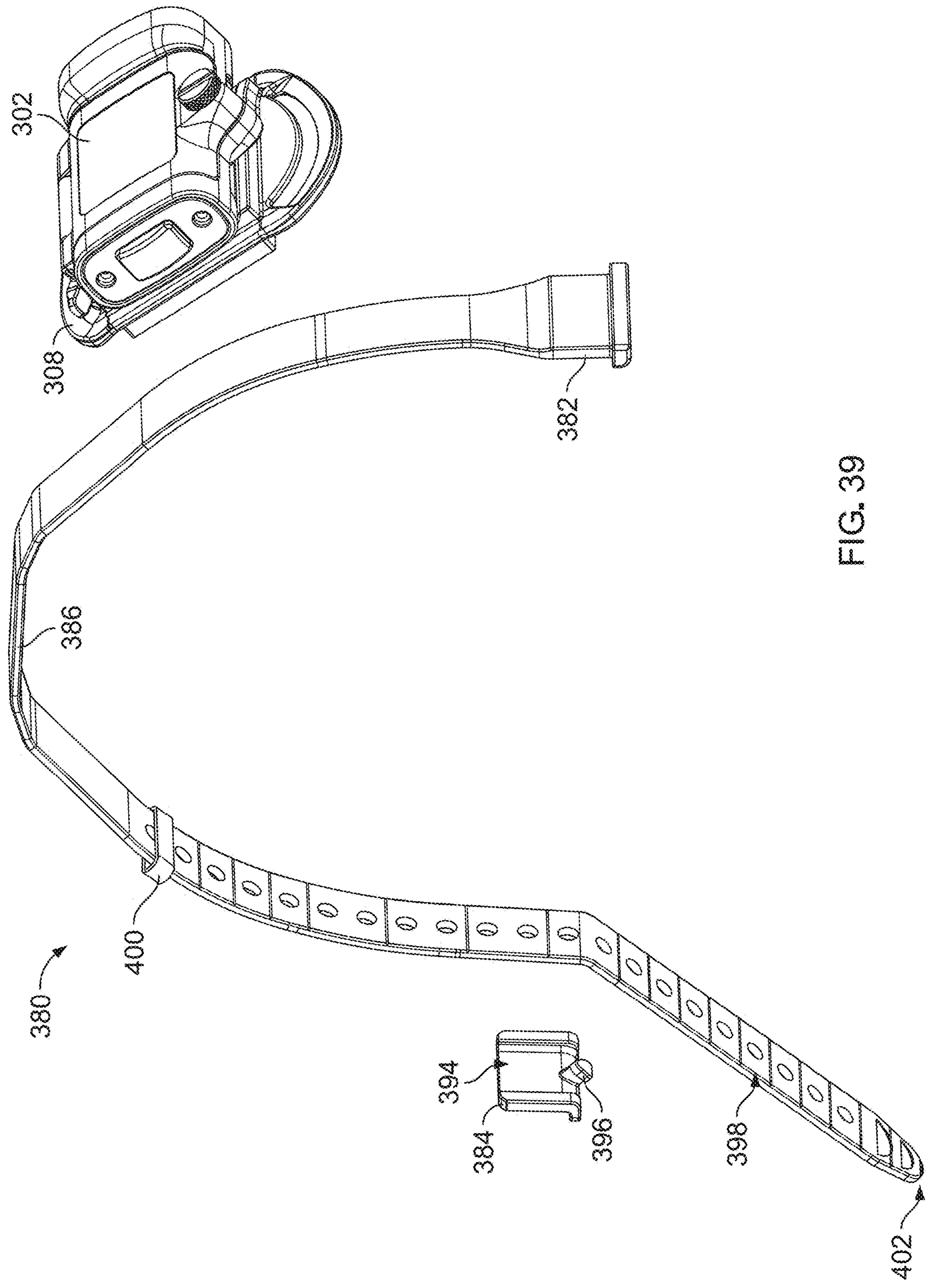
FIG. 39 shows an exploded view of the attachment system of FIG. 37.

FIGS. 37-39 show another strap system 380 for a helmet attachment device according to an embodiment of the disclosure. Like the strap system 306, the strap system 380 can be used for securing the lighting device 302, or other devices, to a safety helmet, such as the safety helmet 10. The strap system 380 can secure the mounting base 308 relative to the safety helmet 10. As shown in FIGS. 37 and 38, the strap system 380 extends from the first lateral side 13 of the safety helmet 10 to the second lateral side 14 of the safety helmet 10. The strap system 380 can extend over, or at least adjacent to, the apex 15 of the safety helmet 10.

The strap system 380 includes a first lateral attachment portion 382, a second lateral attachment portion 384, and a strap body 386. In the illustrated embodiment, the strap body 386 can be integrally formed with the first lateral attachment portion 382 to form a unitary body. However, other configurations are possible, including the strap body 386 being coupled to the first lateral attachment portion 382. The first lateral attachment portion 382 can be secured to the helmet 10 at the first lateral side 13 via an attachment slot 34 of the helmet 10. In the illustrated embodiment, the attachment slots 34 are configured as ports through the helmet 10 that allow the strap system 380 or other devices or systems to be attached to the helmet 10.

As shown in FIGS. 37 and 38, the first lateral attachment portion 382 can be received by the attachment slot 34 on the first lateral side 13 of the helmet 10. Similarly, the second lateral attachment portion 384 can be received by the attachment slot 34 on the second lateral side 14 of the helmet. In some embodiments, the lateral attachment portions 382, 384 may be secured to the attachment slots 34 via an interference fit. For example, to secure the first lateral attachment portion 382, the strap body 386 may be first threaded through the attachment slot 34 from the bottom of the helmet 10 toward the apex 15 and then pulled until the first lateral attachment portion 382 is lodged or otherwise retained by the attachment slot 34 at the first lateral side 13 of the helmet 10. Similarly, the second lateral attachment portion 384 may be secured to the helmet 10 via an interference at the attachment slot 34 on the second lateral side 14.

As shown in FIG. 38, in some embodiments, the strap system 380 can further include a retention member 400 configured to secure a distal end 402 of the strap body 386 to a proximal portion of the strap body 386. In general, the retention member 400 provides a retention of the distal end 400 of the strap body 386 so that the distal end 400 is not in the way of, or otherwise loosely dangling from the second lateral side 14 of the safety helmet 10.

With reference to FIG. 39, the second lateral attachment portion 384 can be configured as an adjuster and can include a track 394 and a securement pin 396. In use, the strap body 386 can be received by the track 394 as the strap body 386 extends through the attachment slot 34. The securement pin 396 can be configured to extend through one of a plurality of holes 398 in the strap body 386. In use, to secure the strap system 380 to the helmet 10, the strap body 386 can extend from the first lateral attachment portion 382, which is secured in the attachment slot 34 at the first lateral side 13 of the helmet 10. The strap body 386 can then extend over the apex 15 of the safety helmet 10, into the track 394, and through the attachment slot 34 at the second lateral side 14 of the safety helmet 10. As the strap body 386 extends across the track 394, the securement pin 396 can be inserted through one of the holes 398 once the strap body 386 is at an appropriate or desired tension across the safety helmet 10. An appropriate tension may be when the strap body 386 is under enough tension that the strap system 380 does not slide relative to the safety helmet 10 when in use. As an adjuster, the second lateral attachment portion 384 can be used to accommodate the strap system 380 and the length required to extend over a variety of helmets.

Similar to the strap system 306 described above, the strap system 380 is configured to secure a device, such as the lighting device 302, relative to the safety helmet 10 via the mounting base 308. That is, the strap body 386 can extend through the slots 334 of the mounting base 308 to secure the mounting base 308, and thus the lighting device 302, adjacent to a lateral side 13, 14 of the safety helmet 10. With the lighting device 302 secured at a lateral side 13, 14 of the helmet 10, the brim 16 of the helmet does not obstruct or otherwise impact the light emitted from the lighting device 302.

Figure 40:
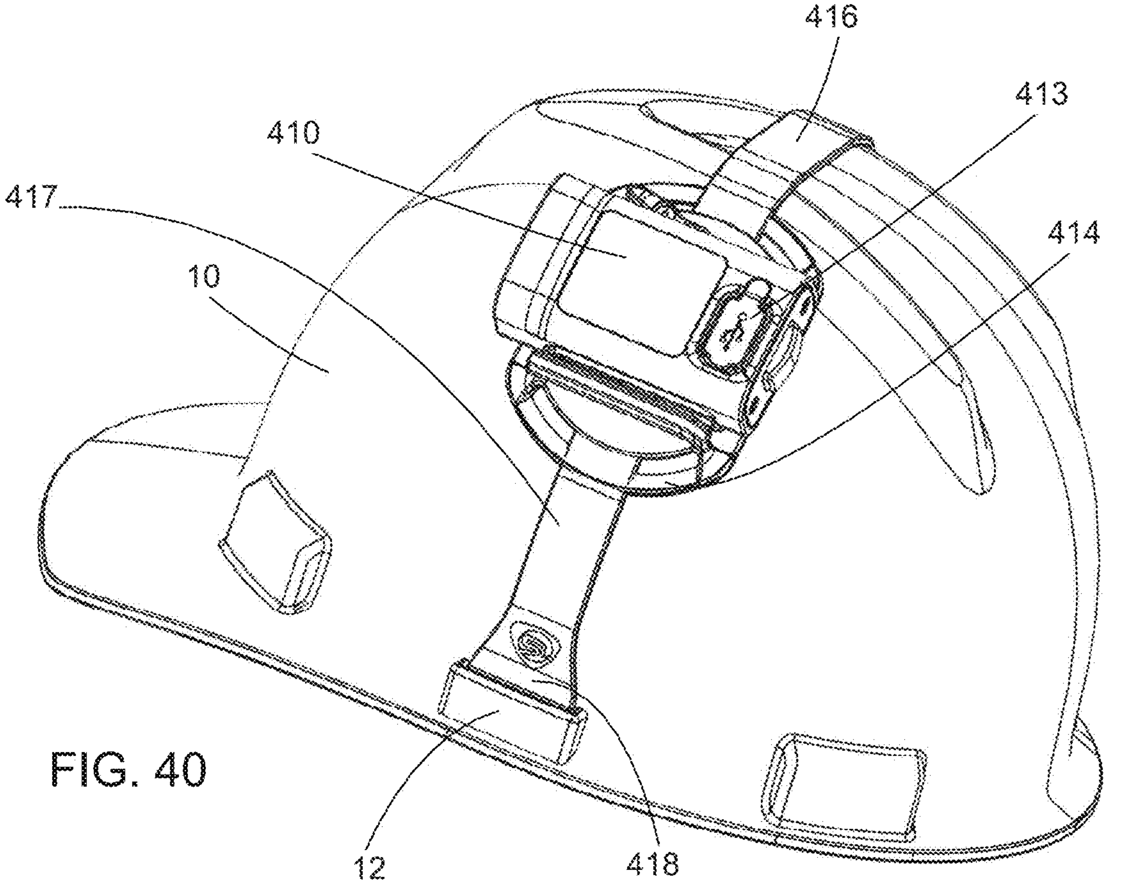
FIG. 40 shows a perspective view of another attachment system according to an embodiment of the present disclosure.
Figure 41:
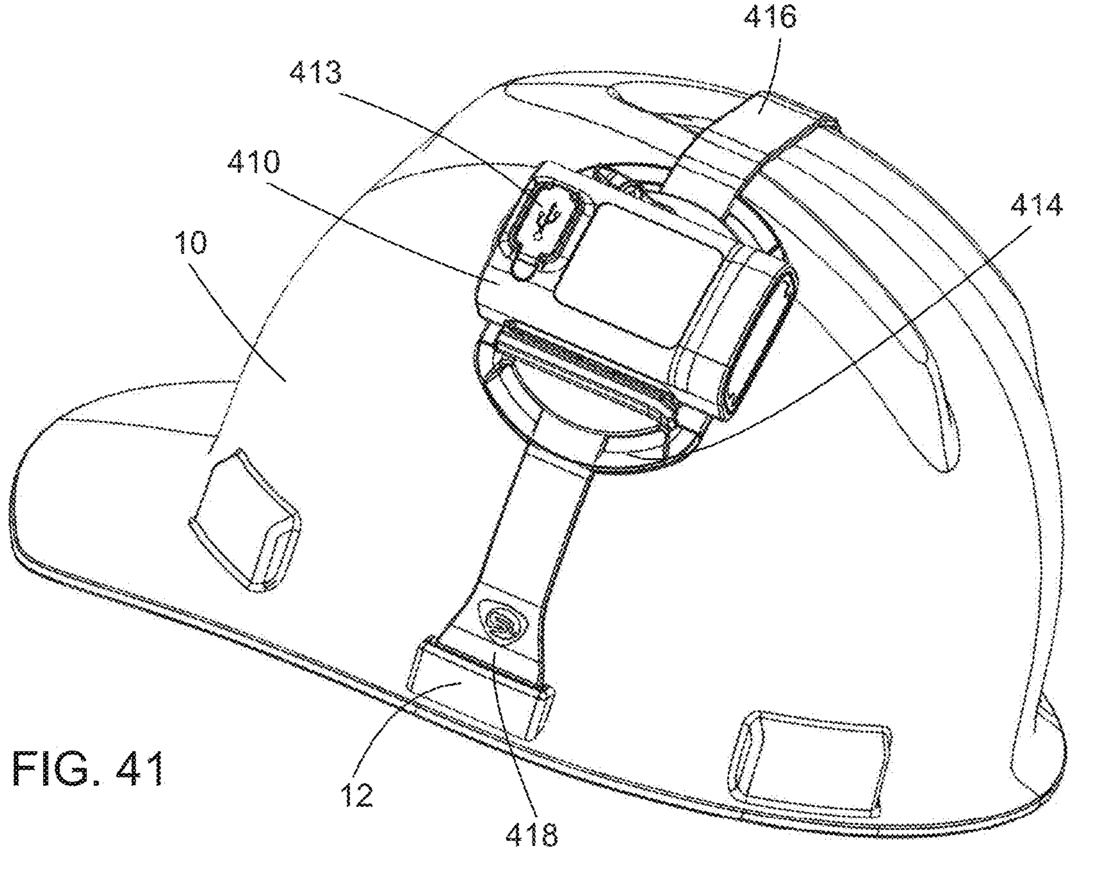
FIG. 41 shows a rear perspective view of the attachment system of FIG. 40.

FIGS. 40 and 41 shows another embodiment of a strap system 416 for attaching a lighting device, for example lighting device 410, to a helmet (for example helmet 10). In this embodiment, the strap system 416 includes a strap body 417 and lateral anchors (only lateral anchor 418 shown) that are integral with both ends of the strap body 417, the lateral anchors meant to fit within attachment portion 12 on the helmet 10 to attach the strap system 416 and support a mounting base 414 to the helmet 10. In this embodiment, the strap body 417 is elastic and appropriately sized to fit snugly but comfortably over the helmet 10, or any other helmet of known type and dimensions. Further, in this embodiment a rechargeable version of a lighting device 410 having a charging port 413 is shown attached to the mounting base 414. As discussed above in relation to other embodiments, mounting base 414 permits attachment of lighting devices thereto in either a front-facing or a rear-facing orientation. In FIG. 40 the lighting device 410 is shown attached to the mounting base 414 facing to the front of the helmet 10, and in FIG. 41 the lighting device 410 is shown attached to the mounting base 414 facing to the rear of the helmet 10. Identical to the discussion above with respect to lighting device 302, lighting device 410 is capable of both configurations by way of lateral tracks 411*a*,411*b* interrupted by notches 412*a*,412*b* (see FIG. 47, only one side of lighting device 410 shown) located on either side of the lighting device 410.

Figure 42:
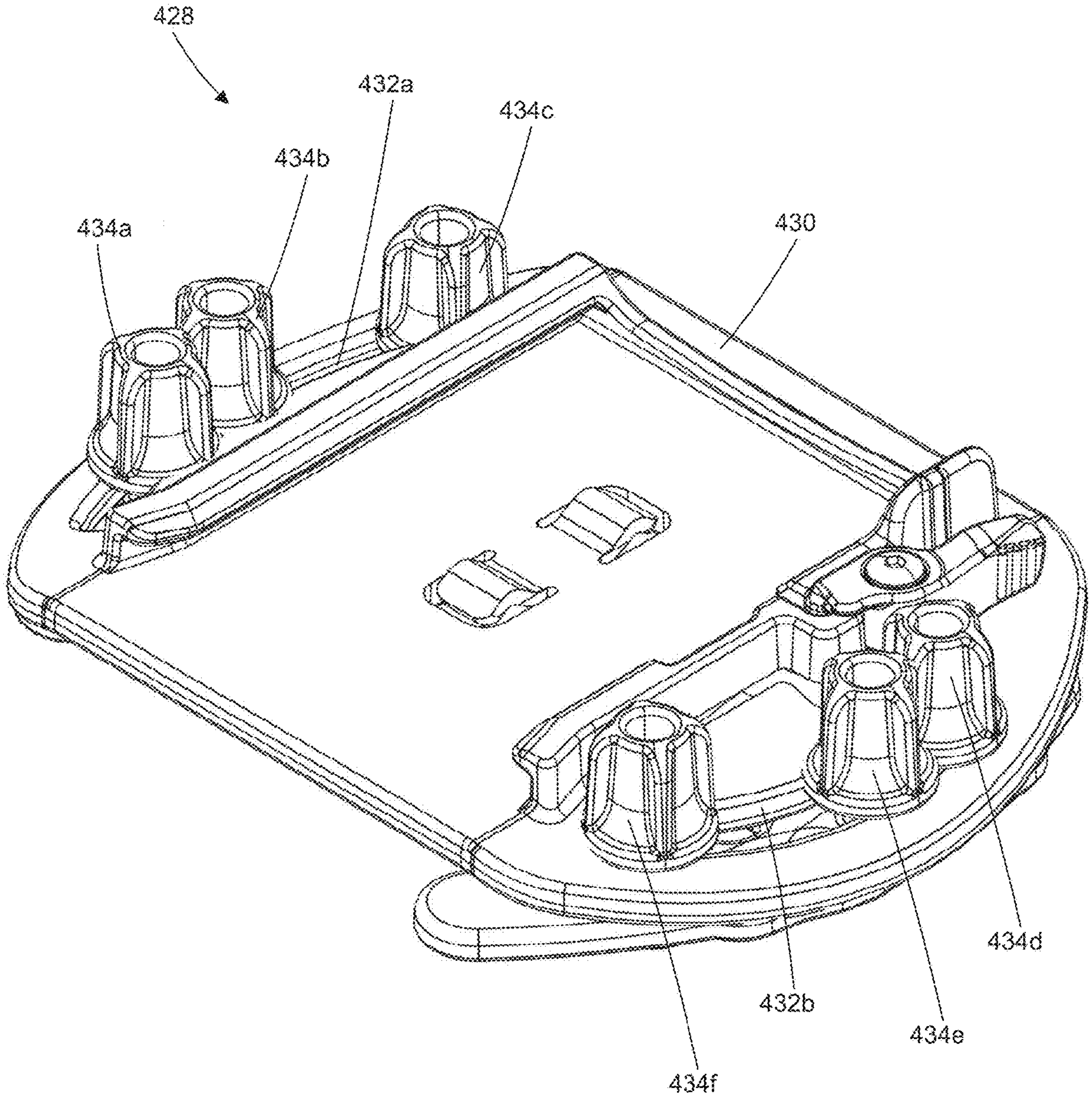
FIG. 42 shows a front perspective view of another attachment system according to an embodiment of the present disclosure.
Figure 43:
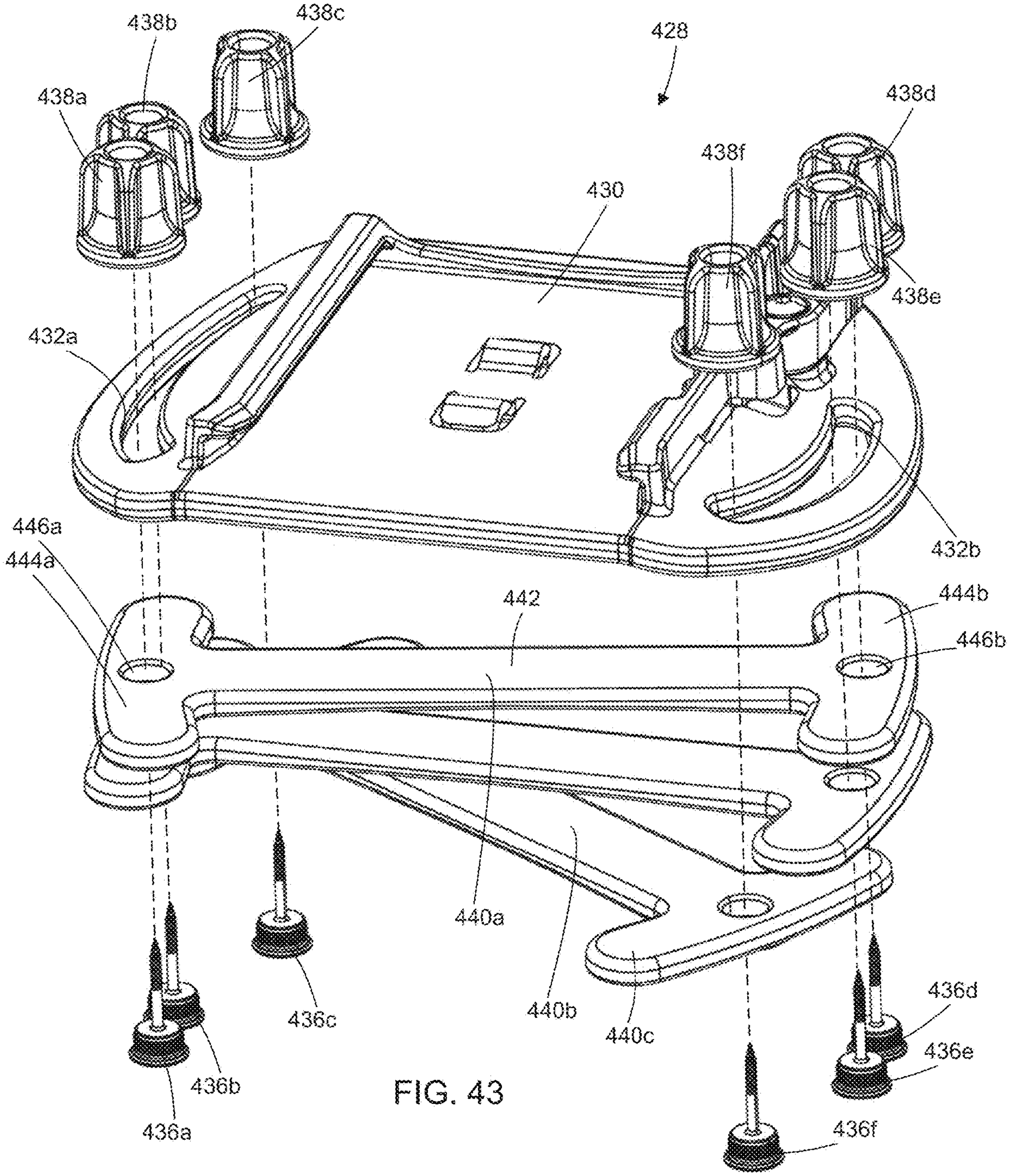
FIG. 43 shows an exploded view thereof.

FIGS. 42 and 43 show an embodiment of a mounting apparatus 428 for attaching a lighting device or other device to a soft, fabric, or cloth object. Mounting apparatus 428 includes a mounting base 430, one or a plurality of mounting pads 440*a*-440*c* which are designed to be placed on the opposite side (typically the interior) of the soft, fabric or cloth object from the mounting base 430, and one or a plurality of fasteners 434*a*-434*f* that are used to attach through the mounting pads 440*a*-440*c*, through the soft, fabric, or cloth object, and then through slots 432*a*, 432*b* in the mounting base 430 to attach the mounting base 430 in place. Specifically, in this embodiment the fasteners 434*a*-434*f* each comprise a respective one of a plurality of cap portions 438*a*-438*f* and a respective one of a plurality of pin portions 436*a*-436*f*, with the pin portions 436*a*-436*f* each comprising a pointed or pin portion that pierces through the fabric and a lower, exterior threaded portion, and the cap portion 438*a*-438*f* each comprising a threaded interior portion that allow the respective cap portion 438*a*-438*f* to be threadedly connected to the respective pin portion 436*a*-436*f* for secure attachment. In this embodiment, each of the mounting pads 440*a*-440*c*—with reference to mounting pad 440*a* only—comprises a central portion 442 attached between a pair of end portions 444*a*,444*b*, with each end portion comprising a respective hole 446*a*,446*b* through which a respective fastener 434*a*-434*f* may pass. Other suitable shapes for the mounting pads are possible, for example hollow or solid rectangular or oval shapes.

Figure 44:
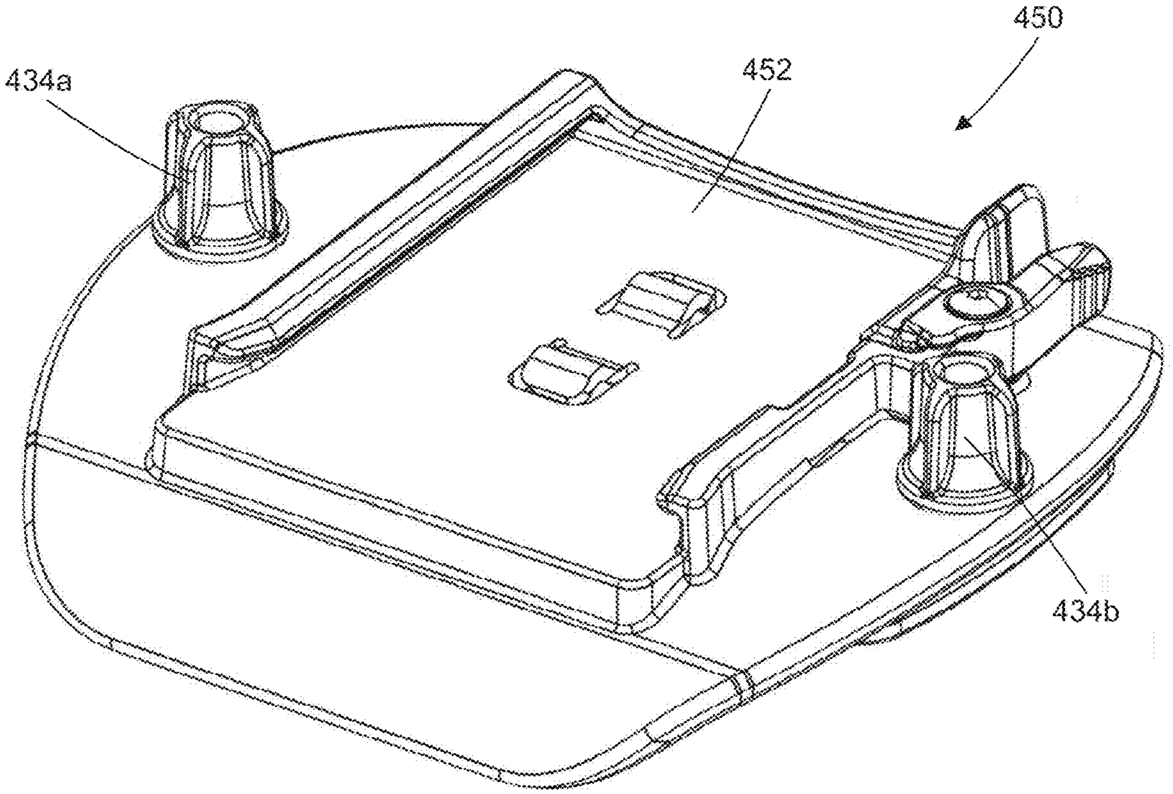
FIG. 44 shows a front perspective view of another attachment system according to an embodiment of the present disclosure.
Figure 45:
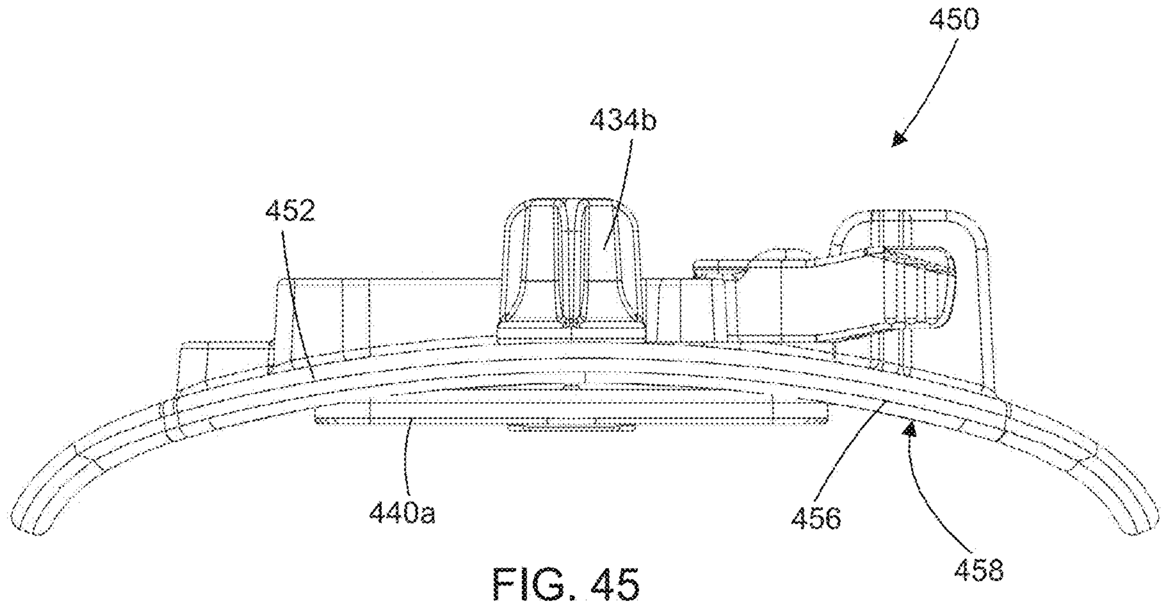
FIG. 45 shows a side view thereof.
Figure 46:
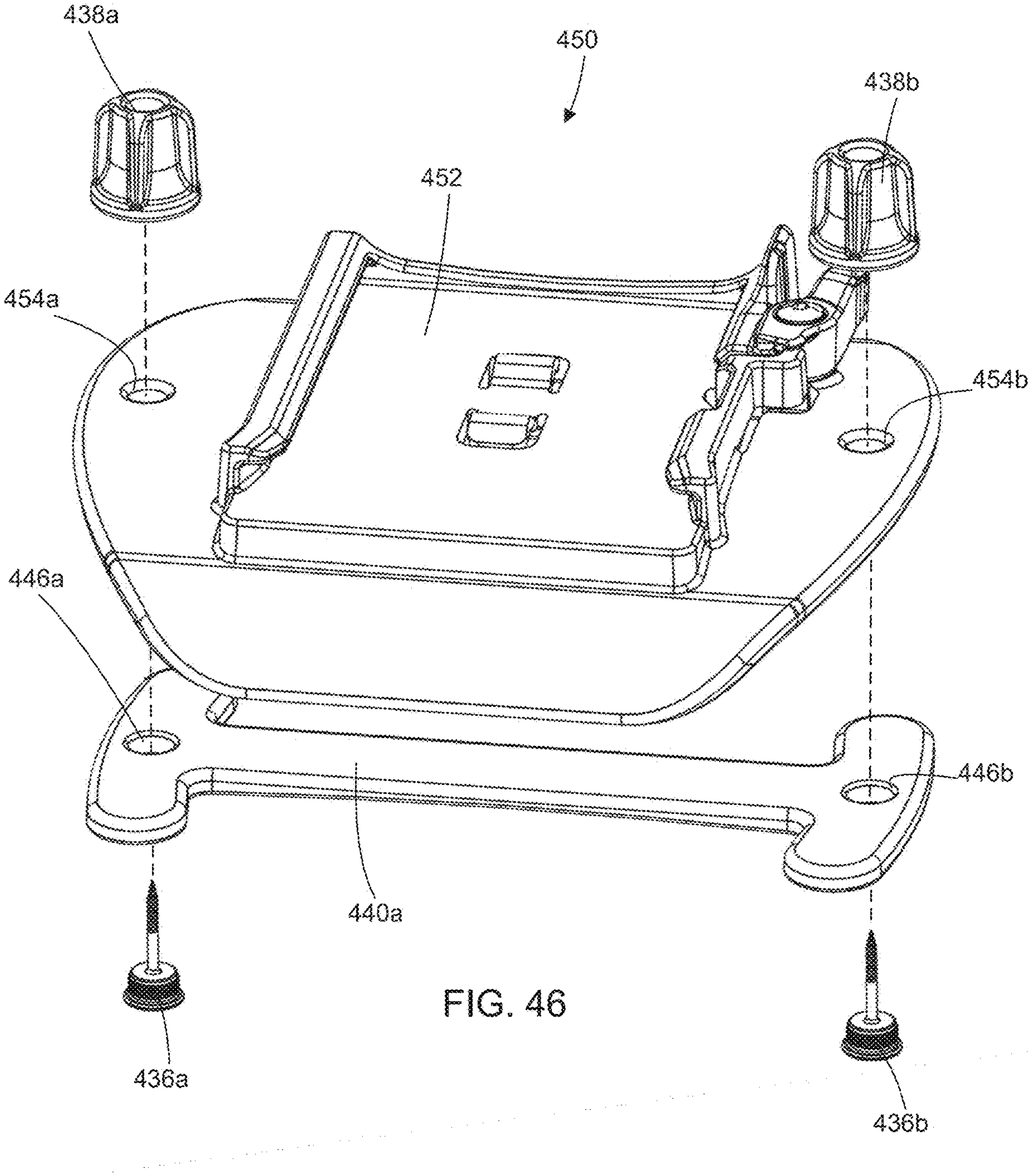
FIG. 46 shows an exploded view thereof.

FIGS. 44-46 shows an embodiment of a mounting apparatus 450 that includes a mounting base 452 having holes 454*a*, 454*b* on a plate portion 456, which in this example is curved in a concave manner on its underside 458 to accommodate the shape of a body part, for example for use as a shoulder mount in the epaulette region of a uniform, but otherwise incorporates elements from prior embodiments discussed above, as would be understood by a person of ordinary skill in the art. The holes 454*a*, 454*b* are located for alignment with the respective pin portions 436*a*, 436*b* when inserted through respective holes 446*a*, 446*b*, for connection to respective fasteners 438*a*, 438*b*.

Figure 47:
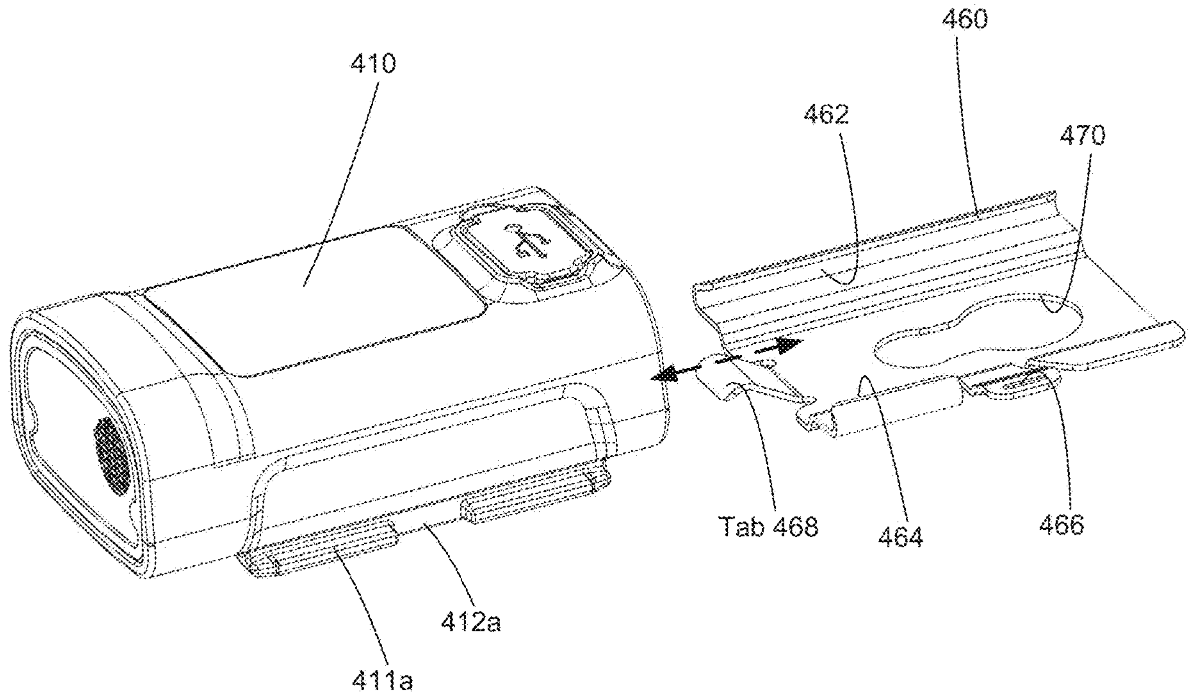
FIG. 47 shows a front perspective view of another attachment system according to an embodiment of the present disclosure.
Figure 48:
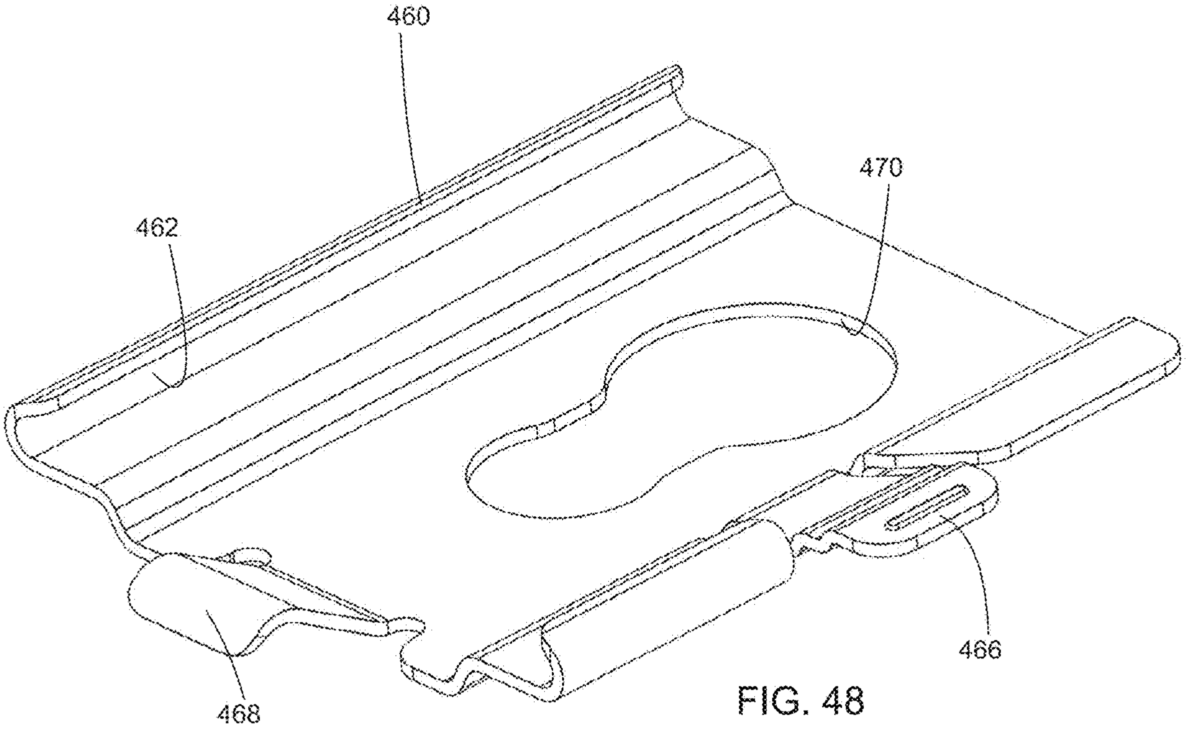
FIG. 48 shows a front, top perspective view thereof.
Figure 49:
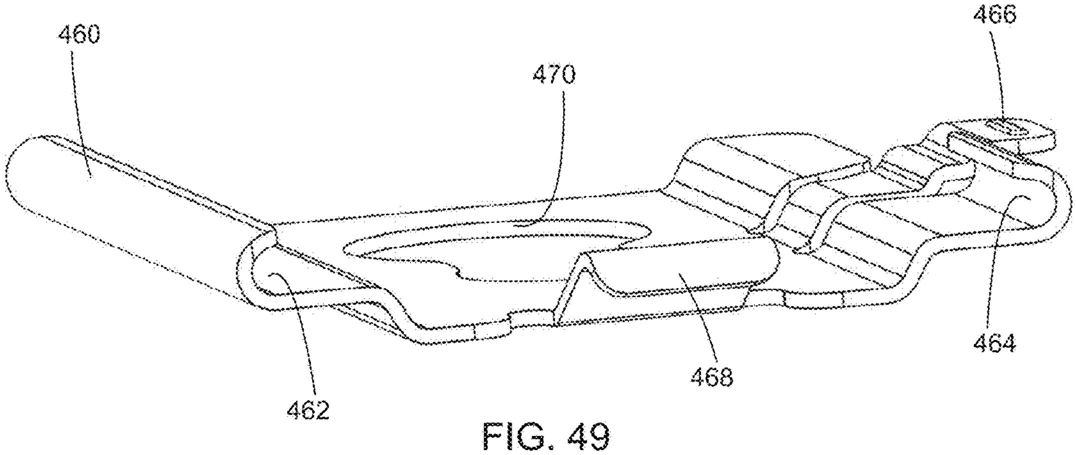
FIG. 49 shows a front perspective view thereof.
Figure 50:
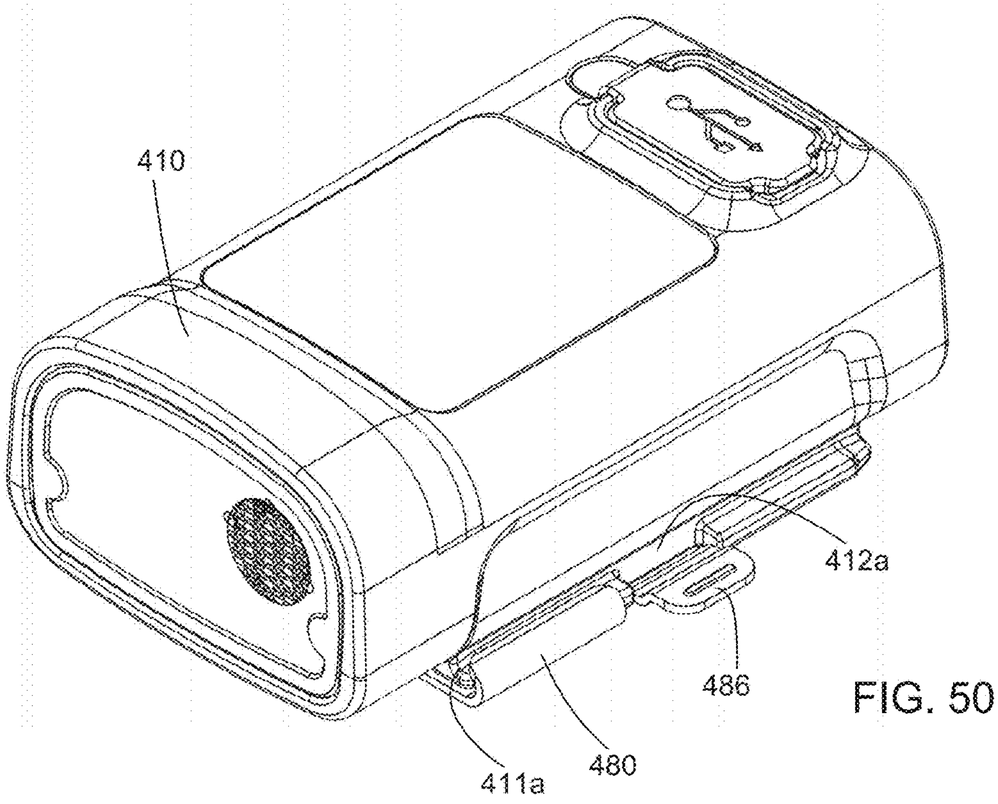
FIG. 50 shows a front, top perspective view of another attachment system according to an embodiment of the present disclosure, with a lighting device in an attached configuration.
Figure 51:
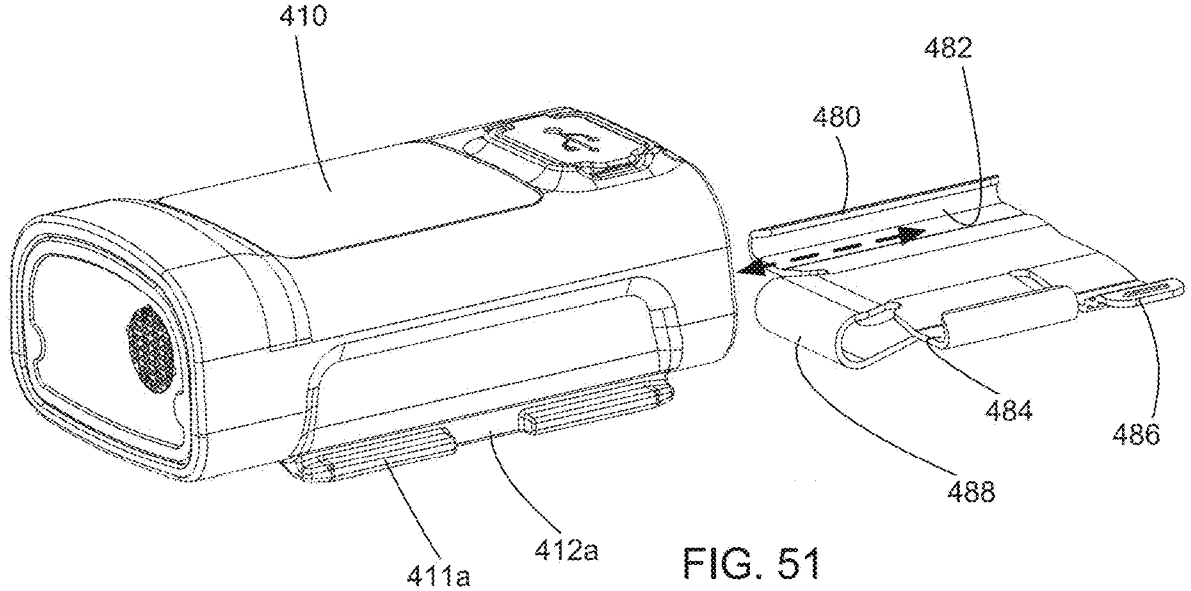
FIG. 51 shows a side perspective view thereof, with the lighting device in a detached configuration.
Figure 52:
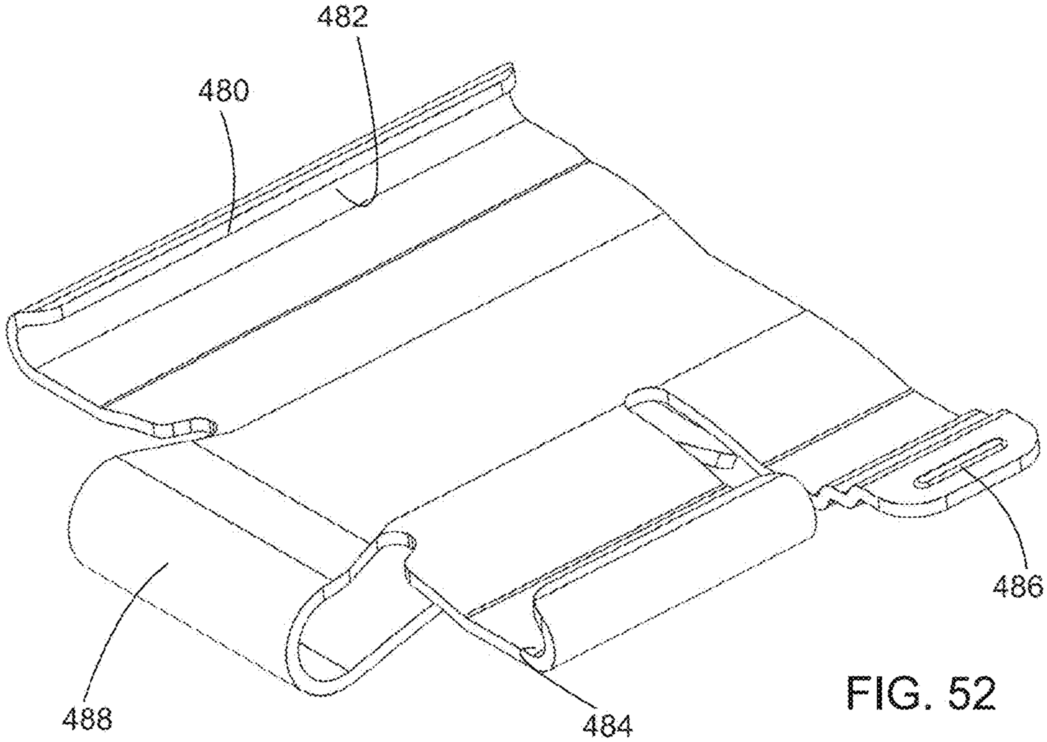
FIG. 52 shows a front, top perspective view of a clip member thereof.
Figure 53:
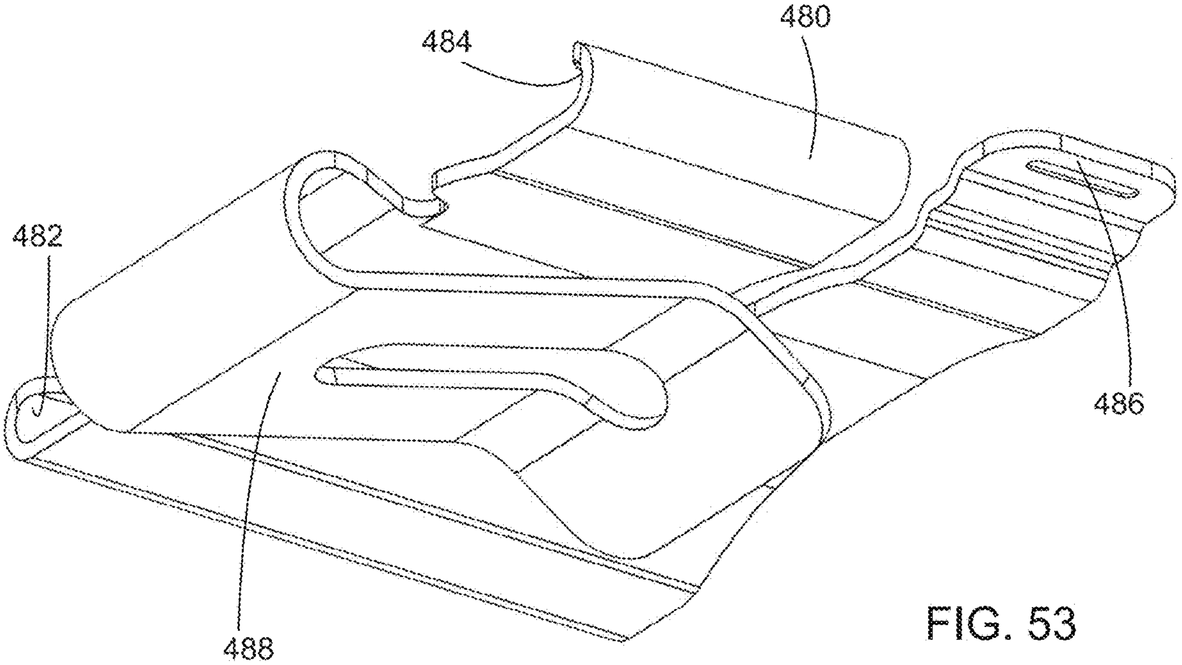
FIG. 53 shows a front, bottom perspective view thereof

FIG. 47-49 show a mounting base 460 that comprises a full channel 462 on one side thereof and a partial channel 464 on the other side thereof, which interact with the lateral tracks 411*a*,411*b* on the lighting device 410 to retain it in place within the mounting base 460 when desired. Mounting base 460 also include a latch 466 that snaps into and sits within notch 412*a* (or notch 412*b*, if facing the opposite direction) in the lighting device 410 when the lighting device 410 has been slid into an aligned arrangement within the mounting base 460, with the latch 466 being depressible out of the notch 412*a* (or notch 412*b*) to remove the lighting device 410 from the mounting base 460. Tab 468 located on the mounting base 460 is also used as a positional slide stop and to provide upward pressure on the bottom of the lighting device 410 to help maintain a snug connection between the lighting device 410 and the channels 462, 464.

In this embodiment the mounting base 460 also includes an attachment slot 470, which in this embodiment is approximately of a "keyhole" shape. The attachment slot 470 can be used to frictionally attach the mounting base 460 to a pin and plate that is mountable on the side of a helmet, the plate having a series of grooves that can hold the lighting device at different angles as it is rotated. This "pin and plate" attachment system is taught in U.S. Pat. No. 7,581,847, the entirety of which is incorporated herein by reference.

FIGS. 50-53 show a mounting clip 480 adapted to be attached to a hat or cap, for example the brim of a baseball cap. Like the prior embodiment, the mounting clip 480 comprises a full channel 482 on one side thereof and a partial channel 484 on the other side thereof, which interact with the lateral tracks 411*a*,411*b* on the lighting device 410 to retain it in place within the mounting clip 480 when desired. Mounting clip 480 also include a latch 486 that snaps into and sits within notch 412*a* (or notch 412*b*, if facing the opposite direction) in the lighting device 410 when the lighting device 410 has been slid into an aligned arrangement within the mounting clip 480, with the latch 486 being depressible out of the notch 412*a* (or notch 412*b*) to remove the lighting device 410 from the mounting clip 480. Mounting clip 480 also includes a clip member 488 on the bottom side thereof which allows it to be attached to hats or caps, as noted above, as well as many other objects.

Figure 54:
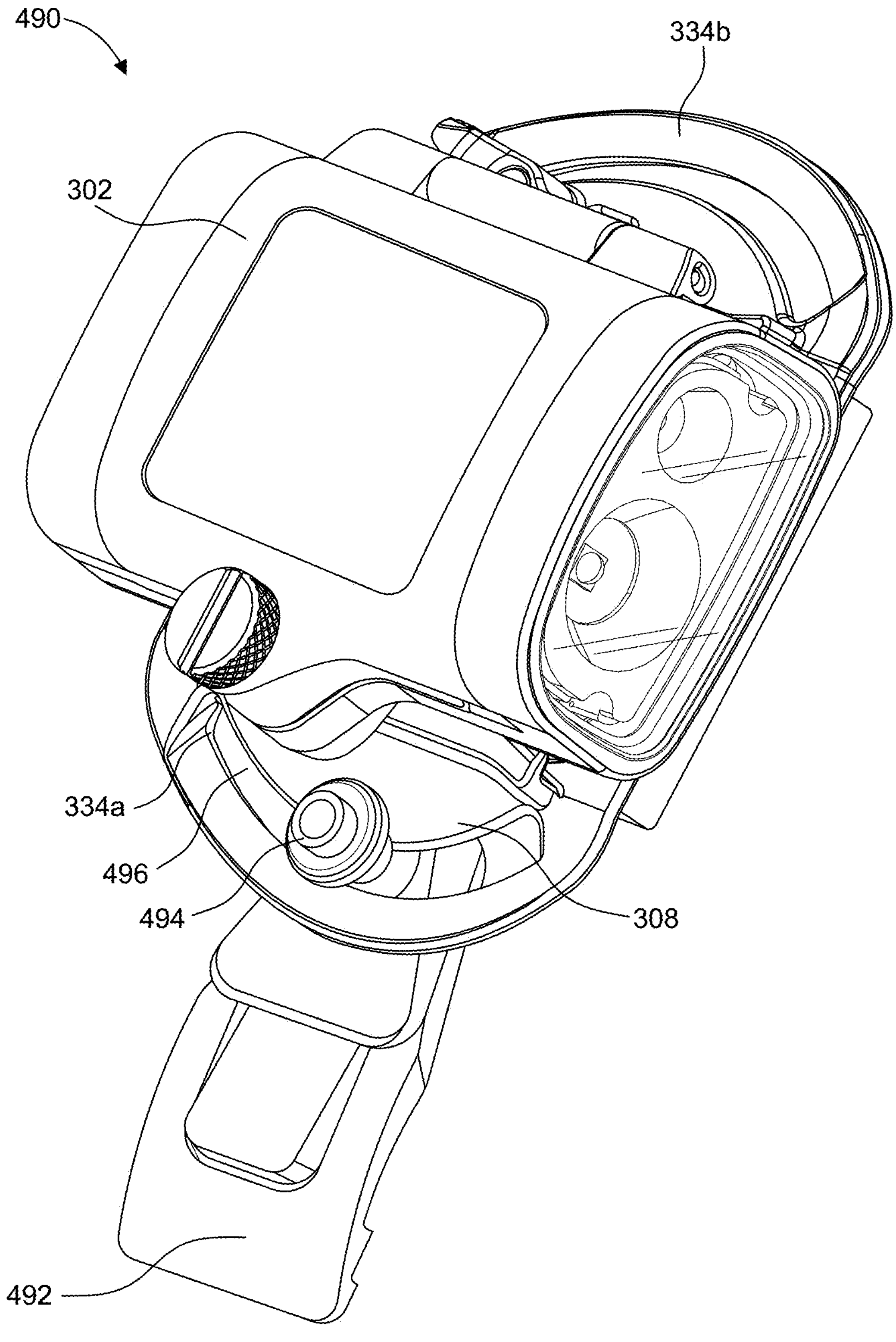
FIG. 54 shows a front perspective view of another attachment system according to an embodiment of the present disclosure.

FIG. 54 shows another example of a mounting apparatus 490 for attaching a lighting device 302 to a mounting base 308, the mounting base 308 being rotatably attached to a clip member 492 at an attachment point 494 around an axis 496, such that the attachment point 494 would slide within one of the slots 334*a*,334*b* in the mounting base 308 (and optionally a second attachment point or post would slide within the other of these slots 334*a*, 334*b*) so that the attached lighting device 302 could be aimed upwardly or downwardly. The clip member 492 in this embodiment is adapted to be releasably engaged with the attachment portion 12 of a helmet, for example a hard hat, and is functionally identical to clip 30*a* discussed above.

Figure 55:
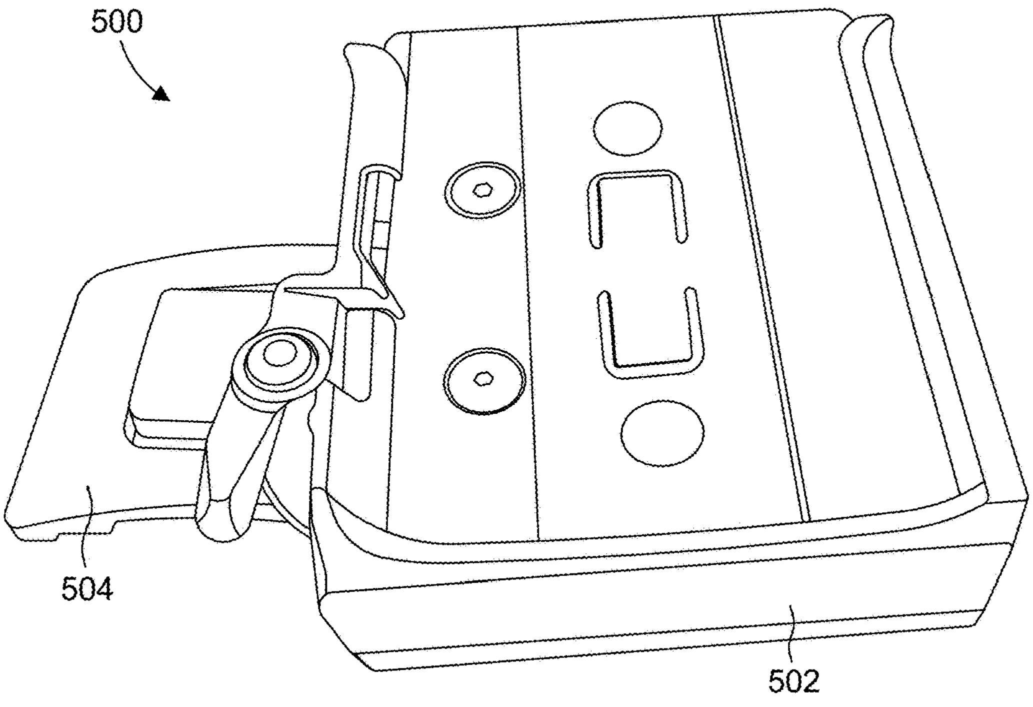
FIG. 55 shows a top perspective view of another attachment system according to an embodiment of the present disclosure.
Figure 56:
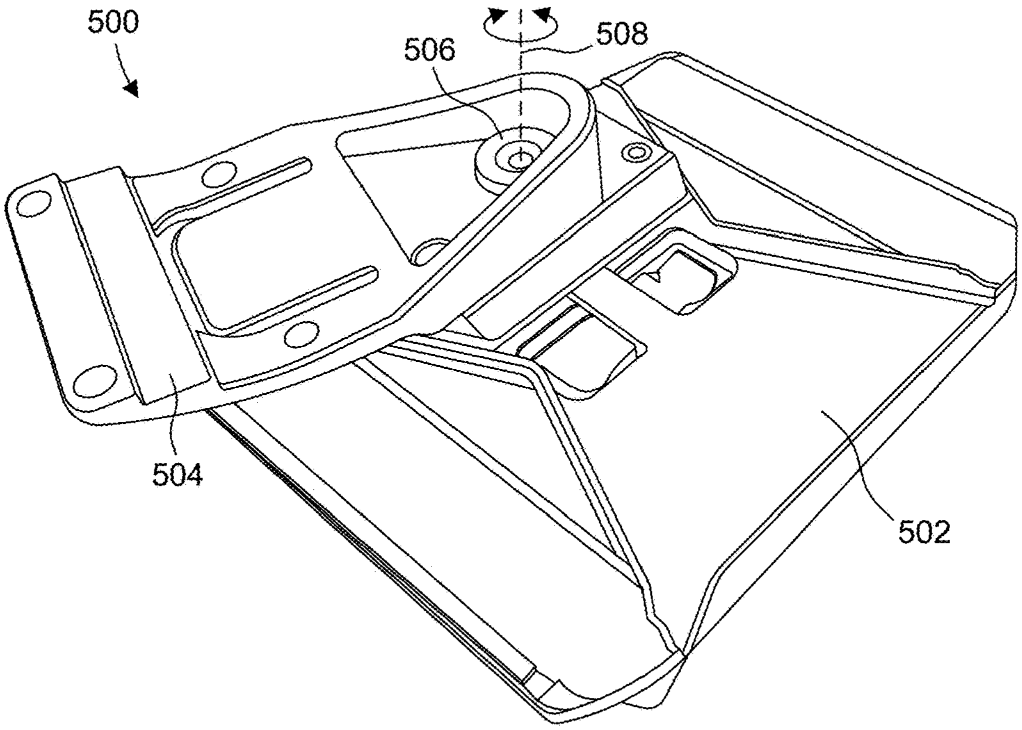
FIG. 56 shows a bottom perspective view thereof.
Figure 57:
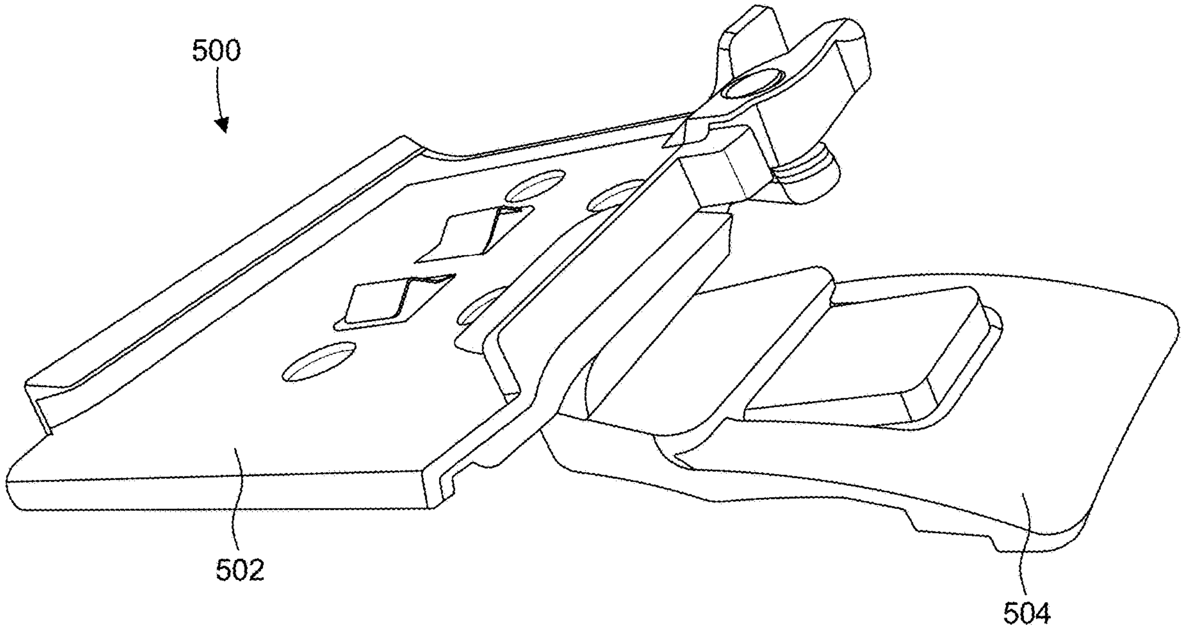
FIG. 57 shows a side perspective view thereof.

FIGS. 55-57 show another example of a mounting apparatus 500 for attaching a lighting device to a mounting base 502, the mounting base 502 being rotatably but frictionally attached to a clip member 504 at an attachment point 506 around an axis 508, such that the attached lighting device (e.g., lighting device 302 or lighting device 410) can be rotated around the clip member 504 and kept in its desired orientation. The clip member 504 in this embodiment is adapted to be releasably engaged with the attachment portion 12 of a helmet, for example a hard hat, and is functionally identical to clips 30*a*, 492 discussed above.

Figure 58:
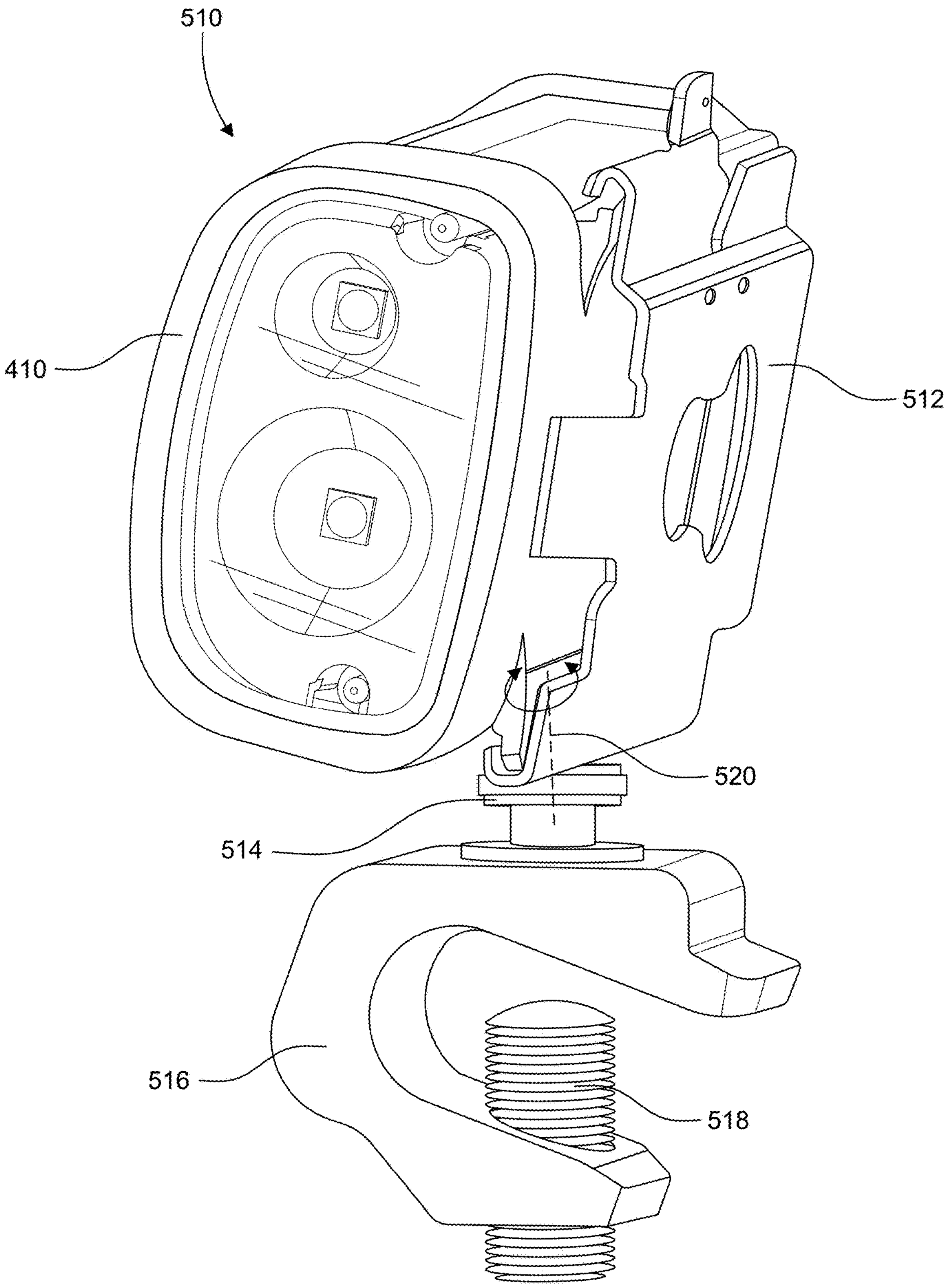
FIG. 58 shows a front perspective view of another attachment system according to an embodiment of the present disclosure.

FIG. 58 shows another example of a mounting apparatus 510 for attaching a lighting device (for example lighting device 410) to a mounting base 512. In this embodiment the mounting base 512 is attached to a clip member 516 that is adapted to be clamped around the brim (either above or below) of a typical fireman's or other metal helmet via fastener 518 (which in this embodiment is a threaded post). In this embodiment, the clip member 516 is rotatably attached to the mounting base 512 at an attachment point 514 around an axis 520. Further, in this embodiment all parts of the mounting apparatus 510 are preferably made of metallic materials, making them suitable for high-temperature environments, such as by firemen.

Figure 59:
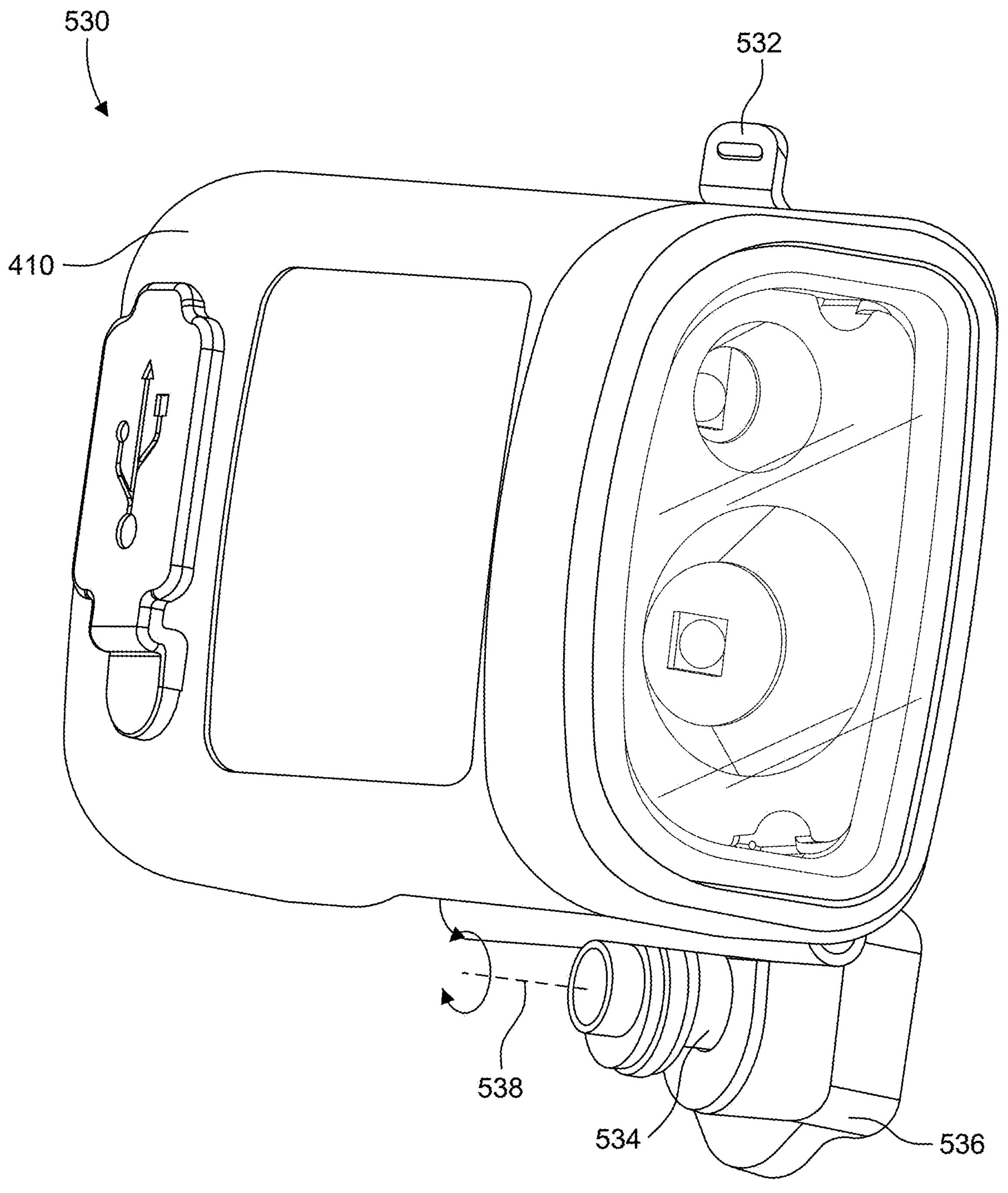
FIG. 59 shows a front perspective view of another attachment system according to an embodiment of the present disclosure.

FIG. 59 shows another example of a mounting apparatus 530 for attaching a lighting device (for example lighting device 410) to a mounting base 532. In this embodiment the mounting base 532 is attached to a clip member 563 that is adapted to be fit within the attachment slot of a Gallet-style rescue helmet (see FIGS. 14-16 and the discussion thereof above). In this embodiment, the clip member 536 is rotatably attached to the mounting base 532 at an attachment point 534 around an axis 538. Further, in this embodiment all parts of the mounting apparatus 530 are preferably made of metallic materials, making them suitable for high-temperature environments, such as by firemen.

In additional respects, the novelty and inventiveness of the present disclosure resides in operational details of the lighting devices (for example lighting devices 302,410), which may optionally include some or all of the following:

1) TAIL-LIGHT
   - a. While the light is on, a button press that lasts at least 5 seconds changes the tail-light mode by one step.
   - b. No other action is taken until the button is released and a new press begins.
   - c. The tail-light modes are blink (factory), steady, off.
   - d. The change is remembered if the batteries are changed out.

2) FRONT-LIGHT
   - a. While the light is on, a button press that lasts at least 2 seconds changes the front-light mode by one step.
   - b. If the button press continues long enough to satisfy (1) proceed as stated. No other action is taken until the button is released and a new press begins.
   - c. The front-light modes are spot (factory), flood, both.
   - d. The change is remembered if the batteries are changed out.

3) INTENSITY
   - a. While the light is off, a button press of any duration upon release turns on the front-light at low intensity.
   - b. While the light is on, a button press and release within 1.5 seconds of a prior release changes the intensity of the front-light by one step.
   - c. While the light is on, a button press and release after more than 1.5 seconds of a prior release changes the intensity of the front-light to off.
   - d. The front-light intensities are low (25 lumens), high (200 lumens), off.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A helmet attachment device adapted to be mounted to a helmet, the helmet having a first attachment portion located on a first lateral side of the helmet and a second attachment portion located on a second lateral side of the helmet, the helmet further comprising an apex, the helmet attachment device comprising:
- a strap system, the strap system having a first end and a second end;
- a mounting base configured to be secured to the helmet via the strap system;
- a first clip attached to the first end of the strap system, the first clip being specially adapted to attach to the first attachment portion; and
- a second clip attached to the second end of the strap system, the second clip being specially adapted to attach to the second attachment portion,
- wherein when the first clip is attached to the first attachment portion and the second clip is attached to the second attachment portion, the strap system is routed over or near the apex of the helmet, wherein the mounting base is adapted for aiming by rotation with respect to the strap system without repositioning the strap system and without removing the mounting base from the strap system.

2. The helmet attachment device of claim 1, further comprising a lighting device that is attachable to the mounting base.

3. The helmet attachment device of claim 2, wherein the lighting device includes lateral tracks that are configured to slidingly engage base tracks of the mounting base.

4. The helmet attachment device of claim 1, wherein the mounting base includes a retention system to lock or unlock a lighting device relative to the helmet.

5. The helmet attachment device of claim 4, wherein the retention system includes a flexible retention arm and a release lever, the release lever pivotable about an axis.

6. The helmet attachment device of claim 5, wherein the retention arm is integrally formed with a body of the mounting base.

7. The helmet attachment device of claim 1, wherein the mounting base includes first and second slots through which the strap system extends to secure the mounting base relative to the helmet.

8. The helmet attachment device of claim 1, wherein the mounting base is configured to secure a lighting device relative to the helmet in one of a first position and a second position.

9. A helmet attachment device for a helmet, the helmet defining a first lateral side, a second lateral side, and an apex, the helmet attachment device comprising:

a lighting device;

a mounting base configured to support the lighting device relative to the helmet; and a strap system configured to secure the mounting base relative to the helmet, the strap system comprising:

a first lateral attachment portion configured to be secured to the helmet at the first lateral side of the helmet;

a second lateral attachment portion configured to be secured to the helmet at the second lateral side of the helmet; and a strap body configured to extend over the apex of the helmet between the first lateral attachment portion and the second lateral attachment portion, wherein the mounting base is adapted for aiming by rotation with respect to the strap system without repositioning the strap system and without removing the mounting base from the strap system.

10. The helmet attachment device of claim 9, wherein the helmet defines a front and a rear, the lighting device includes a lens, and the mounting base is configured to support the lighting device relative to the helmet in either of a first position or a second position, wherein in the first position, the lens of the lighting device faces the front of the helmet, and wherein in the second position, the lens of the lighting device faces the rear of the helmet.

11. The helmet attachment device of claim 9, wherein the strap body extends from the first lateral attachment portion.

12. The helmet attachment device of claim 9, wherein the second lateral attachment portion includes an adjuster to adjust a length of the strap body extending between the first and second lateral attachment portions.

13. The helmet attachment device of claim 9, wherein the first and second lateral attachment portions each include a pair of arms that straddle an attachment slot of the helmet.

14. The attachment device of claim 13, wherein each arm includes a clip configured to clip onto the helmet near a lateral side.

15. The attachment device of claim 9, wherein the mounting base includes a retention system to lock or unlock the lighting device relative to the helmet.

16. The attachment device of claim 15, wherein the retention system includes a flexible retention arm and a release lever, the release lever pivotable about an axis.

17. The attachment device of claim 16, wherein the retention arm is integrally formed with a body of the mounting base.

18. The attachment device of claim 9, wherein the mounting base is slidable along the strap body at either the first or second lateral side of the helmet.

19. A method of rotating a lighting device relative to a helmet, the method comprising:

disconnecting the lighting device from the helmet by:

engaging a release lever of a mounting base so that the release lever of the mounting base moves a retention arm of the mounting base out of a locking position;

with the release lever engaged, sliding the lighting device relative to the mounting base until the lighting device is disengaged from base tracks of the mounting base; and releasing the release lever so that the retention arm is returned to the locking position;

rotating the entirety of the lighting device so that a lens of the lighting device faces a different direction; and connecting the lighting device to the helmet by:

sliding the lighting device along the base track until a stop portion of the retention arm is positioned within a notch in the lighting device.

20. The method of claim 19, wherein before disconnecting the lighting device from the helmet, the lens of the lighting device faces one of a front or a rear of the helmet, and wherein after rotating the entirety of the lighting device and connecting the lighting device to the helmet, the lens of the lighting device faces the other of the front or the rear of the helmet.

* * * * *